(12) United States Patent
Burt

(10) Patent No.: US 12,705,665 B2
(45) Date of Patent: Aug. 11, 2026

(54) SaaS PLATFORM, MOBILE APPLICATION, AND INTERFACE FOR MANAGEMENT BETWEEN COORDINATOR, VENDORS, AND ATTENDEES

(71) Applicant: Jamal Burt, New York, NY (US)

(72) Inventor: Jamal Burt, New York, NY (US)

( * ) Notice: Subject to any disclaimer, the term of this patent is extended or adjusted under 35 U.S.C. 154(b) by 37 days.

(21) Appl. No.: 18/749,167

(22) Filed: Jun. 20, 2024

(65) Prior Publication Data

US 2024/0346568 A1 Oct. 17, 2024

Related U.S. Application Data

(63) Continuation of application No. PCT/US2023/010761, filed on Jan. 13, 2023.

(60) Provisional application No. 63/299,795, filed on Jan. 14, 2022.

(51) Int. Cl.
*G06Q 30/0601* (2023.01)
*G06K 7/14* (2006.01)

(52) U.S. Cl.
CPC ....... *G06Q 30/0633* (2013.01); *G06K 7/1417* (2013.01)

(58) Field of Classification Search
CPC ........... G06Q 30/0247; G06Q 30/0269; G06Q 30/0277; G06Q 50/01; G06Q 10/00; G06Q 10/02; G06Q 10/06; G06Q 10/0631; G06Q 20/326; G06Q 20/327; G06Q 20/425; G06Q 30/00; G06Q 30/04; G06Q 30/0601; G06Q 30/0641; G06Q 30/0633; G06Q 10/10; G06Q 20/102; G06Q 20/12; G06Q 20/14; G06Q 20/322; G06Q 30/0207; G06Q 30/0242; G06Q 20/32; G06Q 30/0201; G06Q 30/0252; H04L 67/20; H04L 67/306; H04L 63/08; H04L 67/55; G06K 7/1417
USPC .......................................................... 705/319
See application file for complete search history.

(56) References Cited

U.S. PATENT DOCUMENTS

| | | | | |
|---|---|---|---|---|
| 9,253,198 | B2 * | 2/2016 | Hughes, Jr. | H04L 63/08 |
| 9,659,102 | B1 * | 5/2017 | Cronin | H04L 67/10 |
| 11,354,695 | B1 * | 6/2022 | Sudul | G06Q 30/0223 |
| 11,361,292 | B2 * | 6/2022 | Rathod | G06F 16/535 |

(Continued)

FOREIGN PATENT DOCUMENTS

AU 2021101148 A4 5/2021

OTHER PUBLICATIONS

Competition Between Software-as-a-Service Vendors (Year: 2014).*

(Continued)

*Primary Examiner* — Gautam Ubale

(57) ABSTRACT

Systems and methods are directed to an event management platform which unifies event coordinators, vendors, and mobile application users. In an example implementation, such systems and methods can involve providing an event coordinator interface configured to receive input for first information from an event coordinator for an event, the first information comprising an event location and a start date for the event; providing the event on the event management platform for access to one or more vendors; and providing a vendor interface configured to display the first information for the event and receive input for second information from ones of the one or more vendors registering for the event, the second information comprising a list of proposed products to be sold at the event.

16 Claims, 55 Drawing Sheets

(56) References Cited

U.S. PATENT DOCUMENTS

| | | | | |
|---|---|---|---|---|
| 11,803,805 | B2 * | 10/2023 | Johnson | G06Q 10/087 |
| 2009/0083156 | A1 * | 3/2009 | Cotten | G06Q 40/12 705/14.19 |
| 2010/0241707 | A1 * | 9/2010 | Burton | G06Q 30/06 709/203 |
| 2013/0045753 | A1 * | 2/2013 | Obermeyer | G08B 21/0277 455/456.1 |
| 2013/0282421 | A1 * | 10/2013 | Graff | G06F 16/9535 705/14.27 |
| 2014/0279214 | A1 * | 9/2014 | Wagoner-Edwards | G06Q 30/0633 705/26.8 |
| 2015/0032502 | A1 * | 1/2015 | Green | G06Q 20/203 705/7.29 |
| 2015/0121464 | A1 * | 4/2015 | Hughes, Jr. | G06F 21/31 726/4 |
| 2015/0134439 | A1 * | 5/2015 | Maxwell | G06Q 20/047 705/14.1 |
| 2015/0178721 | A1 * | 6/2015 | Pandiarajan | G06K 19/06112 705/64 |
| 2016/0171545 | A1 * | 6/2016 | Cheung | H04W 4/021 705/14.58 |
| 2018/0047077 | A1 * | 2/2018 | Proietti | G06Q 30/0601 |
| 2021/0264501 | A1 * | 8/2021 | Shah | H04L 63/10 |
| 2021/0279653 | A1 * | 9/2021 | Mashiach | G06Q 10/06 |
| 2022/0072429 | A1 * | 3/2022 | Hewes | A63F 13/80 |

OTHER PUBLICATIONS

Designing interactive scavenger hunt using QR codes (Year: 2014).*
Developing_an_electronic_commerce_platform (Year: 2017).*

* cited by examiner

FIG. 2
Discover food trucks, venues and concerts
Enter city, state or zipcode
Events Near You
See All >
Farmers Market
Smyrna, Ga - Mile
Food Truckapoloza
Atlanta, Ga – 1 Mile
Discover
See All >
Food Trucks
Festivals
Concerts
Fairs

FIG. 4
< Serach
Music Festival
Nov 5, 2021 – Nov 8, 2021
Lorem ipum dolor sit amet, consectetur adipising elit, sed do eiusmod tempor incididunt ut.
Nobby's Fish & Chips
Food Type
Dom's Pizzeria
Food Type

FIG. 8
Cart
Generate Code
Done
Share this code with anyone in your party you wish to pay for.
Hit the share button in the top left to send the code to whomever you need. We will take care of the rest.
8675309

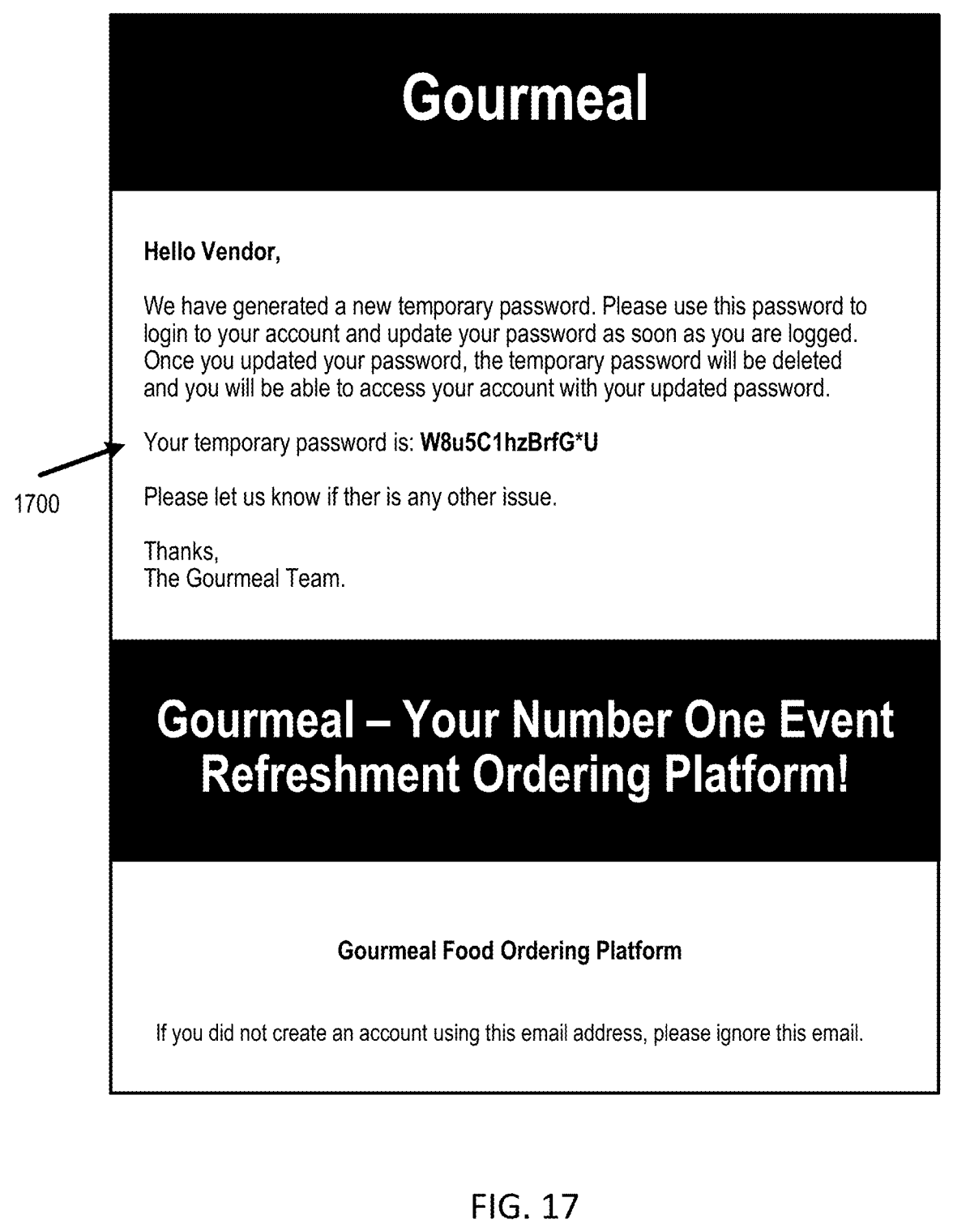

Gourmeal

Hello Vendor,

We have generated a new temporary password. Please use this password to login to your account and update your password as soon as you are logged. Once you updated your password, the temporary password will be deleted and you will be able to access your account with your updated password.

Your temporary password is: **W8u5C1hzBrfG*U**

1700

Please let us know if ther is any other issue.

Thanks,
The Gourmeal Team.

Gourmeal – Your Number One Event Refreshment Ordering Platform!

Gourmeal Food Ordering Platform

If you did not create an account using this email address, please ignore this email.

FIG. 17

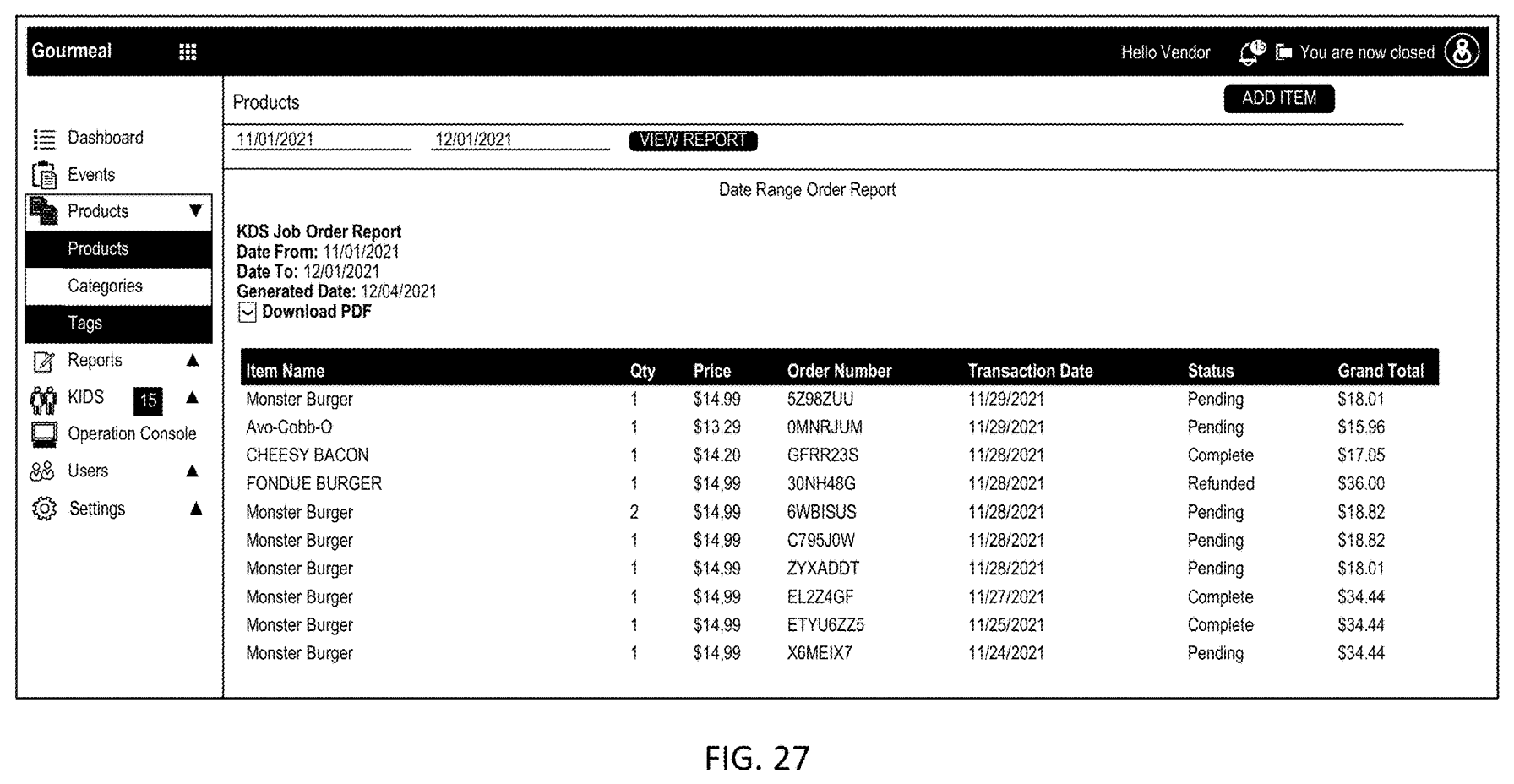

Gourmeal
Hello Vendor
You are now closed

Dashboard
Events
Products
Products
Categories
Tags
Reports
KIDS 15
Operation Console
Users
Settings Products
ADD ITEM
11/01/2021 12/01/2021 VIEW REPORT Date Range Order Report

KDS Job Order Report
Date From: 11/01/2021
Date To: 12/01/2021
Generated Date: 12/04/2021
Download PDF

| Item Name | Qty | Price | Order Number | Transaction Date | Status | Grand Total |
|---|---|---|---|---|---|---|
| Monster Burger | 1 | $14.99 | 5Z98ZUU | 11/29/2021 | Pending | $18.01 |
| Avo-Cobb-O | 1 | $13.29 | 0MNRJUM | 11/29/2021 | Pending | $15.96 |
| CHEESY BACON | 1 | $14.20 | GFRR23S | 11/28/2021 | Complete | $17.05 |
| FONDUE BURGER | 1 | $14,99 | 30NH48G | 11/28/2021 | Refunded | $36.00 |
| Monster Burger | 2 | $14,99 | 6WBISUS | 11/28/2021 | Pending | $18.82 |
| Monster Burger | 1 | $14,99 | C795J0W | 11/28/2021 | Pending | $18.82 |
| Monster Burger | 1 | $14,99 | ZYXADDT | 11/28/2021 | Pending | $18.01 |
| Monster Burger | 1 | $14,99 | EL2Z4GF | 11/27/2021 | Complete | $34.44 |
| Monster Burger | 1 | $14,99 | ETYU6ZZ5 | 11/25/2021 | Complete | $34.44 |
| Monster Burger | 1 | $14,99 | X6MEIX7 | 11/24/2021 | Pending | $34.44 |

FIG. 27

FIG. 30
Gourmeal
Hello Vendor
You are now closed
8
Dashboard
Events
Products
Reports
KIDS
15
Operation Console
Users
Settings
Store Info
Taxes
Payments
Service Charge
RESET
UPDATE
Vendor
*Vendor Name
XYZ Burger
*Vendor Address
1234 Burger Pl Burger, MD
*Address Name
XYZ Burger at Burger MD
*Vendor Email
Hello.vendor@mail.xyz
*Phone Number
(555) 555-3555
Address Type
Business address
Home address
Both are same
*Specify in One Word
nausea

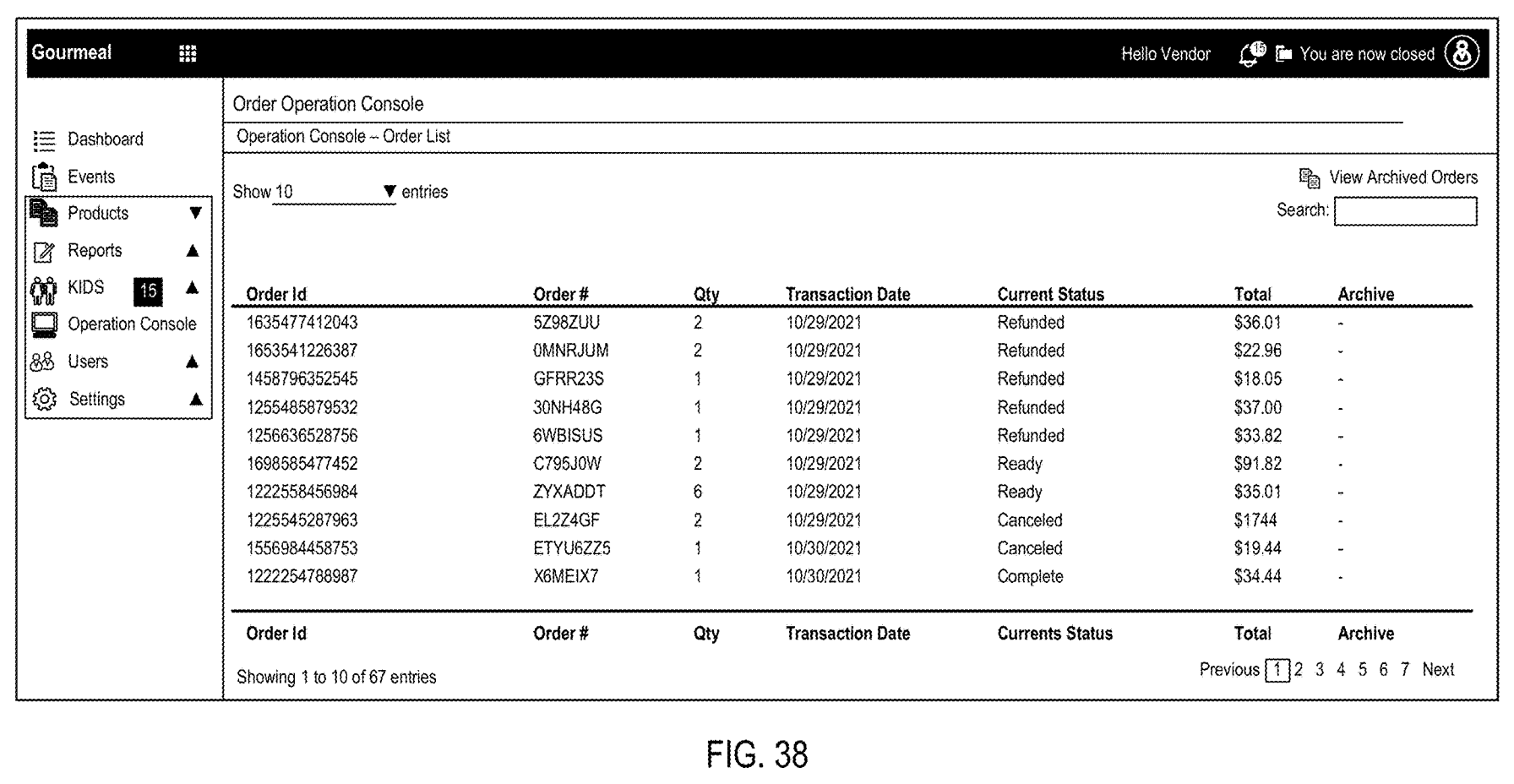

Gourmeal
Hello Vendor
You are now closed

Dashboard
Events
Products
Reports
KIDS 15
Operation Console
Users
Settings

Order Operation Console

Operation Console ~ Order List

Show 10 entries

View Archived Orders

Search:

| Order Id | Order # | Qty | Transaction Date | Current Status | Total | Archive |
|---|---|---|---|---|---|---|
| 1635477412043 | 5Z98ZUU | 2 | 10/29/2021 | Refunded | $36.01 | - |
| 1653541226387 | 0MNRJUM | 2 | 10/29/2021 | Refunded | $22.96 | - |
| 1458796352545 | GFRR23S | 1 | 10/29/2021 | Refunded | $18.05 | - |
| 1255485879532 | 30NH48G | 1 | 10/29/2021 | Refunded | $37.00 | - |
| 1256636528756 | 6WBISUS | 1 | 10/29/2021 | Refunded | $33.82 | - |
| 1698585477452 | C795J0W | 2 | 10/29/2021 | Ready | $91.82 | - |
| 1222558456984 | ZYXADDT | 6 | 10/29/2021 | Ready | $35.01 | - |
| 1225545287963 | EL2Z4GF | 2 | 10/29/2021 | Canceled | $1744 | - |
| 1556984458753 | ETYU6ZZ5 | 1 | 10/30/2021 | Canceled | $19.44 | - |
| 1222254788987 | X6MEIX7 | 1 | 10/30/2021 | Complete | $34.44 | - |
| Order Id | Order # | Qty | Transaction Date | Currents Status | Total | Archive |

Showing 1 to 10 of 67 entries

Previous 1 2 3 4 5 6 7 Next

FIG. 38

SaaS PLATFORM, MOBILE APPLICATION, AND INTERFACE FOR MANAGEMENT BETWEEN COORDINATOR, VENDORS, AND ATTENDEES

CROSS REFERENCE TO RELATED APPLICATIONS

This application claims is priority to International Patent Application No. PCT/US2023/010761, filed on Jan. 13, 2023, which claims priority to U.S. Provisional Patent Application No. 63/299,795, filed Jan. 14, 2022, the contents of which are incorporated herein by reference in its entirety for all purposes.

BACKGROUND

Field

The present disclosure is generally directed to Software as a Service (SaaS) platforms, and more specifically, to systems and methods for management of an event as well as for facilitating payment processing of aggregated orders at an event.

Related Art

In various scheduled events, such as festivals, music concerts, state fairs, food truck events, and so on, the venue may be in an unorganized outdoor setting (e.g., a parking lot for a food truck event or farmers market, a bare plot of land for a state fair, a convention center with scattered booths for a conference, and so on) with various vendors and attendees in attendance. However, due to the unorganized nature and scale of such scheduled events, the attendees may not know what vendors are available at the venue, and/or where in the venue they are located. Further, there are often long lines for many of the vendors at such an event, and the attendee may wish to place an order at the vendor in advance so as to attend other scheduled proceedings at the event (e.g., the start of the ball game, a scheduled conference seminar, etc.).

In addition, the vendors at such an event or venue may require payment processes or payment methods that differ from each other. Such a disparity can lead to frustration for the attendees, who may wish to place a single order across multiple vendors at the event using the same payment process. In the related art, there is presently no solution to allow an attendee to place a single order involving multiple vendors at the event.

Event coordinators planning the scheduled event want to ensure that only the accepted vendors participate in the event. Such event coordinators may also desire to place vendors at specific locations at the venue based on the setup of the rest of the event (e.g., separating different types of vendors at different parts of the venue) or for other planning purposes. Further, to encourage more vendors to participate in the event, the event coordinator needs a platform to solicit invitations from potential vendors to participate at such an event. Once such solicitations are received, there is a need to provide a platform so that the event coordinator can select from the potential vendors and start to accept their menu/goods list for the event. There is also a need to provide a platform to broadcast the scheduled event across potential attendees so that attendees are aware of the upcoming scheduled event.

To extend their business, vendors may wish to participate in upcoming events. However, there is presently no method of knowing which upcoming events are available for them to participate in other than to reach out to event coordinators directly. Accordingly, there is an unmet need for a platform so that vendors can submit applications for scheduled events, along with menu/list of goods for sale at the scheduled event, manage inventory and orders and integrate with the platform's unified payment process.

SUMMARY

Example implementations described herein are directed to a unified Software as a Service (SaaS) platform, mobile application, and interface for management between a coordinator (such as an event or venue coordinator), vendors in the event or venue, and attendees of an event or a venue. The platform and interface for the coordinator allows the coordinator to control the list of vendors at a geofenced event or venue, to place the vendors at desired locations within the geofenced event or venue, as well as to schedule events. The vendors can apply to any venue or scheduled event specified in the SaaS platform and are provided with an interface to allow for remote ordering within the venue or event by the attendees. Attendees can view the location of vendors within the venue or event through the mobile application, select a desired event to attend, as well as place a single order across multiple vendors through a mobile application.

In example implementations described herein, the unified SaaS platform, mobile application, and interface allow for event coordinators to schedule events for selection by potential vendors or attendees on the platform, select accepted vendors for the event, place vendors at desired locations in the venue. Vendors can use the unified SaaS platform, mobile application, and interface to submit applications for scheduled events, along with menu/list of goods for sale for the scheduled event, manage inventory and orders, and integrate with the platform's unified payment processor. Potential attendees can identify and buy tickets to nearby scheduled events on the mobile application, view the venue and the location of all vendors on a geofenced map, buy products across multiple vendors in a single payment at the event once registered at the event, and be provided with a code to pick up goods at a vendor without needing to line up.

The example implementations described herein can be used to facilitate scheduled events at any venue, whether it be an outdoor venue, such as a farmers market or a festival, or an indoor event such as a convention. In addition, although the example implementations described herein are described with respect to a scheduled event, such example implementations can be extended to an indoor restaurant or other setting, such as a shopping mall or food court, in which there are multiple vendors that need to be managed by a coordinator, such as the building landlord or otherwise. In such an example implementation, customers can access the mobile application to select the venue in question, view the available vendors and their location, and place an order across multiple vendors as desired.

Example implementations described herein are described with respect to the provision of food service. However, the example implementations described herein can be extended to any good or service that can be provided at the venue or event, and is not particularly limited thereto. For example, swag, souvenirs, and other goods or services can be made accessible through the mobile application. In an example implementation involving a shopping mall, flea market, or other type of environment in which multiple vendors may be present, it is possible to make disparate goods such as clothes, shoes, shirts, pants, jackets, hats, sunglasses, vehicle parts/components, vehicles, and other goods for sale available through the platform, as well as household goods such as pet toys, cleaning supplies, electric fans, etc.

Although the example implementations herein are described with respect to events, the present disclosure can extend to any type of venue in accordance with the desired implementation, and is not particularly limited thereto. In an example involving a corporate facility, a specific corporate building, or a manufacturing facility, there may be multiple vendors providing food service (e.g., multiple indoor cafeterias, food trucks, other goods/service providers, etc.) to which the present disclosure can be applied. In an example of a manufacturing plant or a corporate facility, there may be numerous ad hoc vendors that provide goods or services indoors and/or outdoors to which the present disclosure can be extended. Examples of services that can also be provided or scheduled through the platform can involve, but are not limited to, legal services, massages, counseling services, oil changes and other vehicle maintenance, food delivery, seminars, and so on, in accordance with the desired implementation.

The example implementations can be extended to any time of venue. For example, example implementations can be applied to ad hoc venues such as streets or city blocks (e.g., for marathons, parades, or city events), open fields, lakes, or any other type of venue in which the boundaries can be defined by Global Positioning Satellite (GPS coordinates), by way points, or by street intersections. Example implementations can also be applied to static venues such as theaters (e.g., movie or play/live theaters), convention centers, concert halls, university campuses, parks, hotels, resorts, airports, and so on. Example implementations can also be applied to dynamic venues such as boats, cruise ships, trains, and so on.

In example implementations described herein, the bill for the delivery can be a single bill across multiple vendors, whereupon funds are allocated accordingly. Further, the funds can be generated from across multiple users if the bill needs to be split across multiple people, in accordance with the desired implementation. The application can be extended to split the bill as needed based on users' desire, and split across vendors as needed.

Aspects of the present disclosure involve an innovative method for payment processing of aggregated order at an event. The method may include performing, using a user terminal, item selection, wherein selected items are associated with a plurality of vendors at the event; grouping, using the user terminal, the selected items into the aggregated order; and performing, using the user terminal, a single payment on the aggregated order.

Aspects of the present disclosure involve an innovative non-transitory computer readable medium, storing instructions for payment processing of aggregated order at an event. The instructions may include performing, using a user terminal, item selection, wherein selected items are associated with a plurality of vendors at the event; grouping, using the user terminal, the selected items into the aggregated order; and performing, using the user terminal, a single payment on the aggregated order.

Aspects of the present disclosure involve an innovative server system for payment processing of aggregated order at an event. The server system may include performing, using a user terminal, item selection, wherein selected items are associated with a plurality of vendors at the event; grouping, using the user terminal, the selected items into the aggregated order; and performing, using the user terminal, a single payment on the aggregated order.

Aspects of the present disclosure involve an innovative system for payment processing of aggregated order at an event. The system can include means for performing, using a user terminal, item selection, wherein selected items are associated with a plurality of vendors at the event; means for grouping, using the user terminal, the selected items into the aggregated order; and means for performing, using the user terminal, a single payment on the aggregated order.

Aspects of the present disclosure can involve a computer program for a mobile application, which can involve instructions for providing a first list of nearby scheduled events, upon selection of an event from the nearby scheduled events, providing a second list of available vendors at the selected event, and facilitating an interface to submit a unified order across one or more of the available vendors at the selected event.

Aspects of the present disclosure can involve a computer program to provide an interface for a SaaS platform, which can involve instructions for selecting a geofenced venue for a scheduled event, receiving a list of potential vendors for the scheduled event, and providing an interface to place selected ones of the potential vendors within the geofenced venue for the scheduled event.

Aspects of the present disclosure can involve a computer program to provide an interface for a SaaS platform, which can involve instructions for providing a first list of scheduled events, upon selection of an event from the first list of scheduled events, providing an interface to submit an application to participate in the selected event and to specify a list of goods/services for the selected event.

Aspects of the present disclosure can involve a method or instructions for a computer program for an event management platform, which can involve providing an event coordinator interface configured to receive input for first information from an event coordinator for an event, the first information comprising an event location and a start date for the event; providing the event on the event management platform for access to one or more vendors; and providing a vendor interface configured to display the first information for the event and receive input for second information from ones of the one or more vendors registering for the event, the second information comprising a list of proposed products to be sold at the event.

Aspects of the present disclosure can involve an event management platform, which can involve means for providing an event coordinator interface configured to receive input for first information from an event coordinator for an event, the first information comprising an event location and a start date for the event; means for providing the event on the event management platform for access to one or more vendors; and means for providing a vendor interface configured to display the first information for the event and receive input for second information from ones of the one or more vendors registering for the event, the second information comprising a list of proposed products to be sold at the event.

Aspects of the present disclosure can involve a method for an event management platform, which can involve providing a list of scheduled events available on the event management platform; and for a selection of an event from the list of scheduled events, providing an vendor interface configured to intake vendor information for registering for the selected event, the vendor information comprising a list of goods or services to be provided for the selected event.

Aspects of the present disclosure can involve a computer program storing instructions for an event management platform, which can involve providing a list of scheduled events available on the event management platform; and for a selection of an event from the list of scheduled events, providing a vendor interface configured to intake vendor information for registering for the selected event, the vendor information comprising a list of goods or services to be provided for the selected event.

Aspects of the present disclosure can involve an event management platform, which can involve means for providing a list of scheduled events available on the event management platform; and for a selection of an event from the list of scheduled events, means for providing a vendor interface configured to intake vendor information for registering for the selected event, the vendor information comprising a list of goods or services to be provided for the selected event

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 17 illustrates an example forget password email generated through the vendor management console, in accordance with an example implementation.

FIG. 27 illustrates an example order report screen of the vendor management console, in accordance with an example implementation.

FIG. 38 illustrates an example order operation console screen of the vendor management console, in accordance with an example implementation.

DETAILED DESCRIPTION

Figure 1:
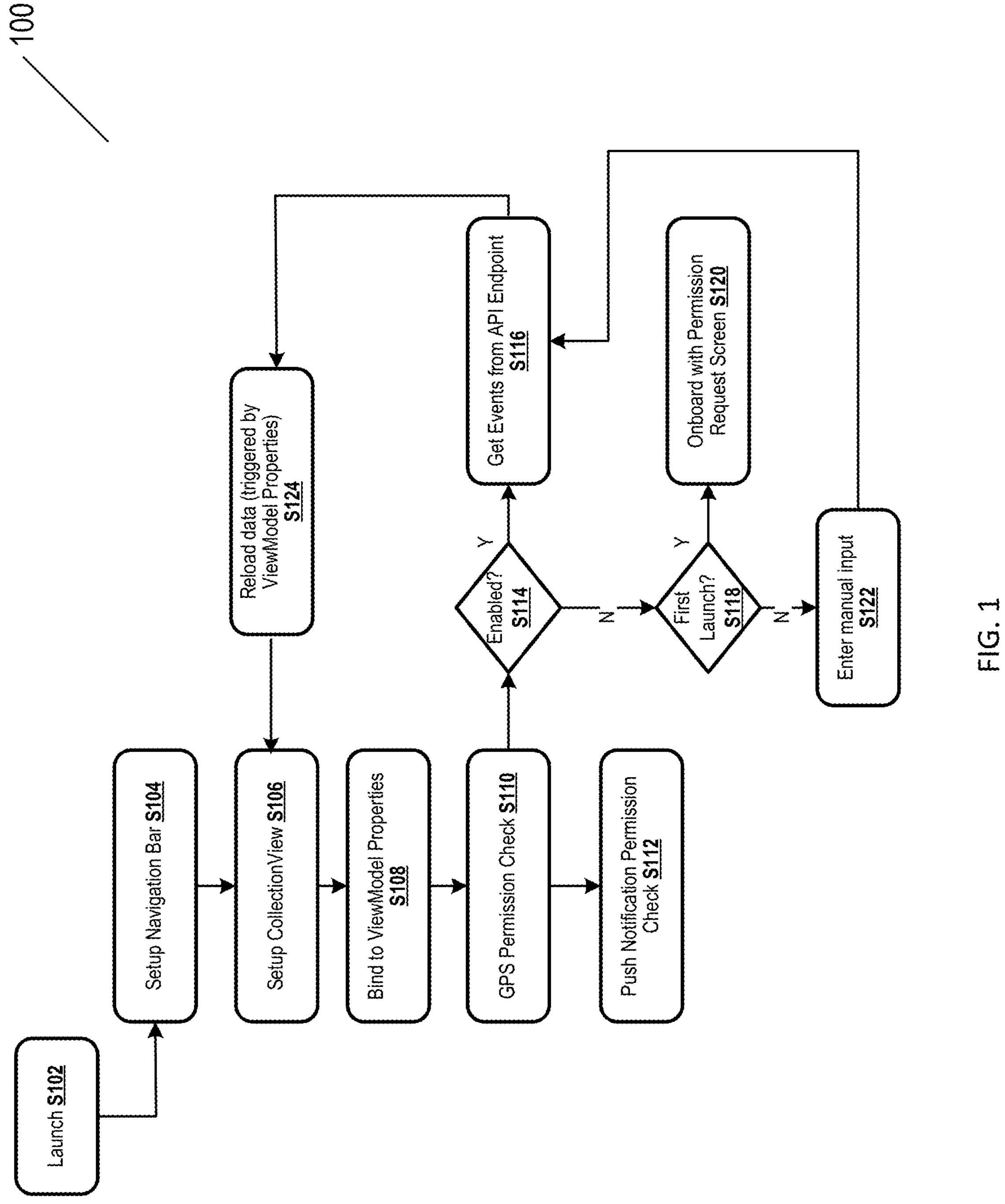
FIG. 1 illustrates an example application launch process for an example mobile application, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations are directed to a unified Software as a Service (Saas) platform, mobile application, and interface for event management between an event or venue coordinators, vendors in the event or venue, and attendees of an event or a venue. The coordinators can use the platform and interface to control the list of vendors at a geofenced event or venue, to place the vendors at desired locations within the geofenced event or venue, and to schedule events. The vendors can apply to any venue or scheduled event specified in the platform and are provided with the interface to allow for remote ordering within the venue or event by the attendees. Attendees can view the location of vendors within the venue or event through the mobile application, select a desired event to attend, as well as place a single grouped order across multiple vendors through the mobile application.

The user mobile application enables communication between one or more customers and one or more vendors during a single transaction. Multiple customers can make their selections, add them to their cart, and aggregate those selections to a single person in their party who will pay for the entire party, or complete the checkout process on their own with the selected items they added to their own cart. Multiple vendors' items can be added to the cart and checked out in one with, and the transaction is split accordingly among the various vendors. In traditional e-Commerce applications, the checkout process is transactional with a single vendor at a time. The mobile application facilitates transacting with multiple vendors through one customer flow. While examples provide for mobile application and platform used in association with food industry, application of the general protocol is not so limiting and can be utilized/applied in other industries as well.

FIG. 1 illustrates an example application launch process 100 for an example mobile application, in accordance with an example implementation. When users launch the mobile application, they are presented with an onboarding permission request flow where they are presented with permission requests such as permission to access user location, permission to push notifications to their device, and so on in accordance with the desired implementation.

The process begins with a user launching the mobile application at S102. At S104, the navigation bar/search bar associated with location input is then setup. At S106, Collection View is setup subsequent to setting up the search bar. Collection View manages the listing of data using layout specifications. The process then continues to step S108, where ViewModel properties are bound. ViewModel represents data to be displayed on the user mobile application.

At S110, a GPS permission check is performed, which leads to step S114, where a determination is made as to whether GPS permission is enabled. If the answer is yes at S114, then the process continues to S116, where event information based on GPS data is retrieved from application programming interface (API) endpoint. The retrieved event information is then loaded/reloaded at S124. The process then returns to S106, where Collection View is setup to incorporate the loaded/reloaded data. Step S112 is performed in parallel with S114, where push notification permission check is performed to determine whether push notification is permitted.

If the answer is no at S114, then the process continues to S118, where a determination is made as to whether the current application launch is a first launch. If the answer is yes, then the process continues to S120, where onboarding is performed with the permission request screen. If the answer is no, at S118, then manual input of location information is performed by the user. The process then continues to S116, where event information based on GPS data is retrieved from application programming interface (API) endpoint. The retrieved event information is then loaded/reloaded at S124. The process then returns to S106, where Collection View is setup to incorporate the loaded/reloaded data.

Requests such as permission to access user location and push notification on device are used for facilitating checkout and status update on the status of the user order. The user lands on the dashboard screen which displays events and event categories local to them. The user can search for events by certain search criteria and, when an event is selected, the user can view the event details, which principally displays a list of vendors at the event. When the user selects a vendor, they can see the vendor menu items. The user can make customizations to menu items and add the items to the user cart. The user can continue to make selections from the same vendor or add items from different vendors.

Once the user checks out an order, the order will be sent to the vendor for processing. Upon successfully completing the transaction, the user is taken to a screen where they can be updated with status of the order. When the order is ready for pickup, the user is notified by the desired means (in-app, email, text message, push-notification, and so on). The user can create an account for their desired order preferences to be stored so that checkout is facilitated in a streamlined manner. The user can view order history, view account information, make account modifications, and view company policies from a menu that has secondary information according to the application information architecture.

Mobile Application

Figure 2:
FIG. 2 illustrates an example dashboard screen of a user mobile application, in accordance with an example implementation.

FIG. 2 illustrates an example dashboard screen of a user mobile application, in accordance with an example implementation. The dashboard screen is where the user is shown events that are local to them. The user can view a limited selection of events from this screen, can be navigated to a screen which shows a complete list of events that are local to them, and can also view these events based on various properties which allow for the events to be grouped and categorized. As illustrated in FIG. 2, the dashboard includes a search bar for location selection. User input or selection of the search bar leads to a search screen.

The dashboard displays information including, but not limited to, recommended events, event vendors, foods, other commercial products for sale, etc. List of recommendations or information can be sorted based on metrics and preferences obtained from user. In some example implementations, direct ad placement from vendors and event coordinators is inserted between recommendations or provided information at different stages of mobile application use.

Figure 3:
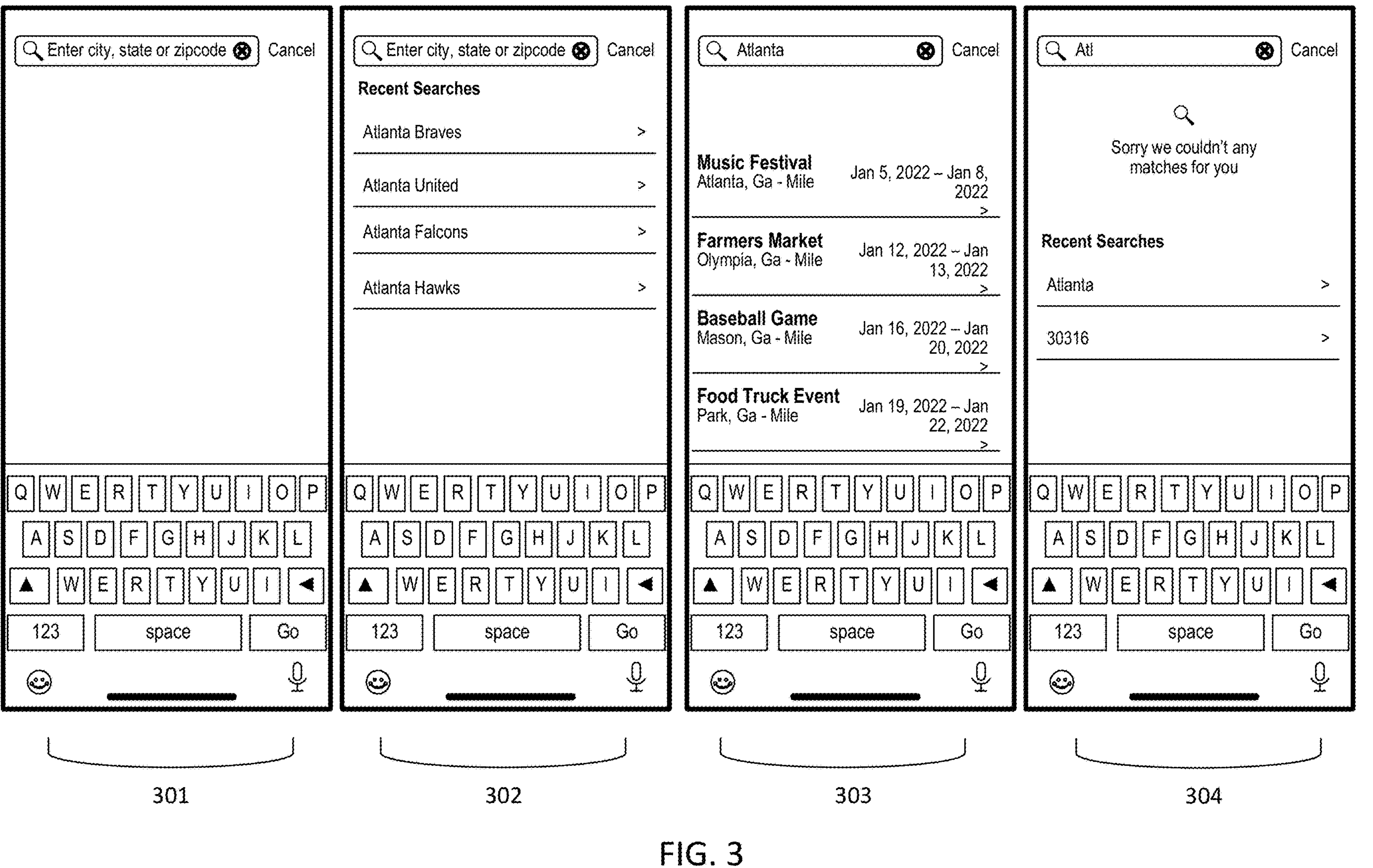
FIG. 3 illustrates an example search screen shown in the user mobile application, in accordance with an example implementation.

FIG. 3 illustrates an example search screen shown in the user mobile application, in accordance with an example implementation. The search screen enables the user to search for events in an area that is different from the current location of the user. If users are traveling and would like to see events that are in their destination, then they can search by city, state, zip code, or other location-driven metrics as shown in screen 301. Previous searches can also be provided based on the input search as shown in screen 302, depending on the desired implementation. If events are found, then a list of events matching the query criteria will be displayed as shown in screen 303. If no events are found, then the user will be presented with their previous search terms as shown in screen 304. In some example implementations, recommendations are generated and displayed when no result is found.

Figure 4:
FIG. 4 illustrates an example event details screen shown in the user mobile application, in accordance with an example implementation.

FIG. 4 illustrates an example event details screen shown in the user mobile application, in accordance with an example implementation. The event details screen displays event-specific information to the user after user selects an event. The event details screen includes a list of vendors located at the selected event, a description of the event, and gives the user the ability to sort and filter the list of vendors based on vendor and menu properties which allow for the user to optimize vendor selection. Taking FIG. 4 as example, the user selected event is "Music Festival" and detailed information such as event time and description is displayed below the event title. In addition, a list of vendors is populated below the event information (e.g., Nobby's Fish & Chips and Dom's Pizzeria). In addition, listing of recommendations or information can be sorted based on metrics and preferences obtained from the user.

Figure 5:
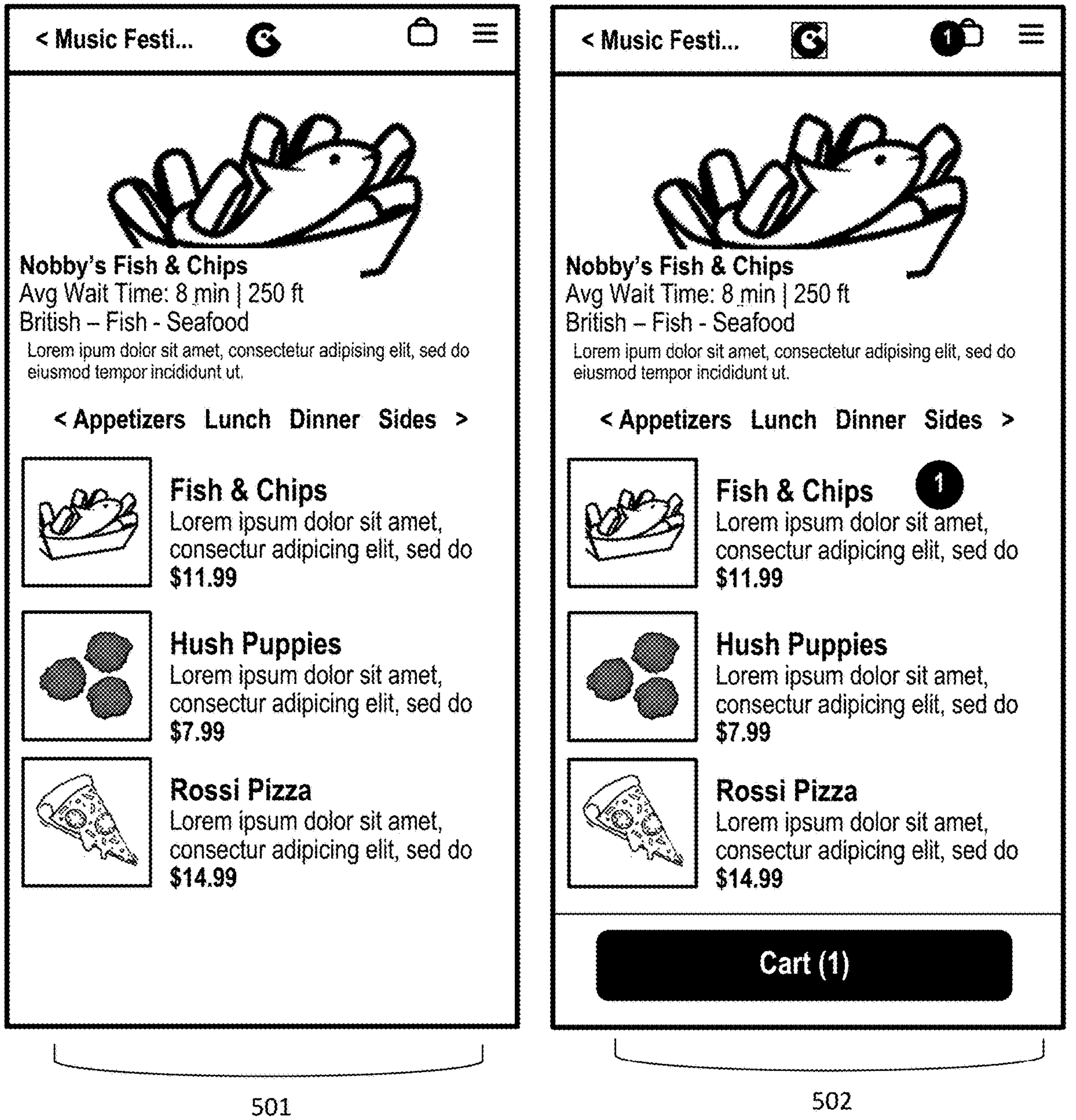
FIG. 5 illustrates an example vendor details screen shown in the user mobile application, in accordance with an example implementation.

FIG. 5 illustrates an example vendor details screen shown in the user mobile application, in accordance with an example implementation. The vendor details screen displays vendor-specific information to the user after user selects a vendor from the event details screen of FIG. 4. The vendor details screen displays details of the vendor to the user. A list of menu items to the user is presented chunked by menu sections as shown at screen 501. The user can select menu items and see the associated item details in the menu item details screen, which is described in more details below. In some example implementations, a list of vendors that other users have also ordered from when they purchased items from the user selected vendor is populated as recommendation for the user. As illustrated in FIG. 5, once an item selection (Fish & Chips) is made by the user, the item is added to the cart as shown at screen 502. In some example implementations, future event information/upcoming event information for which the vendor is associated with is displayed on the vendor details screen.

Figure 6:
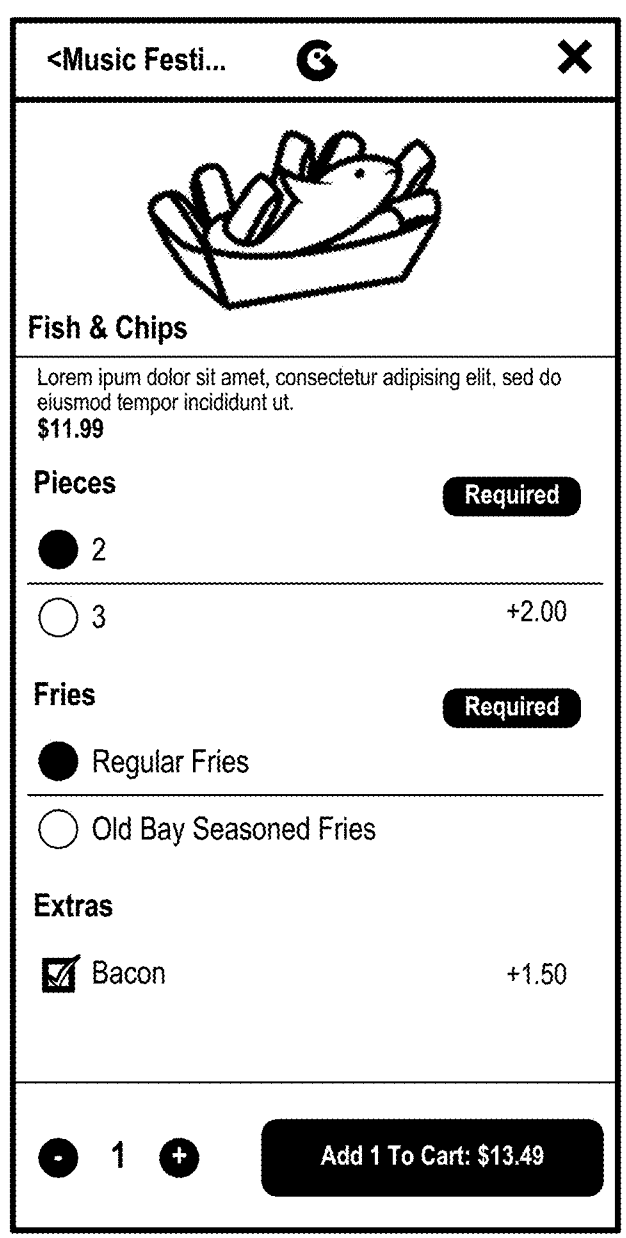
FIG. 6 illustrates an example menu item details screen shown in the user mobile application, in accordance with an example implementation.

FIG. 6 illustrates an example menu item details screen shown in the user mobile application, in accordance with an example implementation. The menu item details screen allows the user to make customization to the item, such as, but not limited to, food variant selection, topping selection, side selection, etc. Then the user can add the item to their cart. The user can see an update of the item's pricing based on the selections made. Taking FIG. 6 as example, the addition of "Bacon" as extra to a regular order of "Fish & Chips" will result in a update of pricing from $11.99 to $13.49.

Figure 7A:
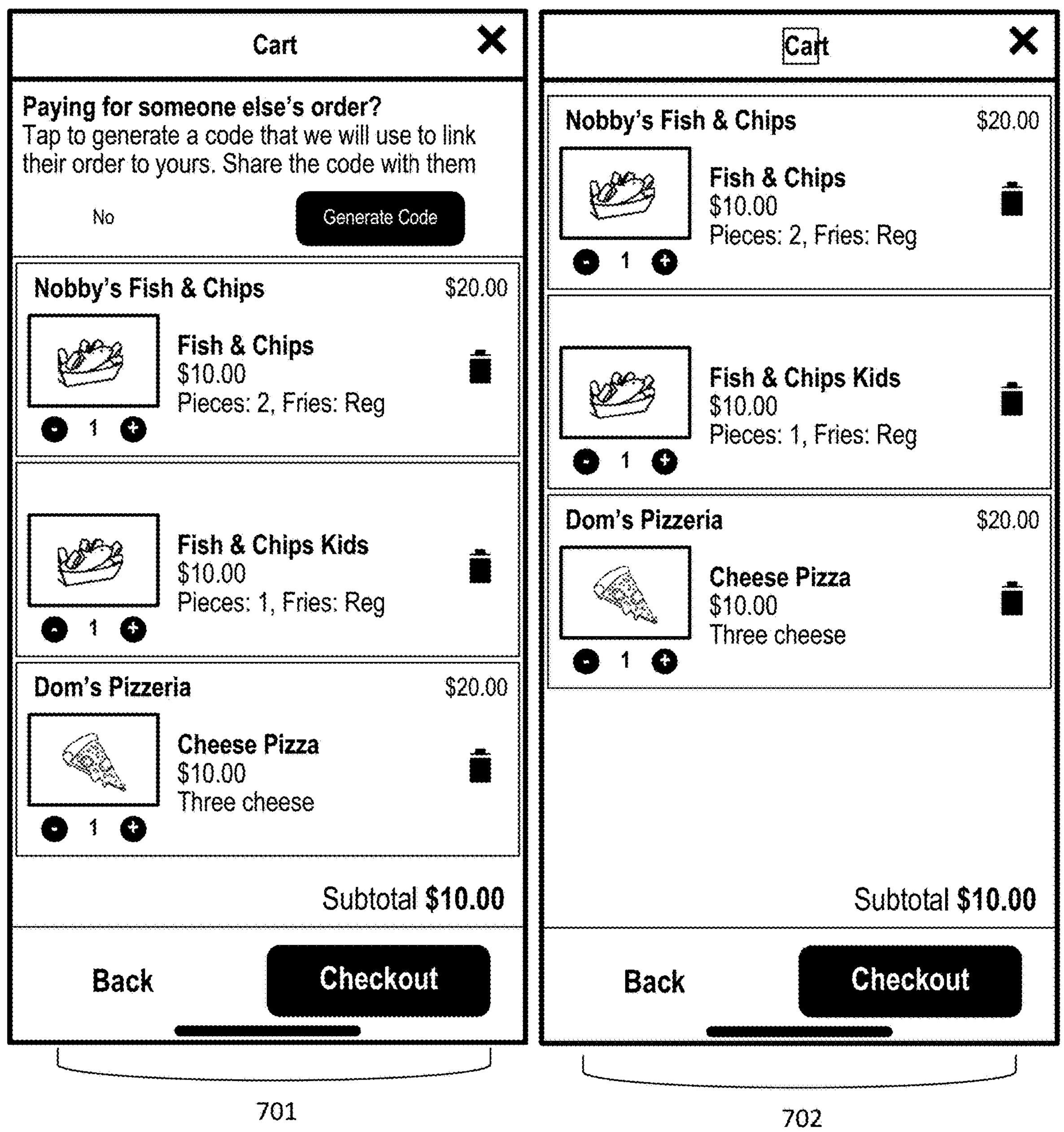
FIG. 7(A) illustrates an example cart screen shown in the user mobile application, in accordance with an example implementation.

FIG. 7(A) illustrates an example cart screen shown in the user mobile application, in accordance with an example implementation. The cart screen as shown at 701 and 702 enables users to edit their selections by incrementing or decrementing the number of selected items in their cart. The user can also delete an item from their cart.

Figure 8:
FIG. 8 illustrates an example single-use code shown in the user mobile application, in accordance with an example implementation.

If a user is paying for other users in their party, a single-use code, such as a Quick Response (QR) code, can be generated by selecting "Generate Code" as illustrated at screen 701 in FIG. 7(A). The generated code can then be shared with members of the party. FIG. 8 illustrates an example single-use code shown in the user mobile application, in accordance with an example implementation.

Figure 7B:
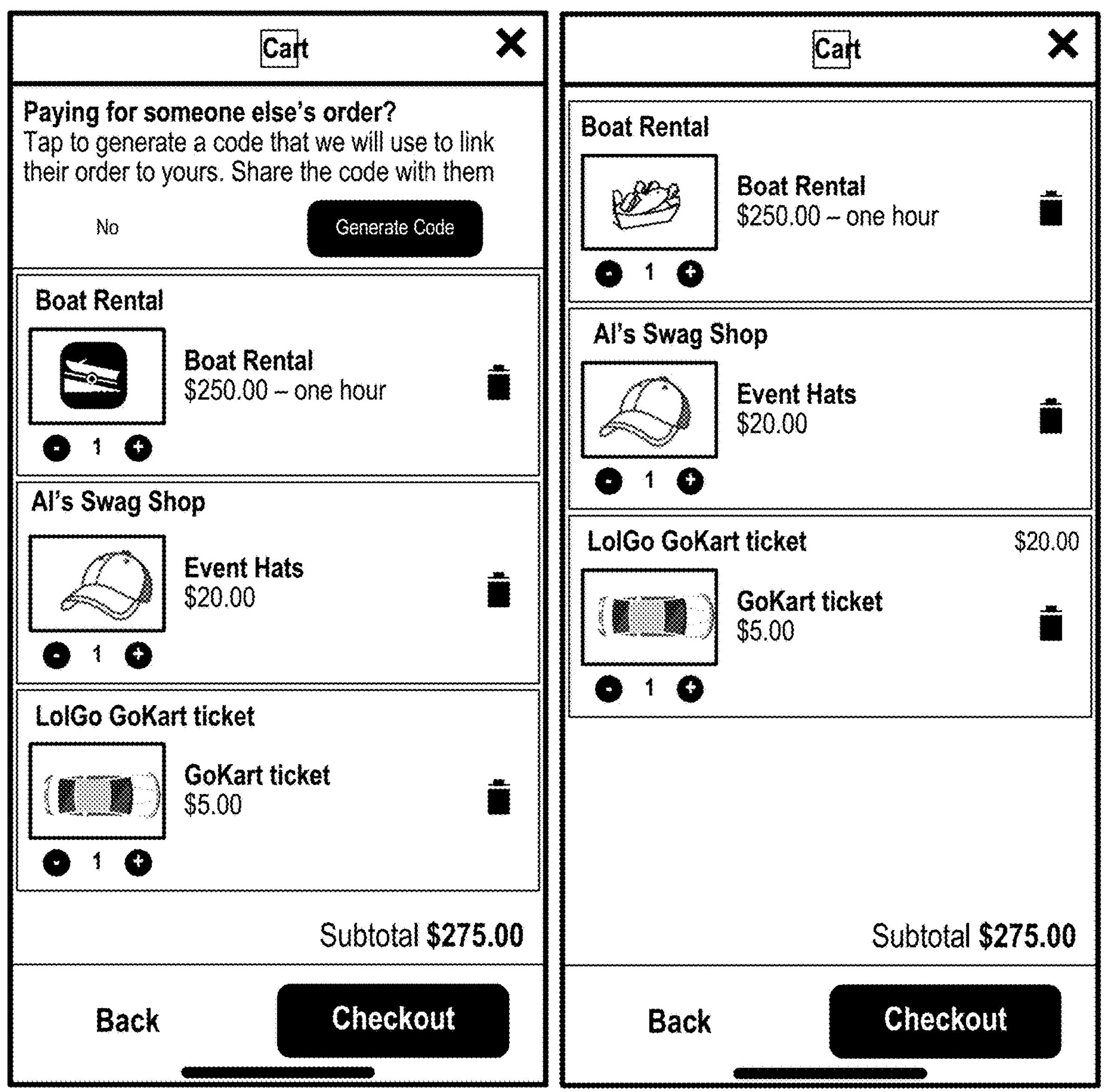
FIG. 7(B) illustrates an example cart screen involving orders across multiple vendors and vendor types aggregated into a single order, in accordance with an example implementation.

FIG. 7(B) illustrates an example cart screen involving orders across multiple vendors and vendor types aggregated into a single order, in accordance with an example implementation. Although the above examples involved food, the present disclosure is not limited thereto, and any accepted vendor participating in the event can be incorporated into the same purchase order, regardless of the type of vendor. In this example, several different vendors (boat rental, swag shop, gokart ticket) are involved in the same transaction, even though they have different types of goods/services available. In this manner, all of the event vendors can be made accessible through the mobile application interface and aggregated into the same purchase order.

Figure 9:
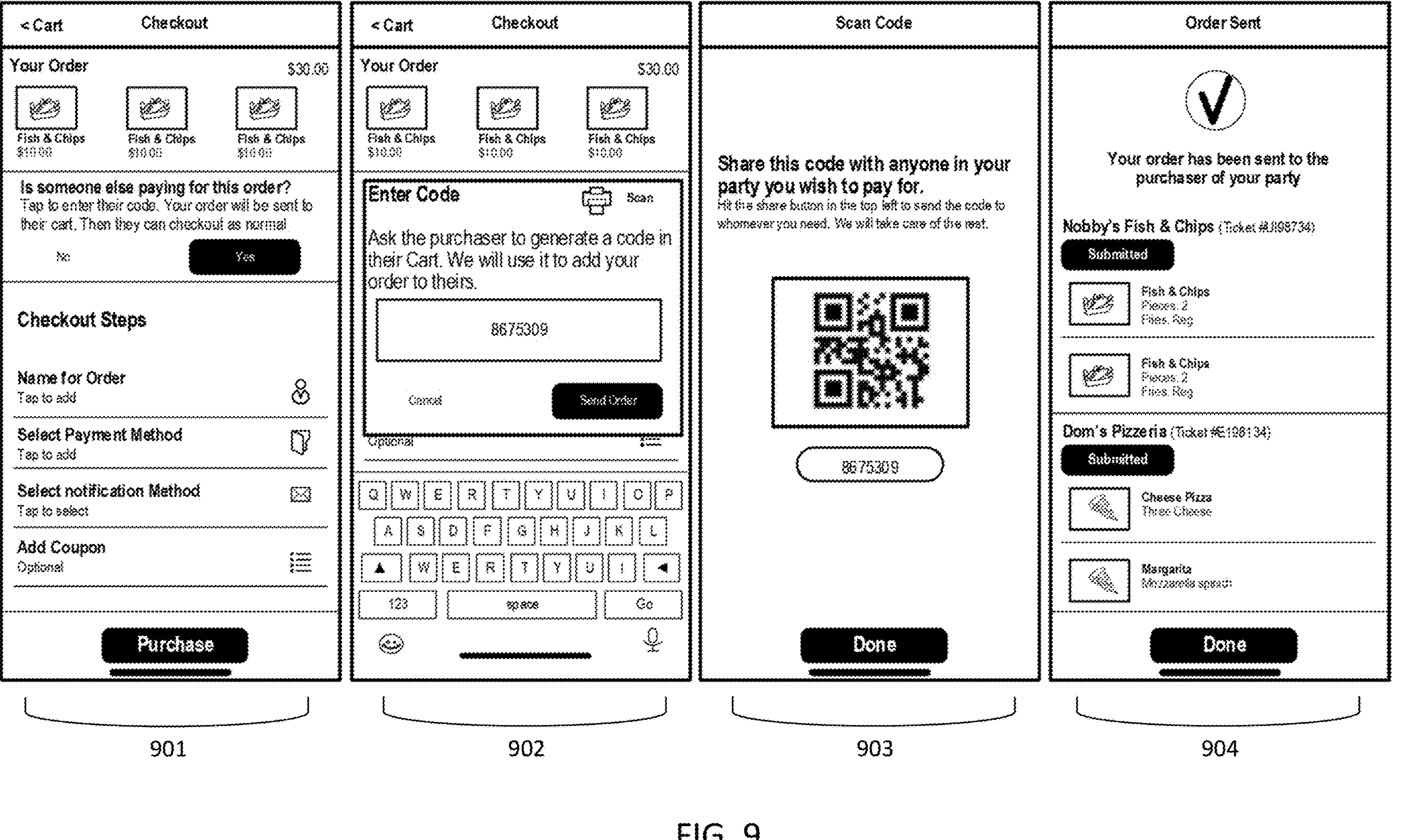
FIG. 9 illustrates an example payment sequence shown in the user mobile application using the single-use code of FIG. 8, in accordance with an example implementation.

FIG. 9 illustrates an example payment sequence shown in the user mobile application using the single-use code of FIG. 8, in accordance with an example implementation. Members of the party can search in the mobile app on their mobile devices and make item selections, add them to their respective carts, and then submit their selections to the user who generated their code by entering the code in their respective carts. The code can be received through a text message and entered manually at a party member's mobile terminal/smart device on which the mobile application operates on. In some example implementations, instead of having a party member enter the code manually, the code can be automatically populated by scanning the single-use code using an image capturing device such as a camera located at a party member's mobile terminal. As illustrated in FIG. 9, after items have been selected and placed in the cart, a user is prompted with the query whether someone else would be paying for the order as shown at screen 901. The second sequence of FIG. 9 illustrates inputting of the single-use code after a user selects the option of payment by a party member as shown at screens 902 and 903. A paying customer/party member completes the checkout process, by which the individual provides a name for the order, payment information, a desired method of notification on the status of the order, and then completes the transaction. After which, a confirmation is received and displayed on the user's mobile application as shown at screen 904.

Figure 10:
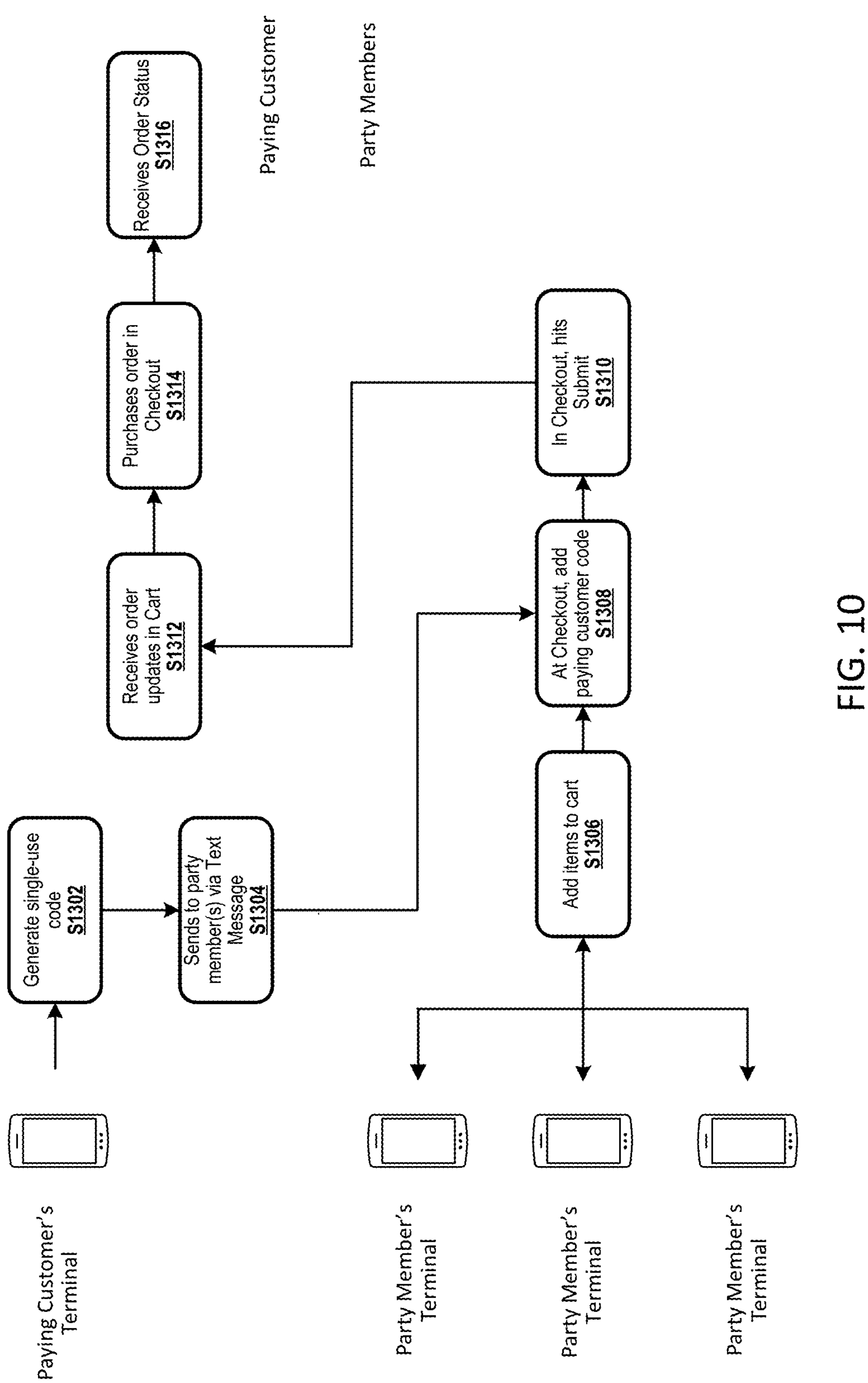
FIG. 10 illustrates an example payment process using the mobile application, in accordance with an example implementation.

FIG. 10 illustrates an example payment process using the mobile application, in accordance with an example implementation. At S1302, the paying customer generates a single-use code at the paying customer's terminal (e.g. smart device) on which the mobile application operates. At S1304, the generated code is sent to party members at their terminals. In some example implementations, the code is sent by way of text message. At S1306, the party members make item selections and add them to their carts. The process then continues to S1308, where the single-use code is received and added at checkout. At S1310, the order is submitted. On completion of S1310, the paying customer receives order updates in the cart of the paying customer's mobile application at S1312. The paying customer then makes the purchase order in checkout at S1314. At S1316, the paying customer's mobile application receive order status associated with the order placed at S1314.

Figure 11:
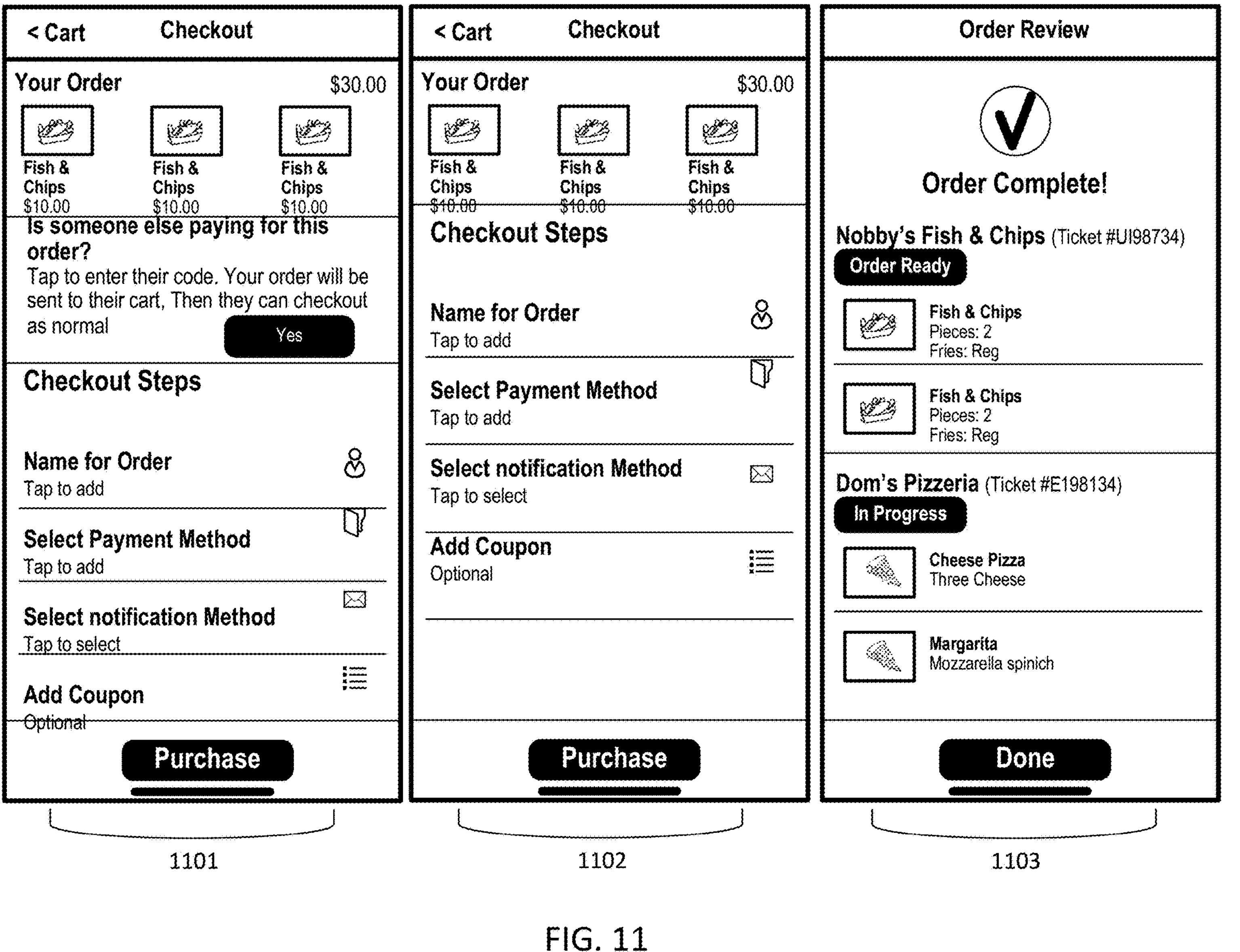
FIG. 11 illustrates an example checkout screen shown in the user mobile application, in accordance with an example implementation.

FIG. 11 illustrates an example checkout screen shown in the user mobile application, in accordance with an example implementation. The checkout screen is provided where the user can satisfy all requirements for successfully completing the financial transaction for the order. For instance, the user may need to provide a name for the order, a form of payment, a coupon code, a payee code if the user intends for someone else to pay for their order, a notification method to be updated on the status of their order, and so on, as illustrated in the screens 1101 and 1102 of FIG. 11. Upon successfully completing the transaction, the user is taken to a screen where they can be updated with the status of the order (continuous update of order status facilitated via secure WEBSOCKET connection or similar technology) as shown at screen 1103. Once the order is ready for pickup, the user is notified by the desired communication means, including, but not limited to, in-app, email, text message, push-notification, and so on. The user can create an account for their desired order preferences to be stored so that checkout is facilitated in a streamlined manner.

In some example implementations, users can identify and store vendor information for their favorite vendors. Additionally, users can provide review ratings for, and interact with vendors that they purchased from through the mobile application. In some implementations, platform or vendor loyalty rewards program is implemented and can be accessed through user profile section of the mobile application.

Users/attendees can order goods or food through the mobile application, and pick up the order at a designated walk-in location within the vendor's location (e.g., indoor or outdoor, etc.). In some example implementations, users can also pick up order through a drive through. In a geofenced or other defined indoor/outdoor environment, the goods/food can be delivered to a waypoint within the environment (e.g., to a stall indicated by an umbrella or other indicia, etc.), or can be delivered to a specific seat if the environment is a stadium, food court, restaurant, or other type of venue with designated seating. In some example implementations, food assembly is performed by indoor/outdoor vendors such as food trucks and sent to a waypoint for order pick up. Further, the goods/food can be assembled by staff of the venue at a specific waypoint through the interface in accordance with the desired implementation.

Example implementations can also be extended to restaurants with seating. For example, the user/attendee can indicate the seat that they are sitting in and order food through the interface, whereupon the food can be delivered to that specific seat in accordance with the desired implementation.

While examples illustrate mobile application use in an event setting, any type of restricted environment can be applied, and the present disclosure is not limited thereto. For example, the restricted environment can be a block in a street (e.g., a street block with restaurants), can be a list of locations that are participating in a virtual reality (e.g., metaverse) environment or augmented reality fenced environment, can be restricted by specific wi-fi connections (e.g., city wi-fi, venue wi-fi, etc.), by a box or other boundary defined by GPS coordinates, etc.

Vendor Management Console

The vendor management console enables a vendor to manage events it registers to, the food items or products it will provide at the event, and food production and management during the event, through a series of user interface (UI) screens and forms. Functionalities of the vendor management console include, but not limited to, vendor registration, vendor login, vendor account maintenance, data visualization, product listing, vendor plan subscription, data management, product/food stock information, event information and registration, sales tax information and definition, sub-account generation, etc. A vendor can register for an event and add their menu items using the vendor management console. The input data or added menu items populates databases for events and the same data is provided to the user/attendee mobile application so event attendees can view menus and complete orders.

Figure 12:
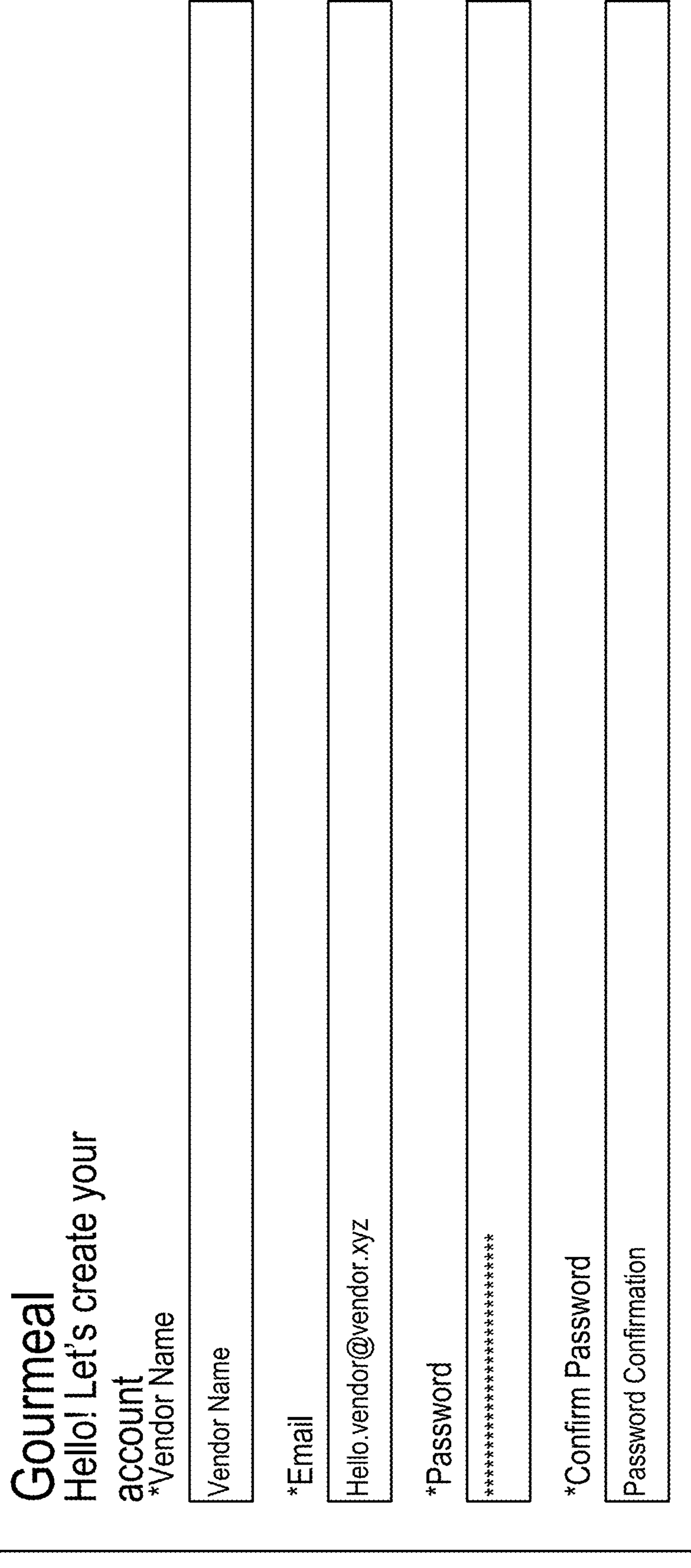
FIG. 12 illustrates an example vendor registration screen of a vendor management console, in accordance with an example implementation.

FIG. 12 illustrates an example vendor registration screen of a vendor management console, in accordance with an example implementation. The vendor registration screen allows the vendor to log on to their vendor management console site. Vendors can use the vendor registration screen to create their accounts using user generated username, password, password confirmation, and so on.

Figure 13:
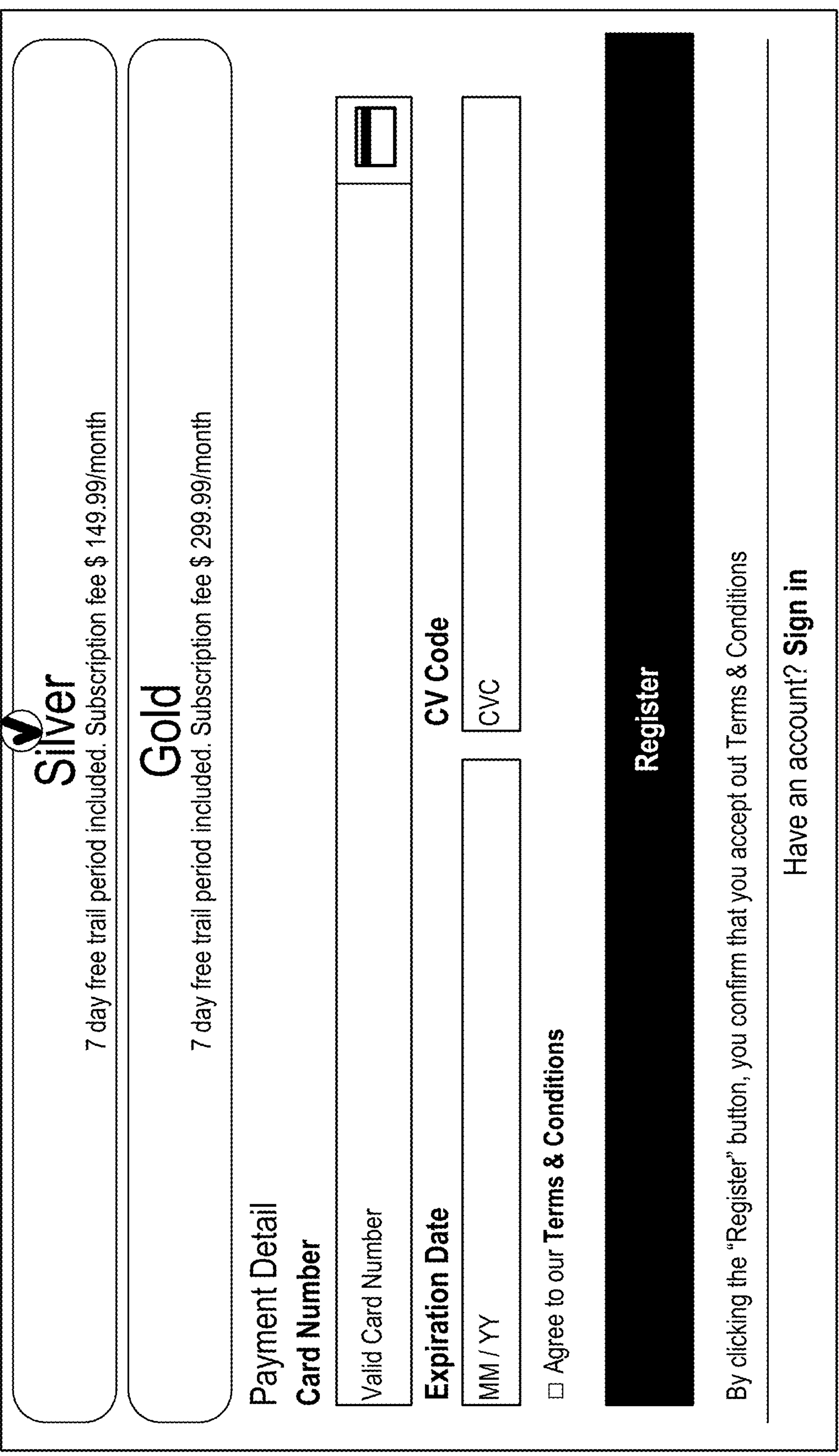
FIG. 13 illustrates an example vendor subscription screen of the vendor management console, in accordance with an example implementation.

FIG. 13 illustrates an example vendor subscription screen of the vendor management console, in accordance with an example implementation. The vendor subscription screen allows vendors to select their subscription service level. As illustrated in FIG. 13, vendors may choose from different levels of subscription service. Such levels may include, but not limited to, silver, gold, platinum, and so on. Vendors can enter their payment information and click "Agree to our Terms & Conditions" to complete vendor registration.

Figure 14:
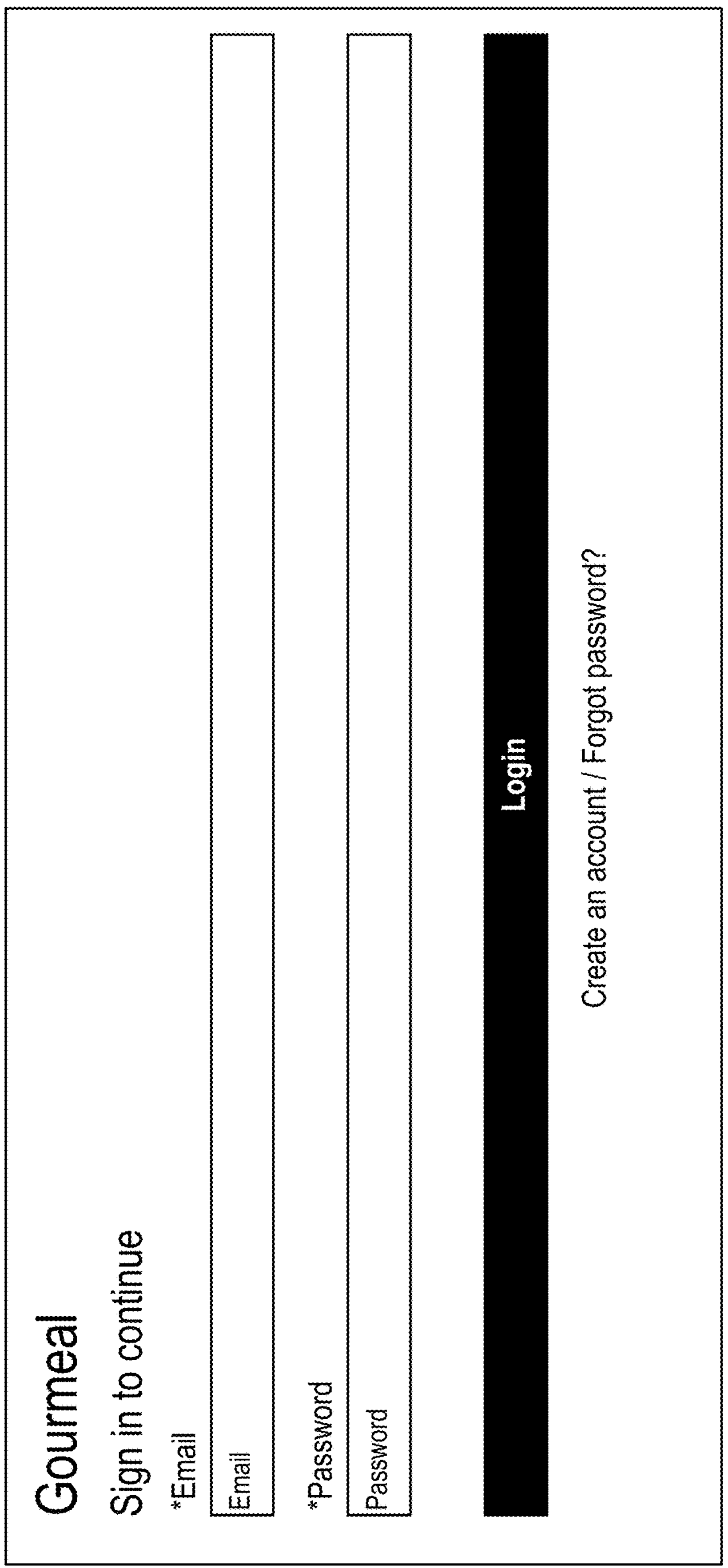
FIG. 14 illustrates an example vendor login screen of the vendor management console, in accordance with an example implementation.

FIG. 14 illustrates an example vendor login screen of the vendor management console, in accordance with an example implementation. Vendor can log in by entering vendor's login credentials (e.g., email address, password, and so on) after completing of the vendor registration process. If a vendor has yet to create an account, a link is provided that takes the vendor to the vendor registration screen of FIG. 12. The vendor login screen also allows for password retrieval in the event that the vendor has forgotten vendor's login credentials. This takes the vendor to a forgot password screen, which is described in more details below.

Figure 15:
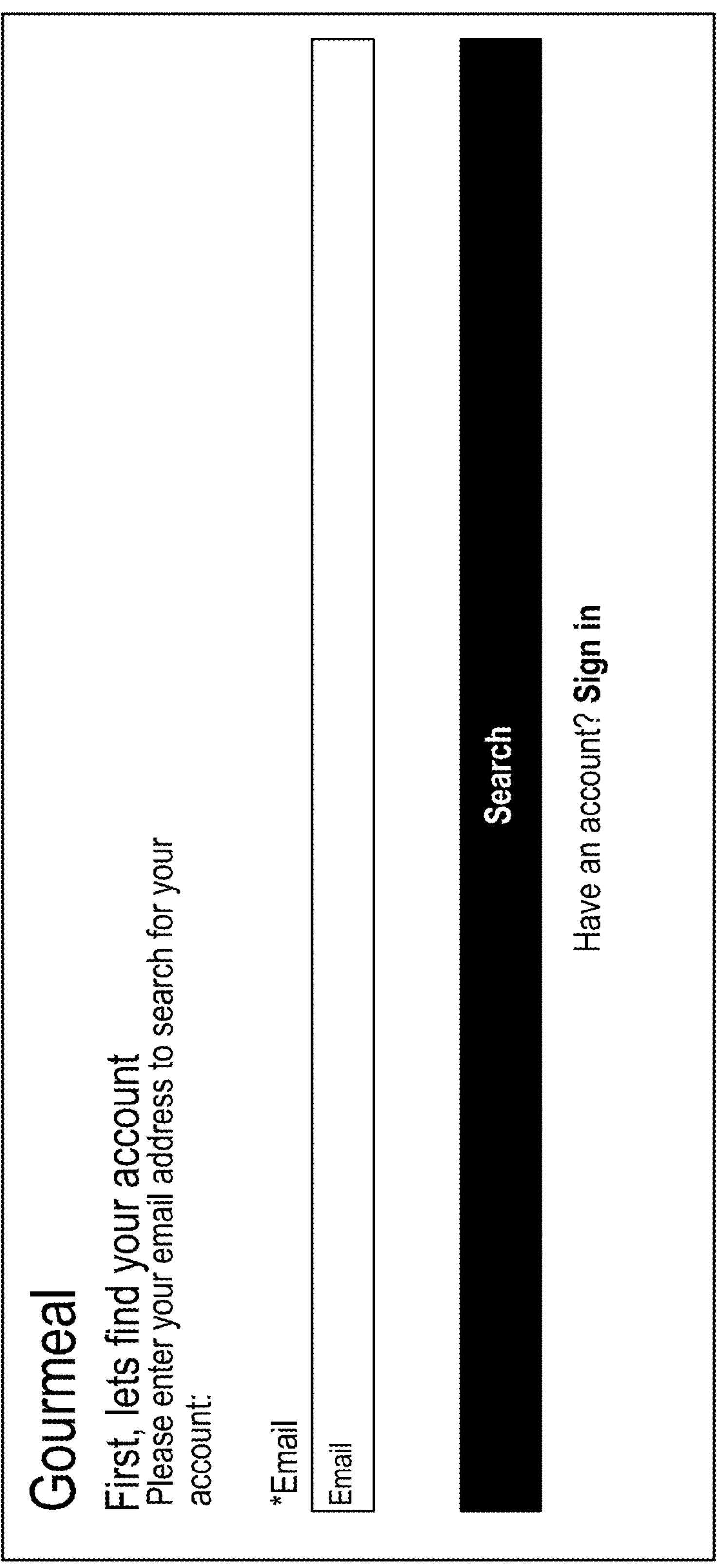
FIG. 15 illustrates an example forgot password screen of the vendor management console, in accordance with an example implementation.

FIG. 15 illustrates an example forgot password screen of the vendor management console, in accordance with an example implementation. The forgot password screen allows for vendors to recover/reset password and retrieval login information. The recovery process is initiated by entering the email address associated with the account. Subsequent to entering the email address, vendors are prompted with security validation questions for the purpose of identity verification.

Figure 16:
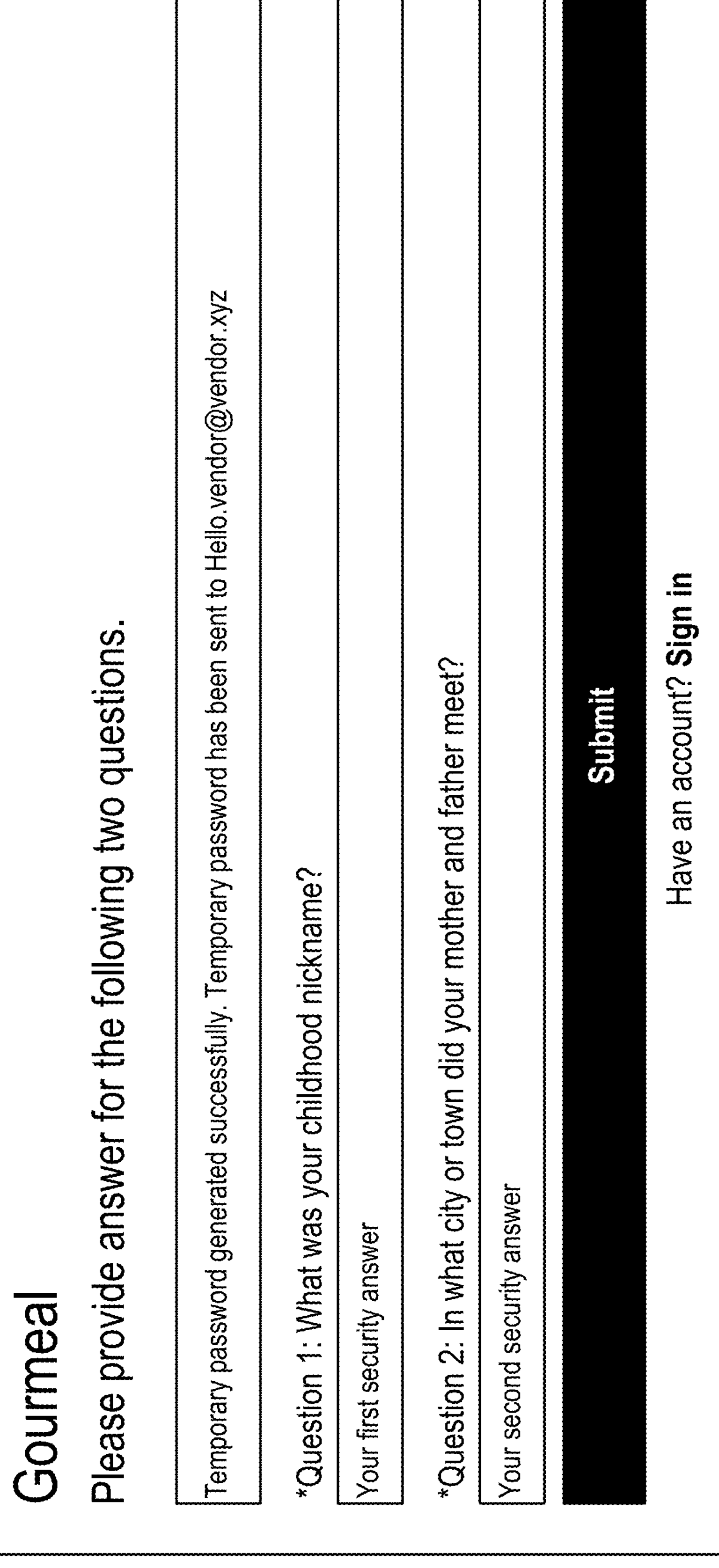
FIG. 16 illustrates an example security validation screen of the vendor management console, in accordance with an example implementation.

FIG. 16 illustrates an example security validation screen of the vendor management console, in accordance with an example implementation. The vendor must correctly answer a threshold number of security questions before a temporary password can be generated. Upon successfully answering the threshold number of security questions, a temporary password is then generated and embedded in an email to be sent to the email address on file.

FIG. 17 illustrates an example forget password email generated through the vendor management console, in accordance with an example implementation. Vendor receives the forget password email with the temporary password upon passing the security validation screen of FIG. 16 as shown at 1700. Using the temporary password, the vendor can now log into the vendor account to reset account's password.

Figure 18:
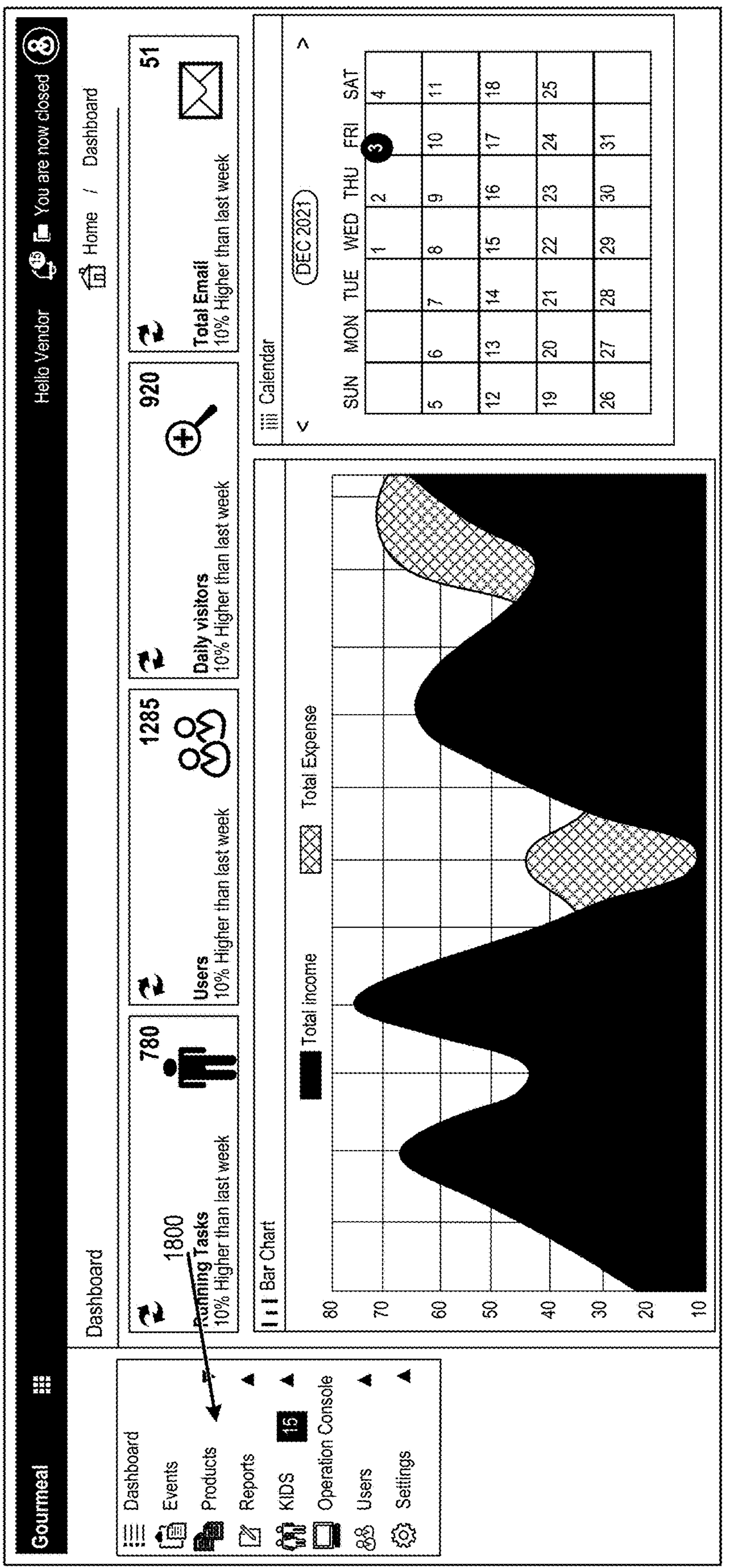
FIG. 18 illustrates an example dashboard display of the vendor management console, in accordance with an example implementation.

FIG. 18 illustrates an example dashboard display of the vendor management console, in accordance with an example implementation. The vendor gains access to the dashboard screen on logging into the vendor management console. Vendor management console functionalities can be accessed via a side bar menu as indicated by the arrow 1800. Data visualization of various metrics can be performed and displayed as illustrated in FIG. 18. Such metrics include, but not limited to, sales information, visitor count, traffic information, inventory, and so on.

Figure 19:
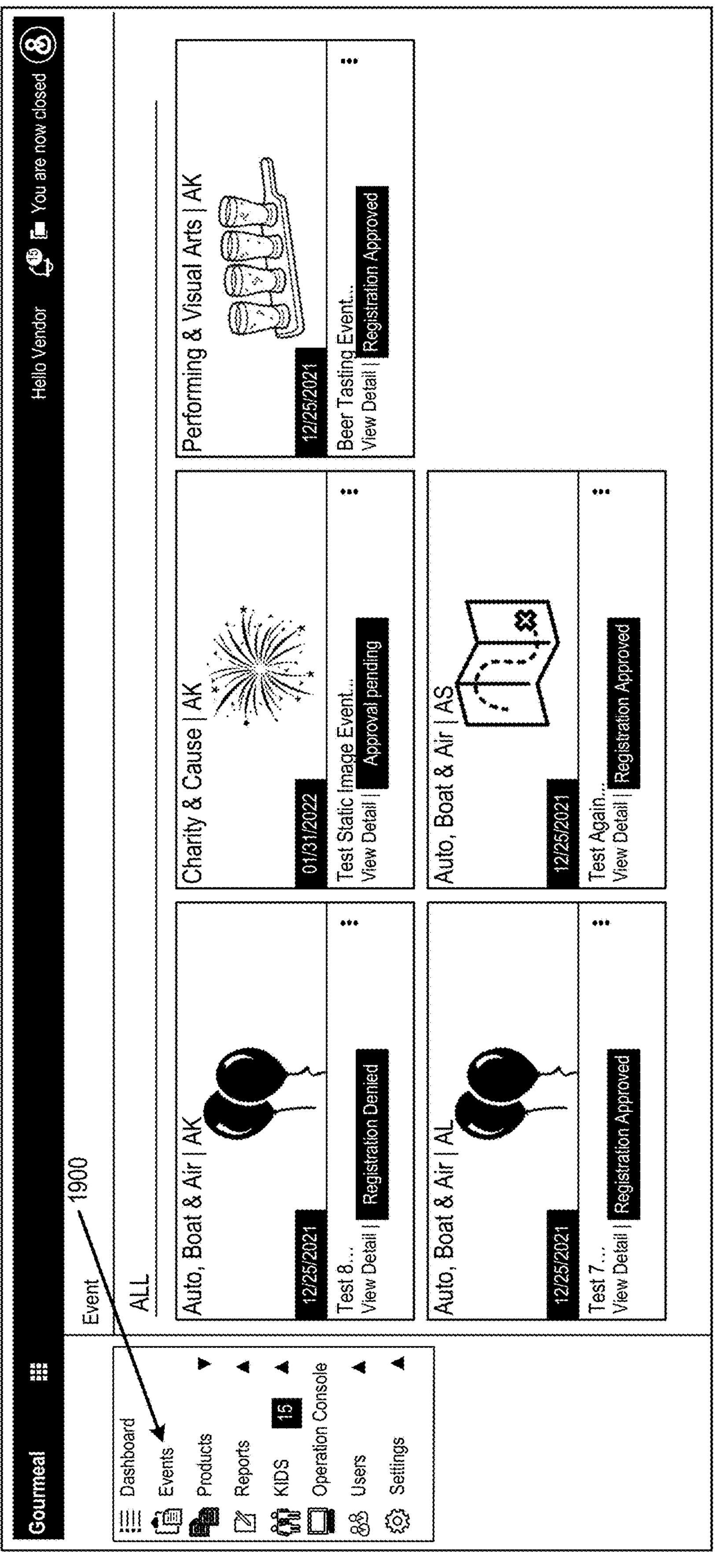
FIG. 19 illustrates an example event screen of the vendor management console, in accordance with an example implementation.

FIG. 19 illustrates an example event screen of the vendor management console, in accordance with an example implementation. Vendors can access the events for which they are registered via the dashboard screen. The event screen can be accessed from the side bar menu of the dashboard as indicated by the arrow 1900. Event screen selection triggers display of all events that a vendor is either registered at, denied registration, pending approval, and so on. Event status associated with an event is color coded and displayed within the event block. For example, for the event "Auto, Boat & Air", the event status is "Registration denied" and may be displayed in a desired color (e.g., red). In some example implementations, the color coding for event status can be defined by the vendor.

Figure 20:
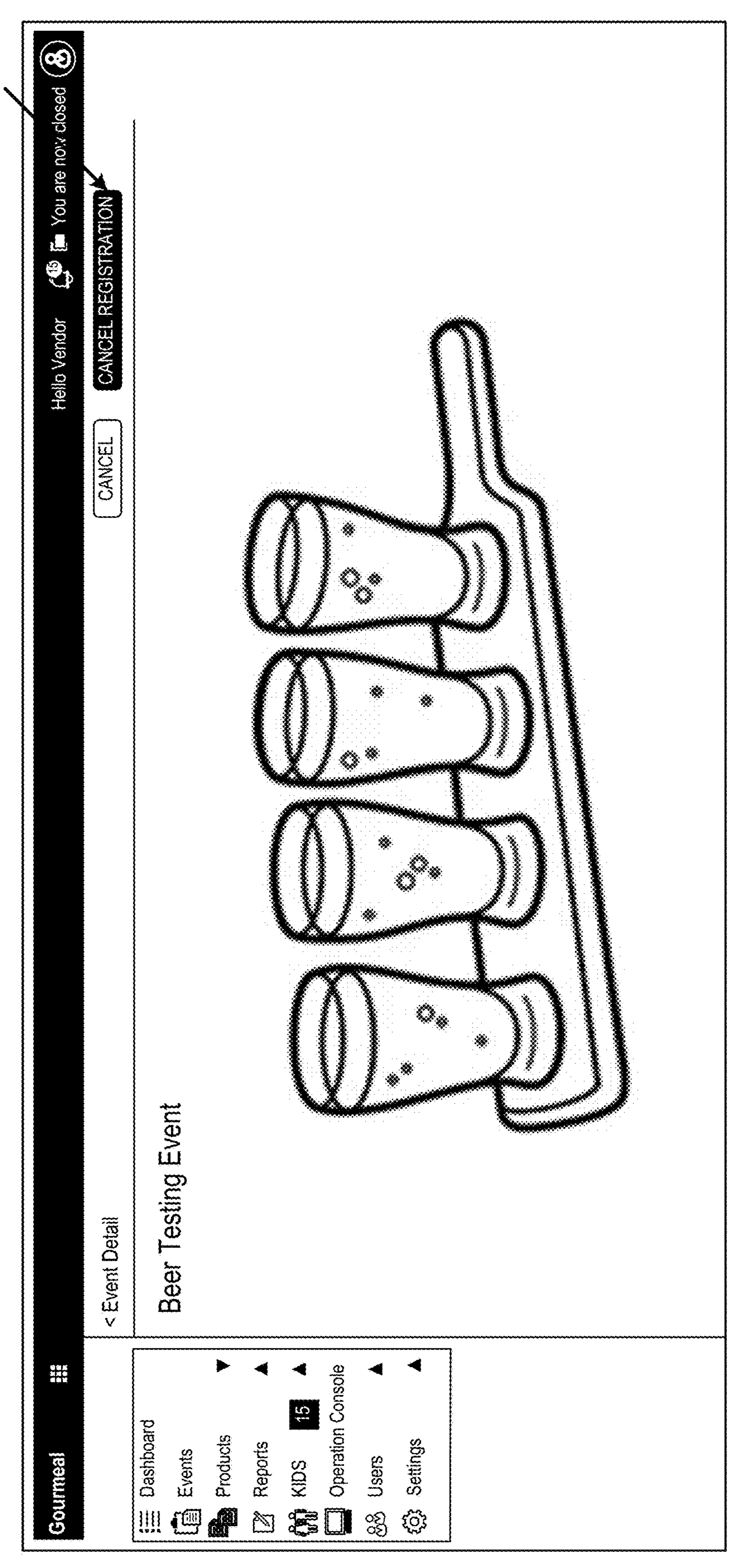
FIG. 20 illustrates an example event detail screen of the vendor management console, in accordance with an example implementation.

By clicking on the "View Detail" link of an event, the vendor can access the event they are registered. Accessing the event link allows the vendor to review event information or cancel the registration for that event. FIG. 20 illustrates an example event detail screen of the vendor management console, in accordance with an example implementation. As illustrated in FIG. 20, a vendor may cancel event registration by clicking the "Cancel Registration" button as indicated by the arrow 2000.

Figure 21:
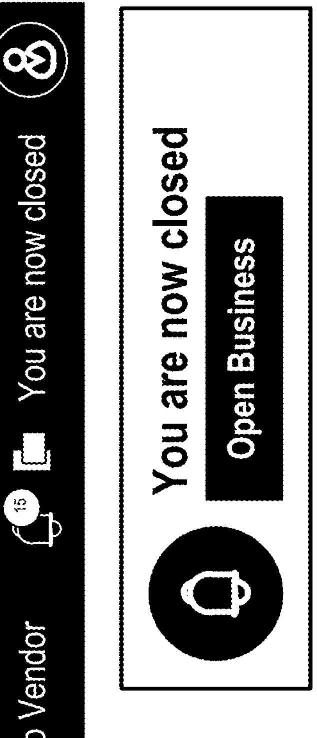
FIG. 21 illustrates an example vendor operation setting of the vendor management console, in accordance with an example implementation.

FIG. 21 illustrates an example vendor operation setting of the vendor management console, in accordance with an example implementation. The vendor accesses a specific event they are registered at to indicate whether they are open or closed for orders during the event. Vendor operation setting allows a vendor to control business operating hours and share such information with user/attendee mobile application. In some example implementations, vendors can control whether they want to open prior to the event or stay open after official event hours. As illustrated in FIG. 21, the dashboard banner indicates a vendor's decision and selection on operation (e.g., whether the business is currently open or closed, hours of operation, and so on). The operating status can be modified by the vendor at will.

Figure 22:
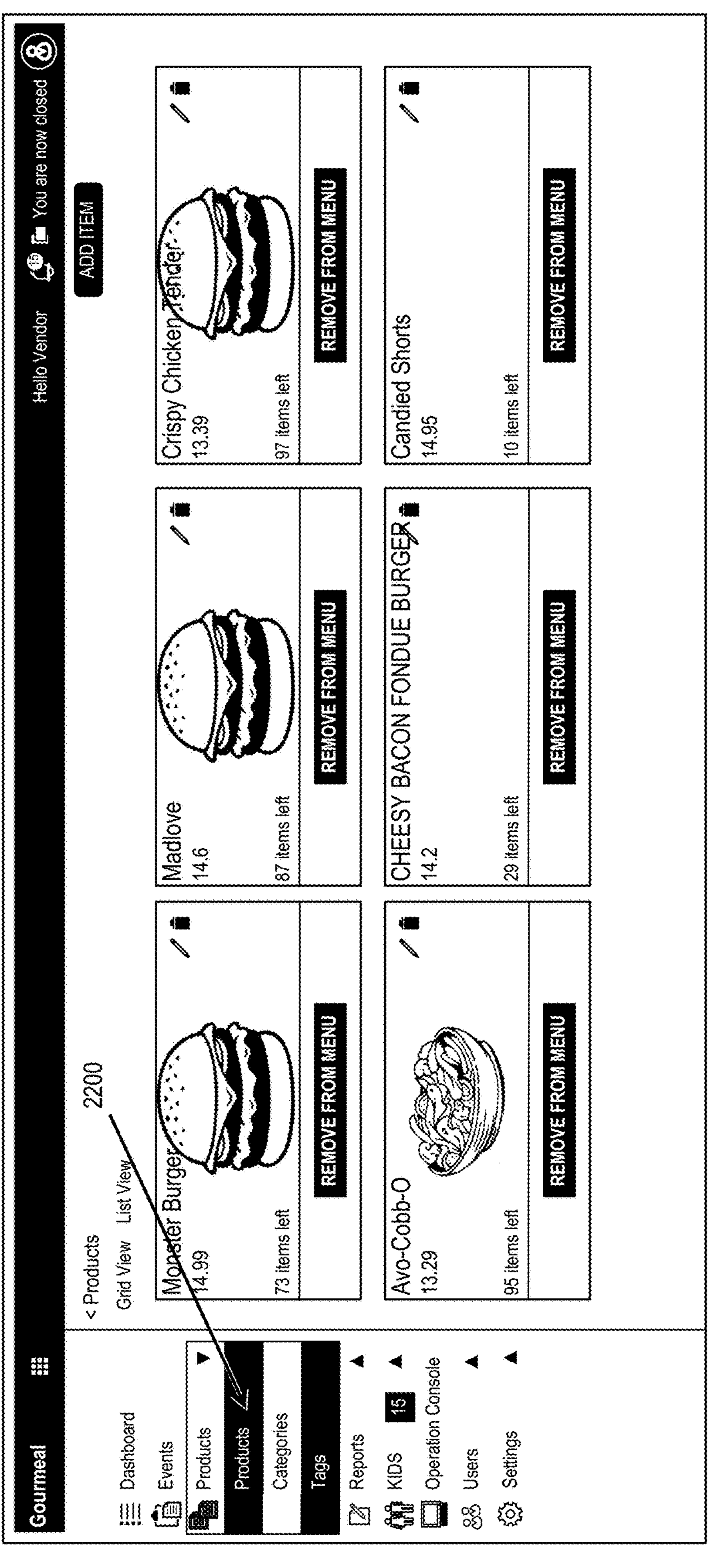
FIG. 22 illustrates an example products screen of the vendor management console, in accordance with an example implementation.

FIG. 22 illustrates an example products screen of the vendor management console, in accordance with an example implementation. Under the products screen, vendors can make modifications to the list of products they intend to sell at events. The products screen can be accessed through the side bar as indicated by the arrow 2200 in FIG. 22. Vendors can remove products from the menu at a given event by clicking the "Remove from Menu" bar. Similarly, products can be added to the menu by clicking the "Add Item" bar. As illustrated in FIG. 22, product image, product name, price, and remaining inventory are displayed. Vendors can click on the edit icon or delete icon to make changes to each item.

Figure 23:
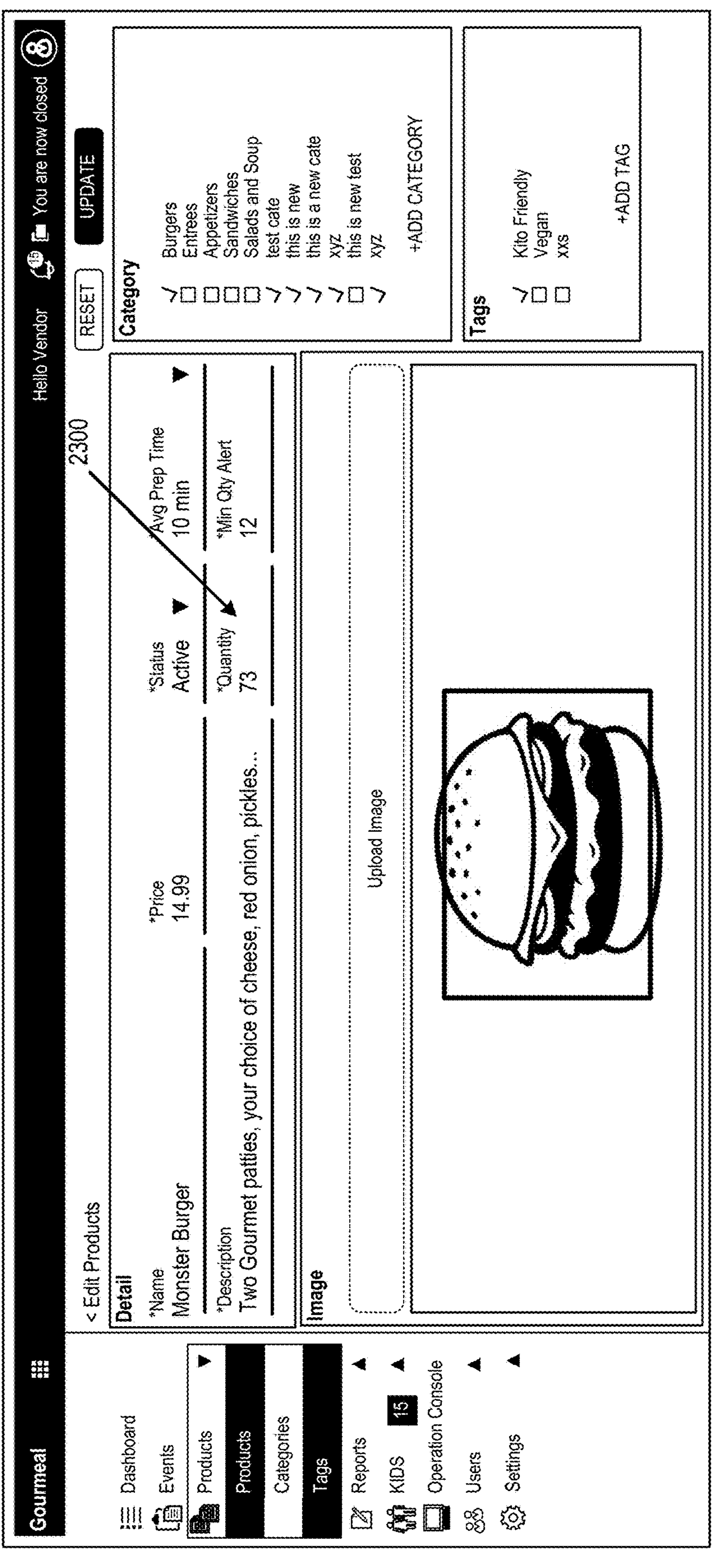
FIG. 23 illustrates an example product edit screen of the vendor management console, in accordance with an example implementation.

FIG. 23 illustrates an example product edit screen of the vendor management console, in accordance with an example implementation. By clicking the edit icon or the product image, a vendor can access the product edit screen of the product to edit product detail. Product detail that may be edited include, but not limited to, product image, product name, price, active/inactive status, average food prep time, description, current quantity in inventory, inventory reorder level, and so on as shown by the arrow 2300.

Figure 24:
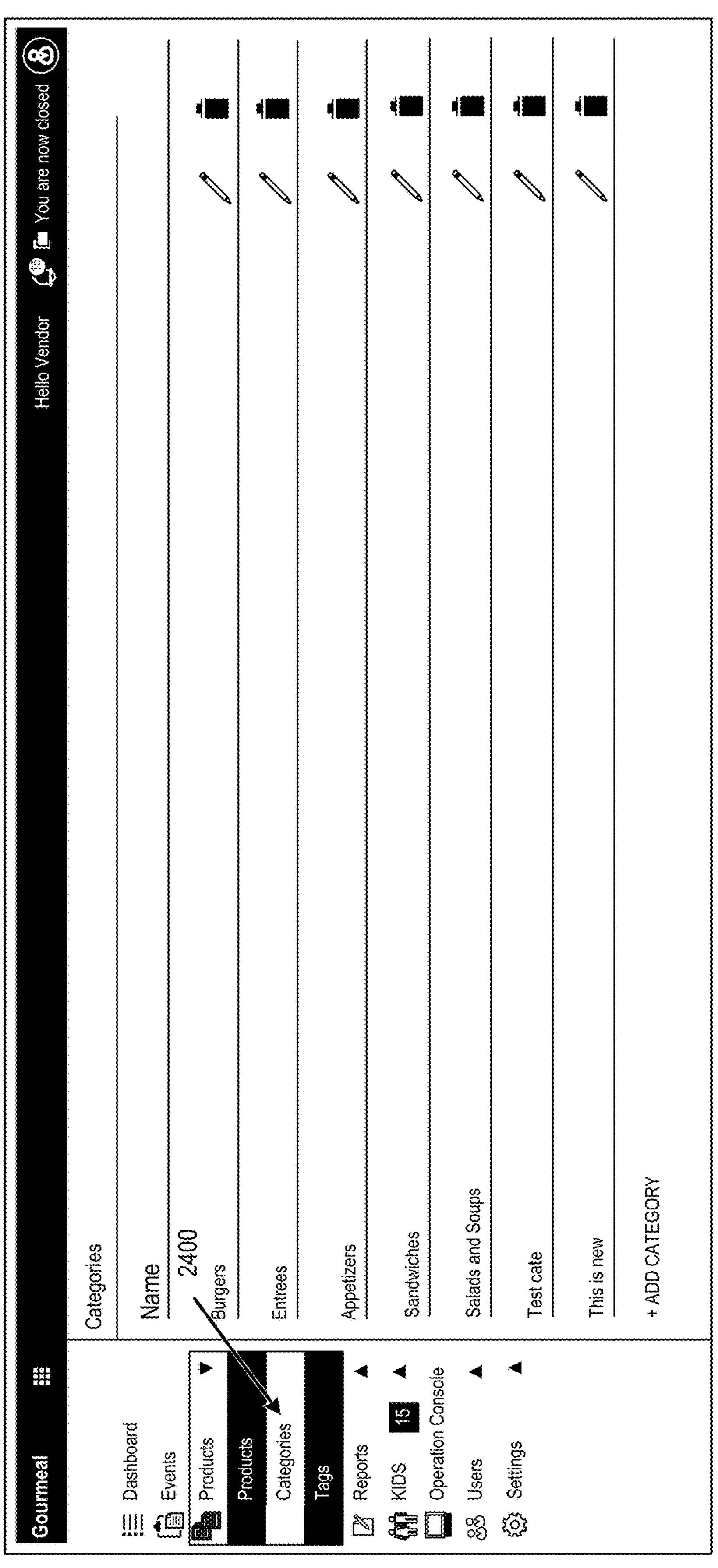
FIG. 24 illustrates an example categories screen of the vendor management console, in accordance with an example implementation.

FIG. 24 illustrates an example categories screen of the vendor management console, in accordance with an example implementation. Under the categories screen, vendors can edit or delete food categories assigned to each product. In addition, vendors can also add categories to each product through the "+ ADD CATEGORY" button. The categories screen can be accessed through the side bar as indicated by the arrow 2400 in FIG. 24. As illustrated in FIG. 24, sample categories may include burgers, entrees, appetizers, sandwiches, and so on.

Figure 25:
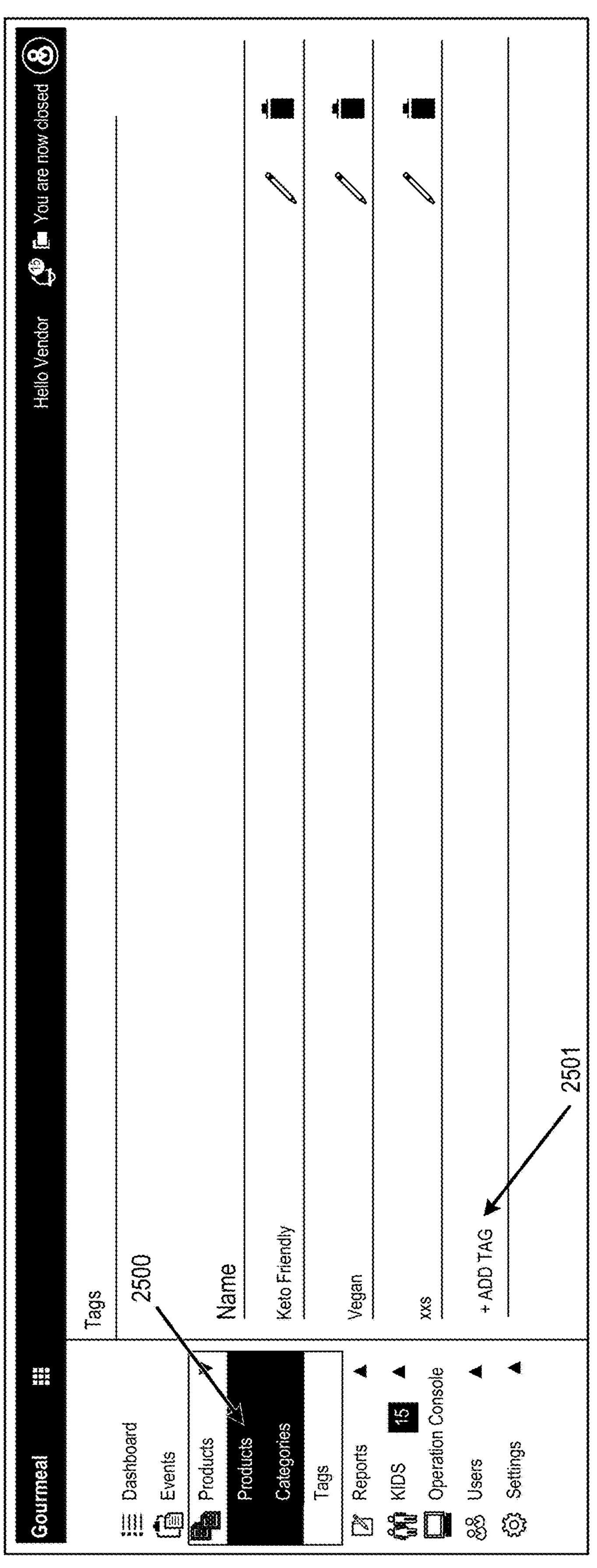
FIG. 25 illustrates an example tags screen of the vendor management console, in accordance with an example implementation.

FIG. 25 illustrates an example tags screen of the vendor management console, in accordance with an example implementation. Under the tags screen, vendors can edit or delete dietary tags assigned to each product. In addition, vendors can also add tags to each product through the "+ ADD TAG" button as shown at the arrow at 2501. The tags screen can be accessed through the side bar as indicated by the arrow 2500 in FIG. 25. As illustrated in FIG. 25, sample tags may include dietary tags such as keto friendly, vegan, and so on in accordance with the desired implementation.

Figure 26:
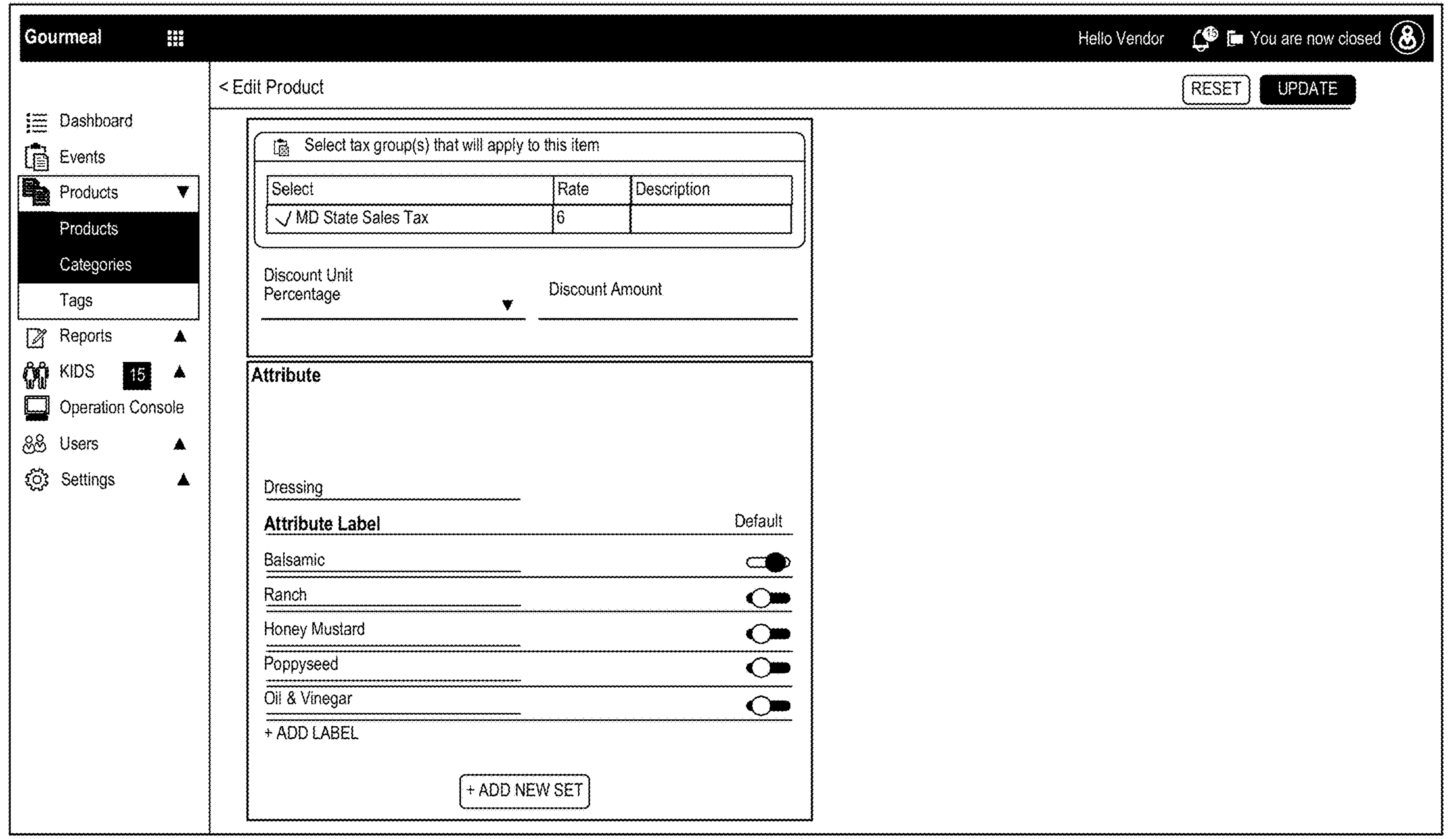
FIG. 26 illustrates example tax edit and attributes sections of the product edit screen, in accordance with an example implementation.

FIG. 26 illustrates example tax edit and attributes sections of the product edit screen, in accordance with an example implementation. Under the tax edit and attributes sections, vendors can adjust applicable sales tax based on event location and food attributes within the product edit screen. Using "dressing" for salads as example, while multiple options exist under "dressing", the dressing "balsamic" is set as the default based on vendor selection as illustrated in FIG. 26.

FIG. 27 illustrates an example order report screen of the vendor management console, in accordance with an example implementation. Under the order report screen, vendors can access reports of all orders made. Order report may include information such as, but not limited to, product name, quantity, price, order number, transaction date, status, total, and so on. The order report screen can be accessed through the side bar as indicated in FIG. 27. Vendors can download/export the report by clicking the "Download PDF" link as illustrated in FIG. 27.

Figure 28:
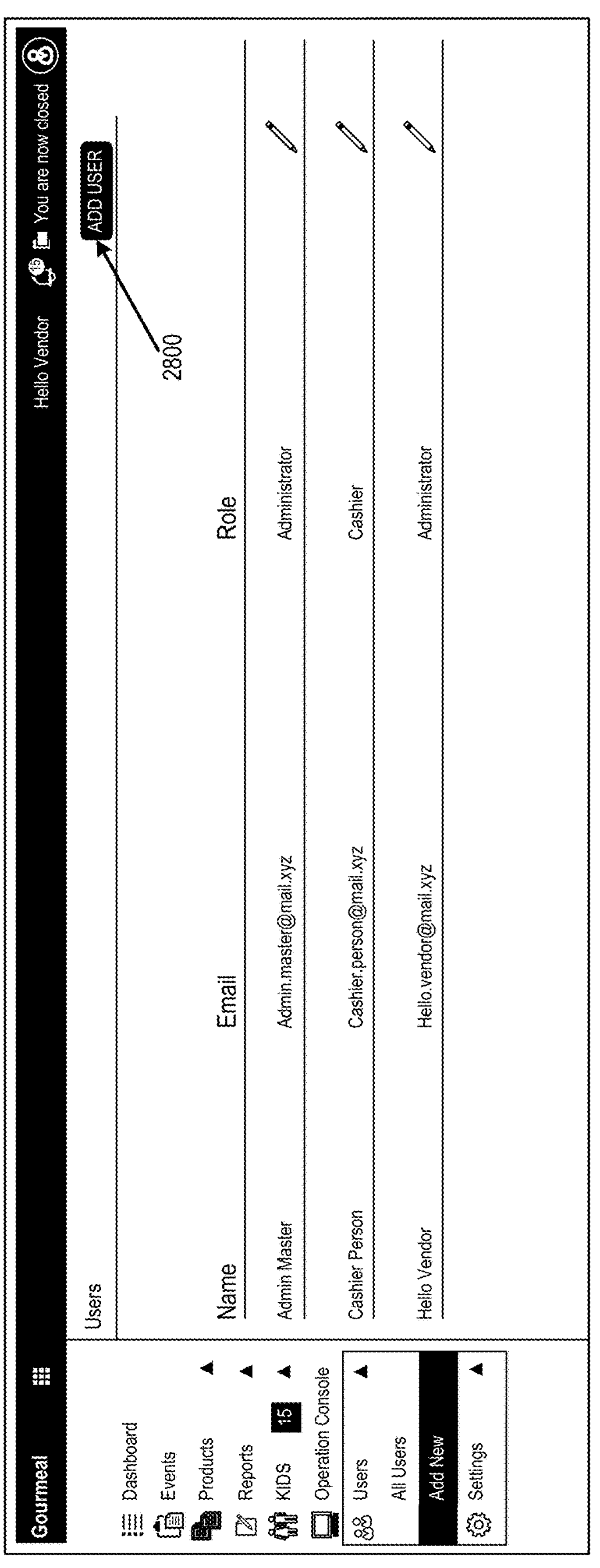
FIG. 28 illustrates an example users screen of the vendor management console, in accordance with an example implementation.

FIG. 28 illustrates an example users screen of the vendor management console, in accordance with an example implementation. Under the users screen, vendors can view, edit, add, or delete users associated with vendor accounts as shown, for example with the add user button 2800. As illustrated in FIG. 28, the users screen contains all users currently registered with the vendor account. In addition to user name, user email, and user role are also displayed for each user. A vendor can edit the user name, user email, and user role for each entry by clicking the edit icon.

Figure 29:
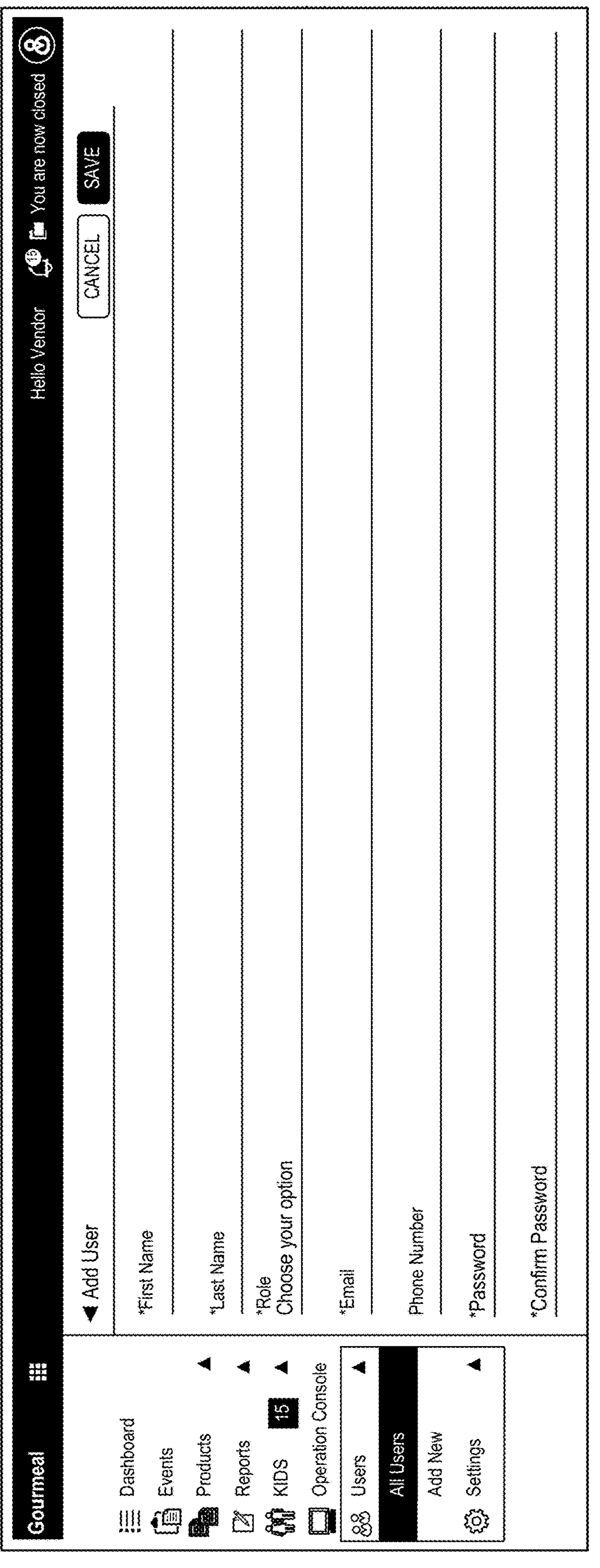
FIG. 29 illustrates an example add user screen of the vendor management console, in accordance with an example implementation.

FIG. 29 illustrates an example add user screen of the vendor management console, in accordance with an example implementation. The add user screen is accessed by clicking the "Add User" button on the users screen of FIG. 28. Under the add user screen, vendors can create new users by completing user information for additional users. User information may include, but not limited to, first name, last name, role, email address, phone number, password, confirm password, and so on.

Figure 30:
FIG. 30 illustrates an example store information screen of the vendor management console, in accordance with an example implementation.

FIG. 30 illustrates an example store information screen of the vendor management console, in accordance with an example implementation. By accessing the store information screen, vendors can create or update vendor information by entering vendor name, vendor address, email address, phone number, address type, and so on.

Figure 31:
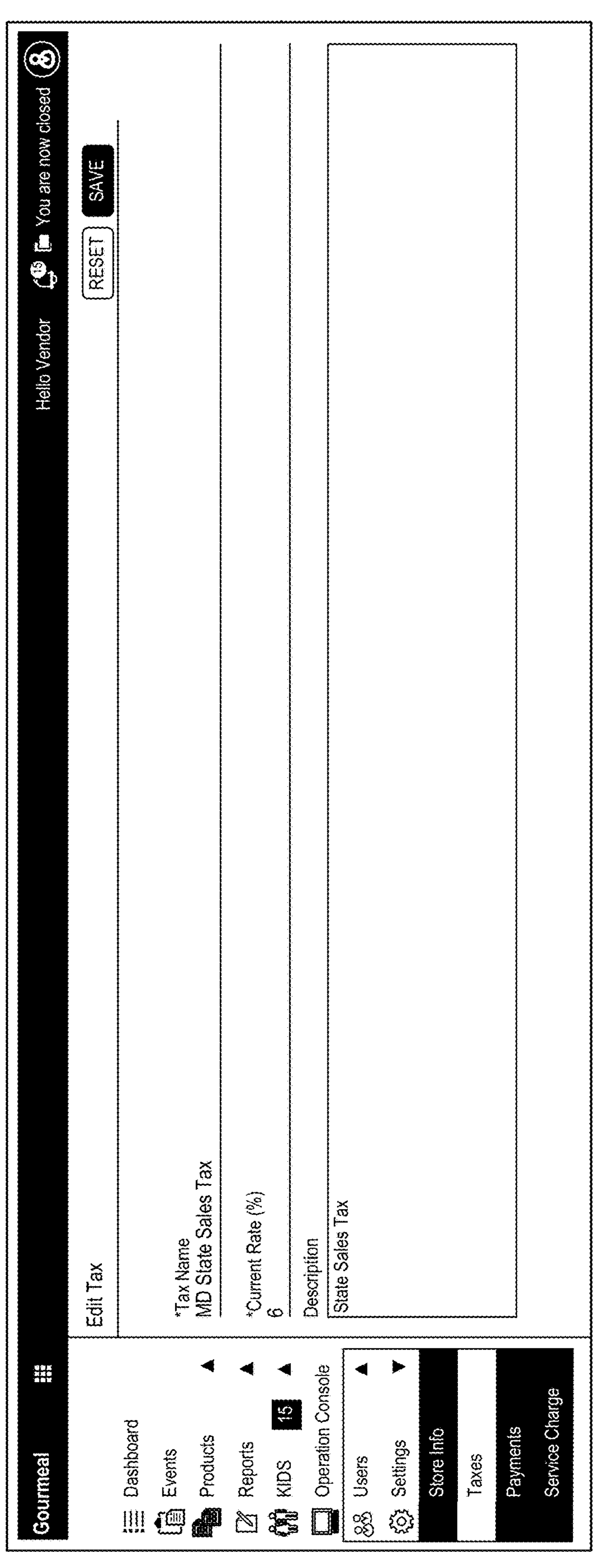
FIG. 31 illustrates an example taxes screen of the vendor management console, in accordance with an example implementation.

FIG. 31 illustrates an example taxes screen of the vendor management console, in accordance with an example implementation. By accessing the taxes screen, vendors can edit or create tax information by entering tax name, current tax rate, description, and so on. In some example implementations, tax information is generated and stored for each state the vendor operates in based on event location. Based on the location of the event, the tax information may be automatically retrieved and applied based on historical tax data input.

Figure 32:
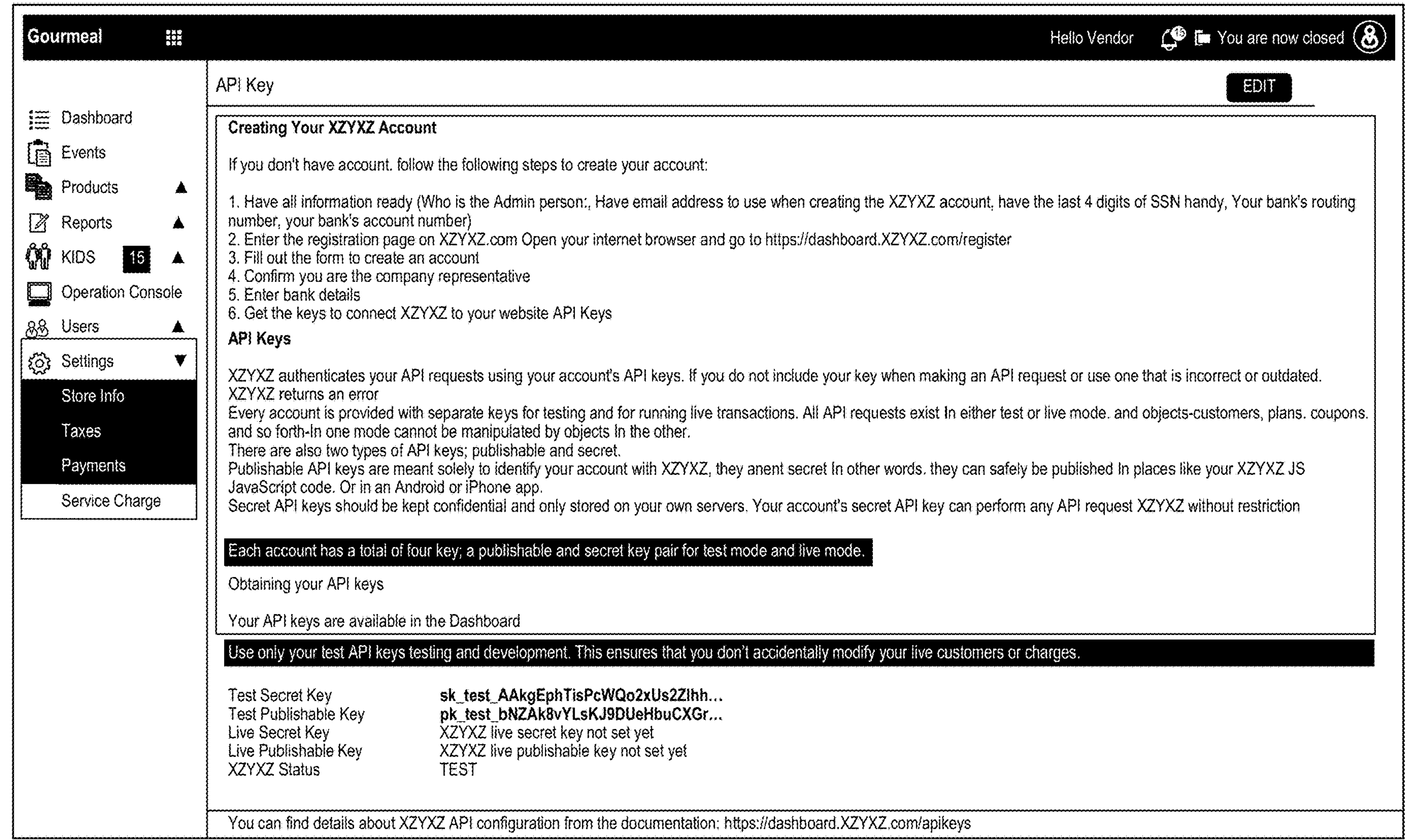
FIG. 32 illustrates an example payments screen of the vendor management console, in accordance with an example implementation.

FIG. 32 illustrates an example payments screen of the vendor management console, in accordance with an example implementation. Under the payments screen, vendors can create their Application Programming Interface (API) keys to the payment processing solution by following the account creation instructions contained within the payments screen. API keys are codes generated to identify and authenticate vendors for account payment management.

Figure 33:
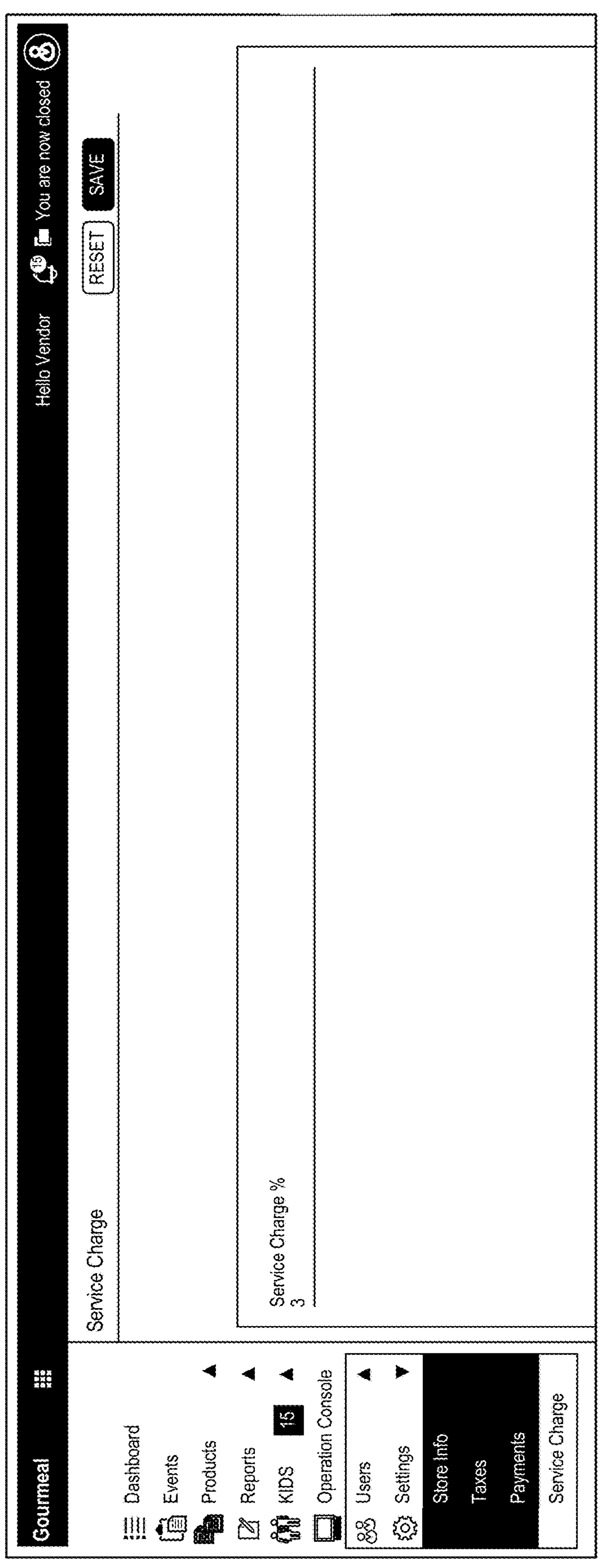
FIG. 33 illustrates an example service charge screen of the vendor management console, in accordance with an example implementation.

FIG. 33 illustrates an example service charge screen of the vendor management console, in accordance with an example implementation. Under the service charge screen, vendor can set the service charge to be assigned to each order as transaction fee. Taking FIG. 33 as example, the service charge is set at 3% of the order value.

Kitchen Display System

The Kitchen Display System (KDS) is a user interface for a vendor to visualize all food orders or all statuses. It is also used by individual food prep members to update the preparation and completion of an order, including the notification to the customer that the food order is ready for pickup. Similarly, Kitchen Display System (KDS) mobile application is used by vendors on smart devices to view pending orders, update the status of customer orders, and send notifications to users/attendees on order statuses from a mobile device. An API specification is defined and created on the vendor management console side to allow external data exchange with KDS systems used by vendors.

In this example, the KDS screen is the first screen the vendor will see after loading the mobile application, but the present disclosure is not limited thereto.

Figure 34:
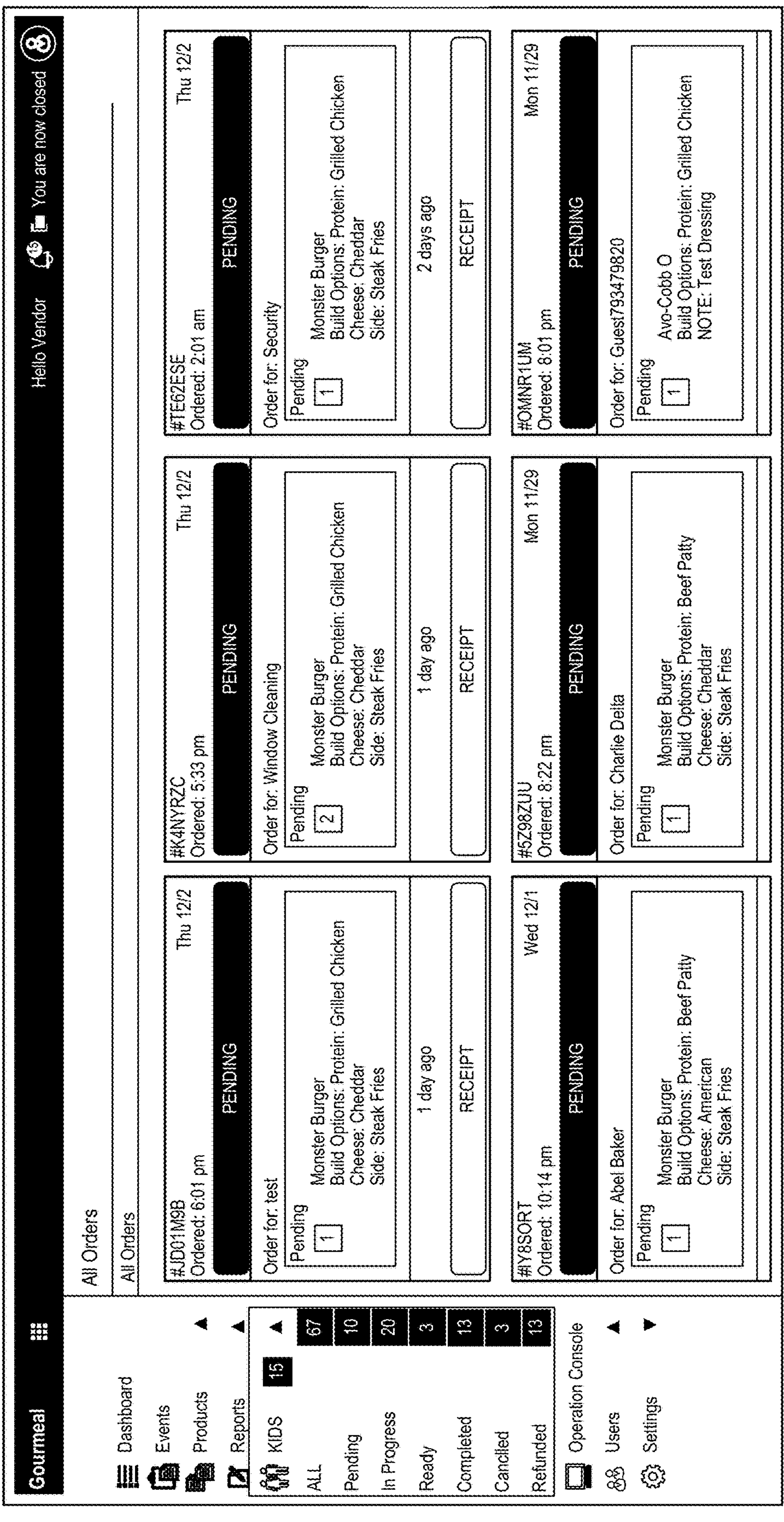
FIG. 34 illustrates an example Kitchen Display System (KDS) screen of the vendor management console, in accordance with an example implementation.

FIG. 34 illustrates an example KDS screen of the vendor management console, in accordance with an example implementation. The KDS shows each order on a separate card and cards can be filtered by their status and are color coded based on status. In some example implementations, the color coding of status is defined by the vendor. Food preparation services (e.g., fryer, grill, soup, salad, etc.,) can filter the incoming or in progress food orders by their respective station so as to allow parallel food preparation of items in orders. Food orders cycle through the various statuses, including, but not limited to, pending, in progress, ready (for pickup), completed (food is picked up), cancel an order, refund an order, and so on.

Figure 35:
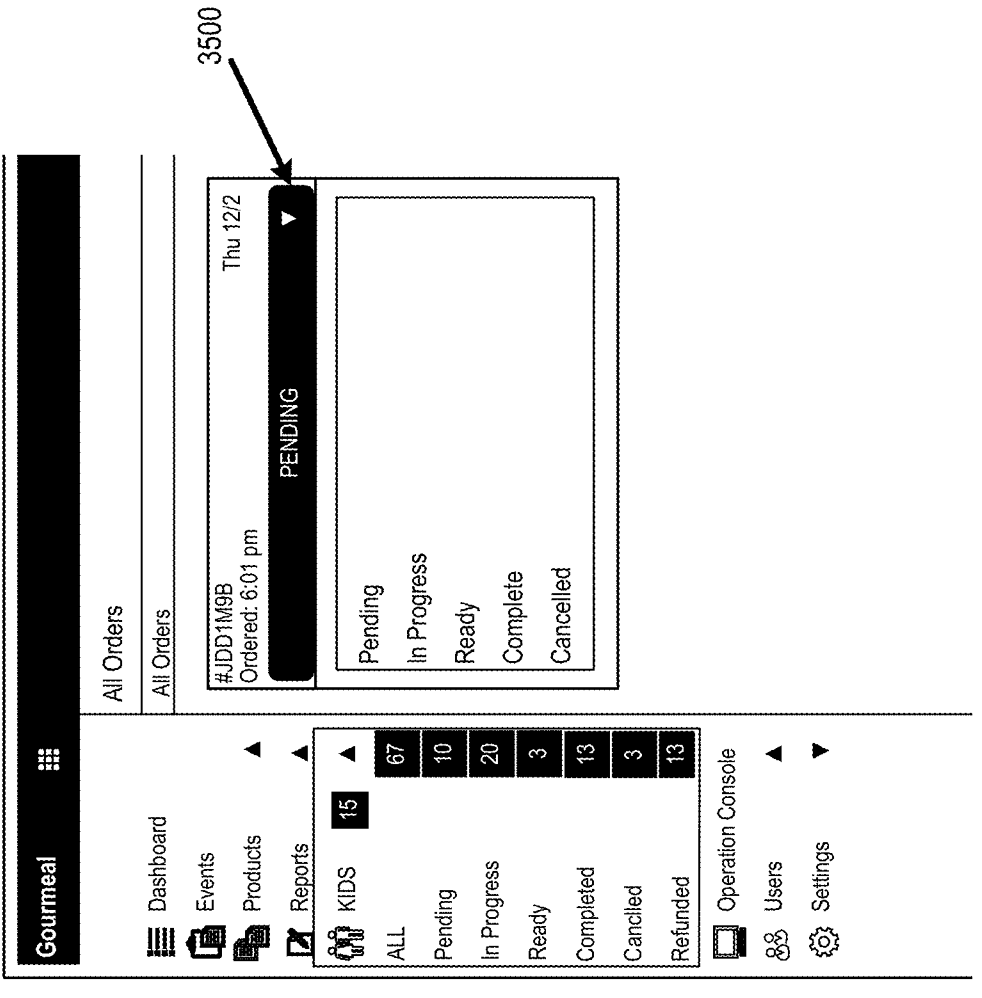
FIG. 35 illustrates item status change using the KDS screen of FIG. 34, in accordance with an example implementation.

FIG. 35 illustrates item status change using the KDS screen of FIG. 34, in accordance with an example implementation. The KDS screen allows vendors to change order status on orders. As noted above, order statuses including, but not limited to, pending, in progress, ready (for pickup), completed (food is picked up), cancel an order, refund an order, and so on. Under the ready state, the prepared order is ready for pickup by the customer. Based on the user's preferred notification method, an email, SMS, or push notification is generated and sent to the user notifying order completion. The order status can be modified by vendor worker or cashier by clicking on the down arrow in the status bar as indicated by the arrow 3500 shown in FIG. 35.

Figure 36:
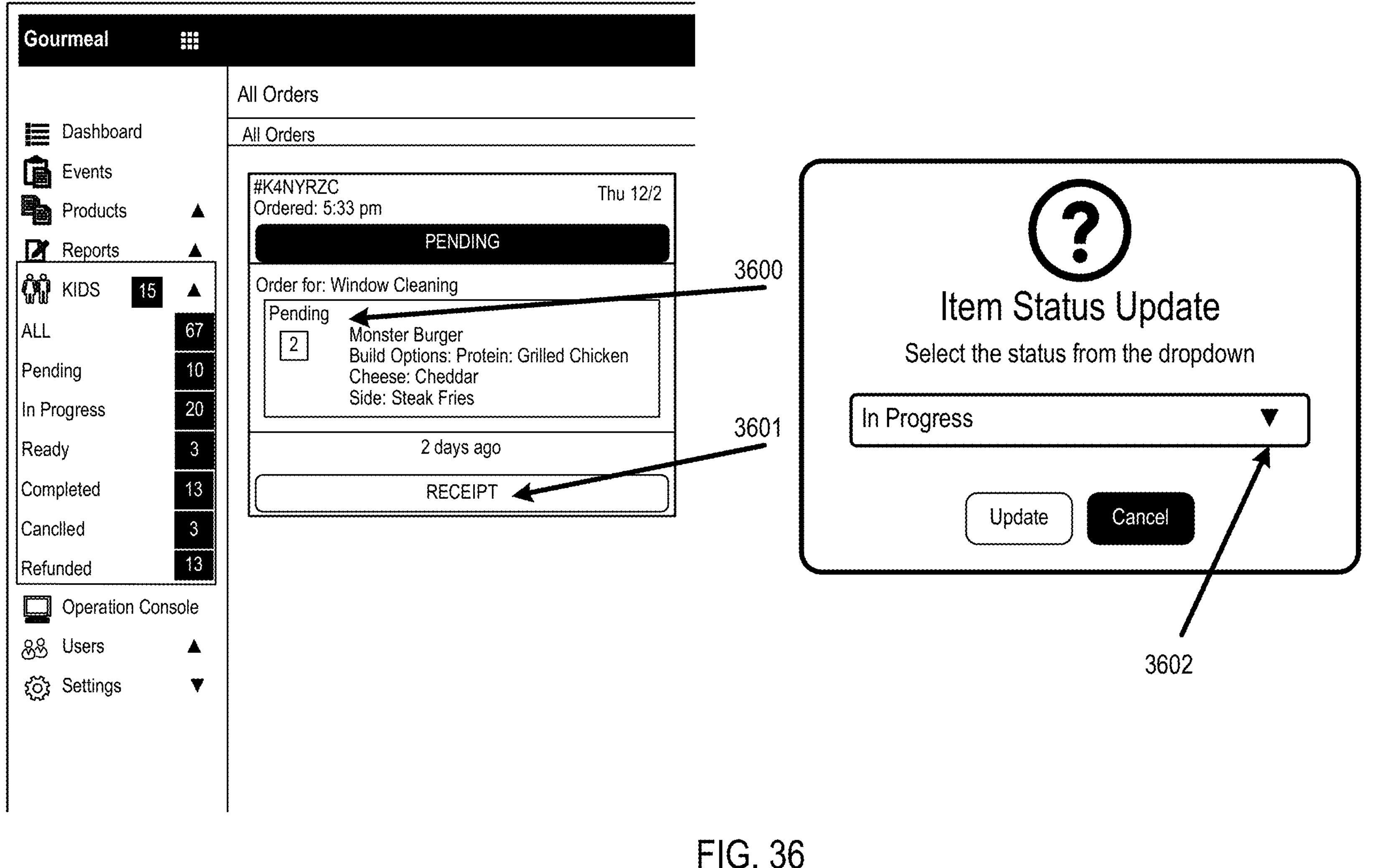
FIG. 36 illustrates an alternative method to perform item status change using the KDS screen of FIG. 34, in accordance with an example implementation.

FIG. 36 illustrates an alternative method to perform item status change using the KDS screen of FIG. 34, in accordance with an example implementation. An individual food item's status can also be changed within an order. A food order can contain multiple items that may be prepared by different vendor members. To change the status on an individual item within a food order, a vendor can click on the link to the item as shown at 3600. This results in the generation of an "item status update" option as illustrated at 3602 in FIG. 36. The vendor can then click on the status bar down arrow to change the individual item's status. After the vendor has completed status selection, the status can be updated by clicking the "Update" button to save the selected status. In addition, vendor can click on "Receipt" button to open the food order receipt as shown at 3601, which will be described in more details below.

Figure 37:
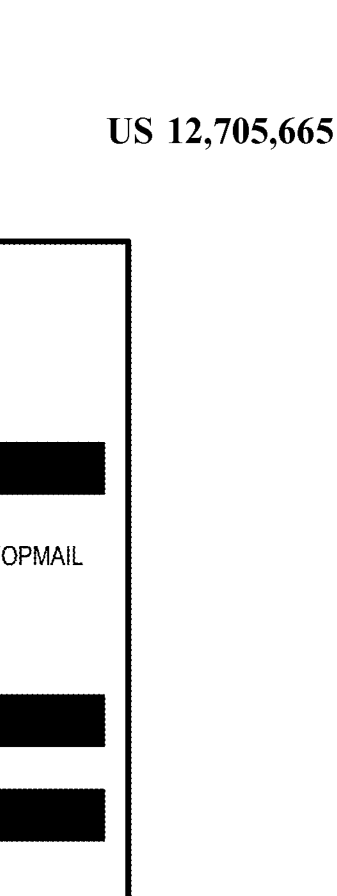
FIG. 37 illustrates an example receipt screen of the vendor management console, in accordance with an example implementation.

FIG. 37 illustrates an example receipt screen of the vendor management console, in accordance with an example implementation. The receipt screen allows vendors to print receipts to assist food prep team members with the item preparation or to be affixed to the completed orders. In additional to physical receipt printing, vendors also have the option of emailing the receipts to the customers/attendees directly. As noted above, the receipt screen can be accessed by vendor clicking on the "Receipt" button on the KDS screen. The receipt can be printed on a thermal network printer via a cloud print centralized print function. As illustrated in FIG. 37, the receipt has a QR code at the bottom that can be presented by a customer upon food pickup to update the food order status to "Completed" or picked up.

FIG. 38 illustrates an example order operation console screen of the vendor management console, in accordance with an example implementation. The order operation console screen allows vendors to see all food orders by any or all statuses in a one-line grid view. By clicking on the order ID associated with an order, vendor can see the order detail on the specific order. Vendor can view all orders in queue and sort by column ascending or descending order based on preference. In some example implementations, a search box is provided to search for item or order by keyword. Order records exceeding a defined time threshold are automatically archived to reduce data processing.

Payment Processing Solution

The payment process solution integrates both incoming payment collection and outgoing payments. The system provides for charge splitting across multiple vendors, venues, and fee structures. In some example implementations, GPS data is obtained from user/attendee's smart device to confirm purchase/order location to prevent occurrence of fraud.

Figure 39:
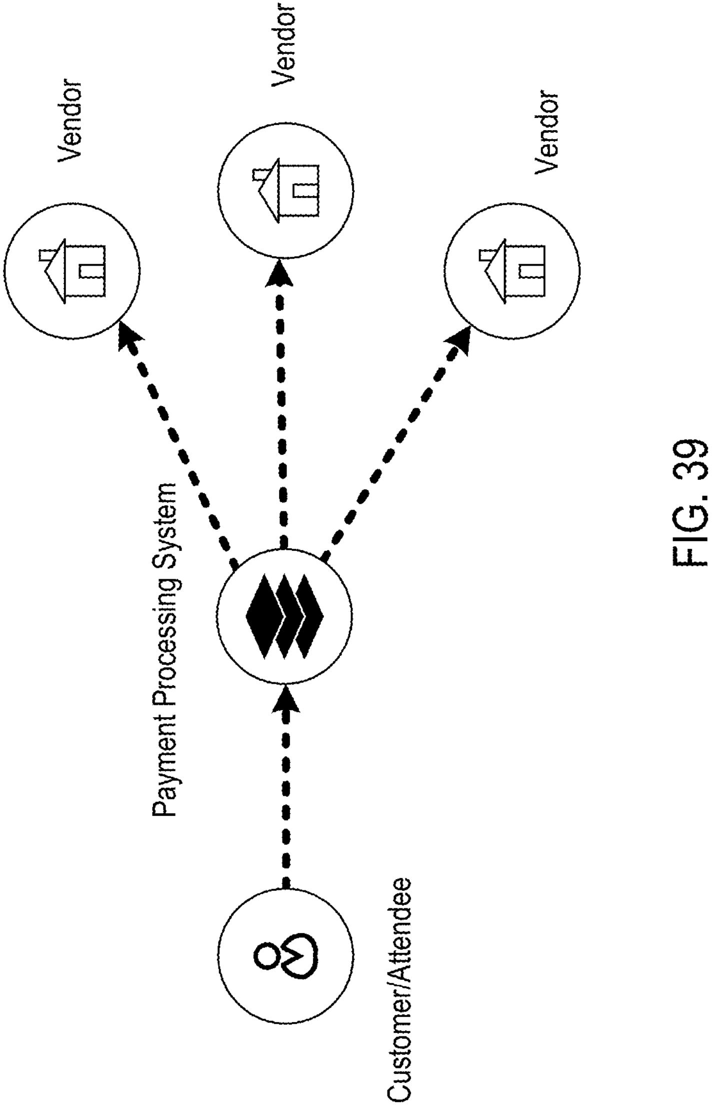
FIG. 39 illustrates a process flow of an example payment processing solution system, in accordance with an example implementation.

FIG. 39 illustrates a process flow of an example payment processing solution system, in accordance with an example implementation. The payment processing solution system allows for orders to be split among multiple food vendors and manages payments to each vendor. The processing begins with an event customer/attendee placing an order on the platform across multiple vendors. At the checkout point, the payment processor processes the respective amounts for each vendor, including any tips as well as the collected service fees.

Figure 40:
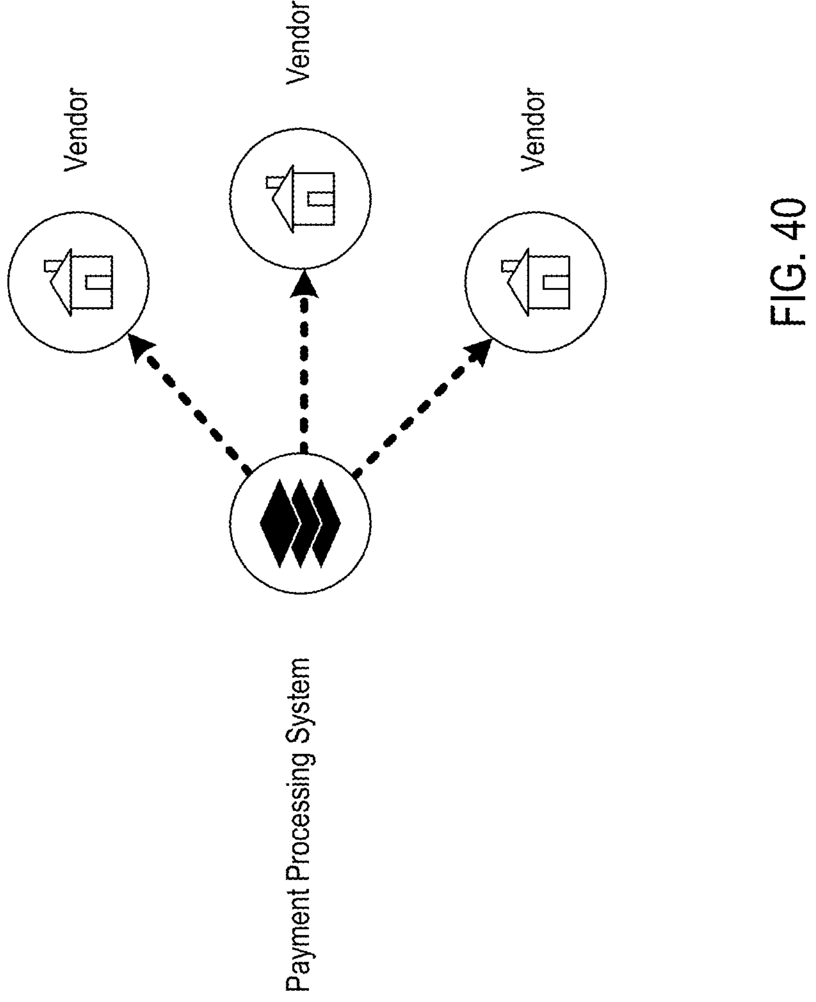
FIG. 40 illustrates payment distribution of the example payment processing solution system, in accordance with an example implementation.

FIG. 40 illustrates payment distribution of the example payment processing solution system, in accordance with an example implementation. The payment processing solution system allows for payment distribution based on vendor's order portion and fees collected. The system sends funds, unlinked to incoming payments, to vendors or service provider's bank account or debit card.

Thermal Printer

Figure 41:
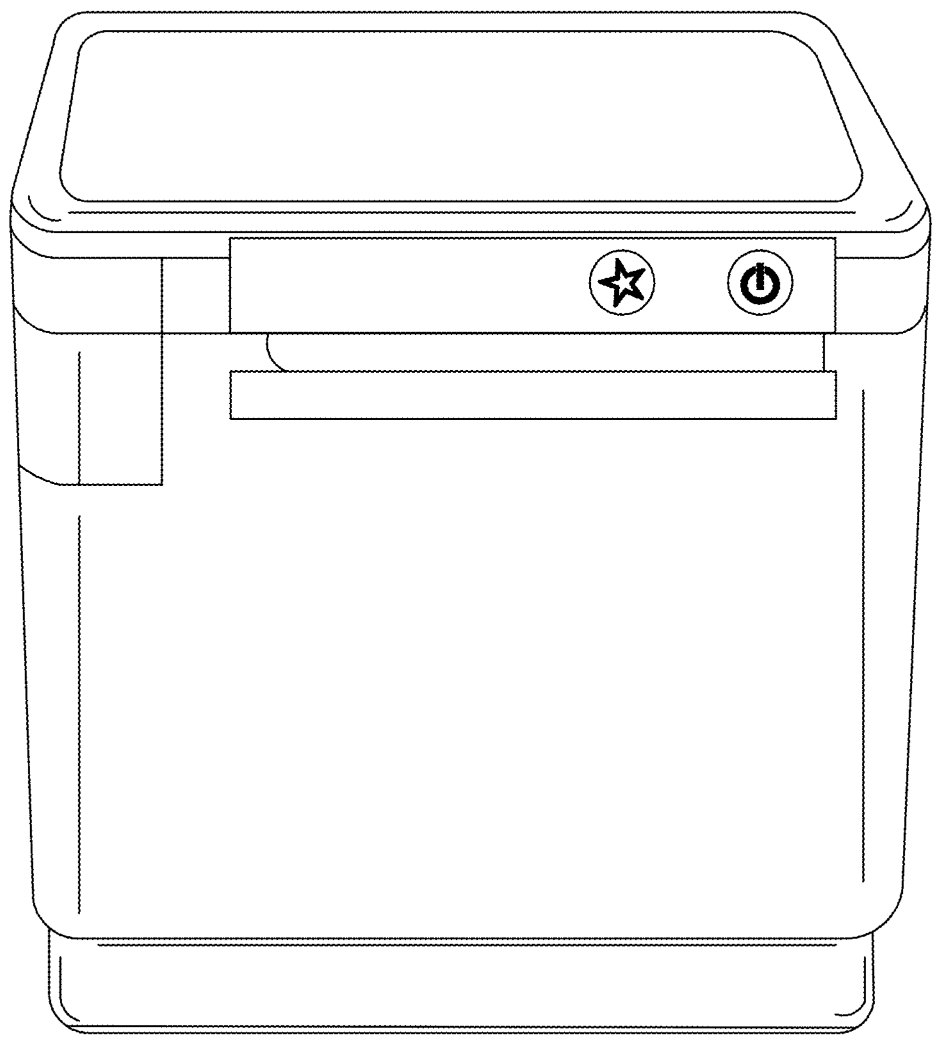
FIG. 41 illustrates an example thermal printer, in accordance with an example implementation.

The thermal printer leverages a cloud-based printing application that is platform agnostic and able to centrally control and disseminate all print requests to the appropriate printer to reduce bottlenecks and optimize print speeds. FIG. 41 illustrates an example thermal printer, in accordance with an example implementation.

Figure 42:
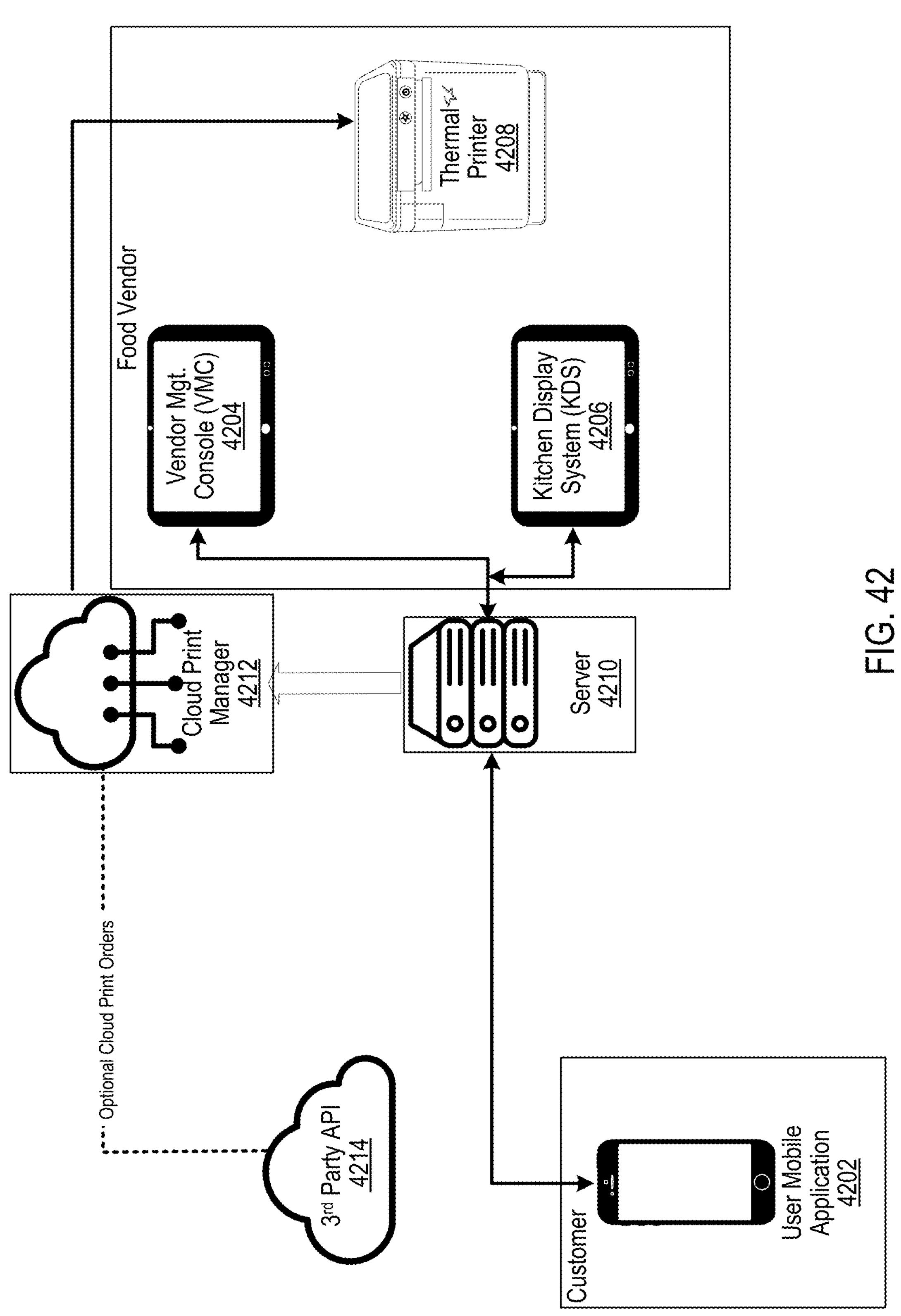
FIG. 42 illustrates a communication flow of an example ordering processing system, in accordance with an example implementation.

FIG. 42 illustrates a communication flow of an example ordering processing system, in accordance with an example implementation. The thermal printer 4208 sends HTTP post periodically (e.g., every five seconds) to the server 4210. Whenever a customer places an order through a user mobile application 4202 or a manual print request is received from vendor's KDS 4206 or vendor management console (VMC) 4204, the server 4210 responds to the HTTP post request of thermal printer 4208 via a response in a format such as, but not limited to, HTML, XML, JavaScript, JSON, and so on, back to the thermal printer 4208 using the cloud print manager 4212. The cloud print manager 4212 optimizes the print queue and transmits print responses to the thermal printer 4208. On receipt of the response, the thermal printer 4208 prints the receipt and finishes the print job. This is then followed by the thermal printer 4208 sending an HTTP DELETE request to the server 4210 to remove the print job from the queue.

The thermal printer 4208 provides a physical method of receiving orders and tracking order progress. Vendors have the option of printing out orders as they are received from customers to be used internally for food prep. In some example implementations, when an order's order status is updated to "Ready", automated printing of receipt is triggered to allow the receipt to be affixed to the order. In some example implementations, third-party APIs can be utilized to provide for additional printing services as is known in the art.

Cloud Platform Architecture

Figure 43:
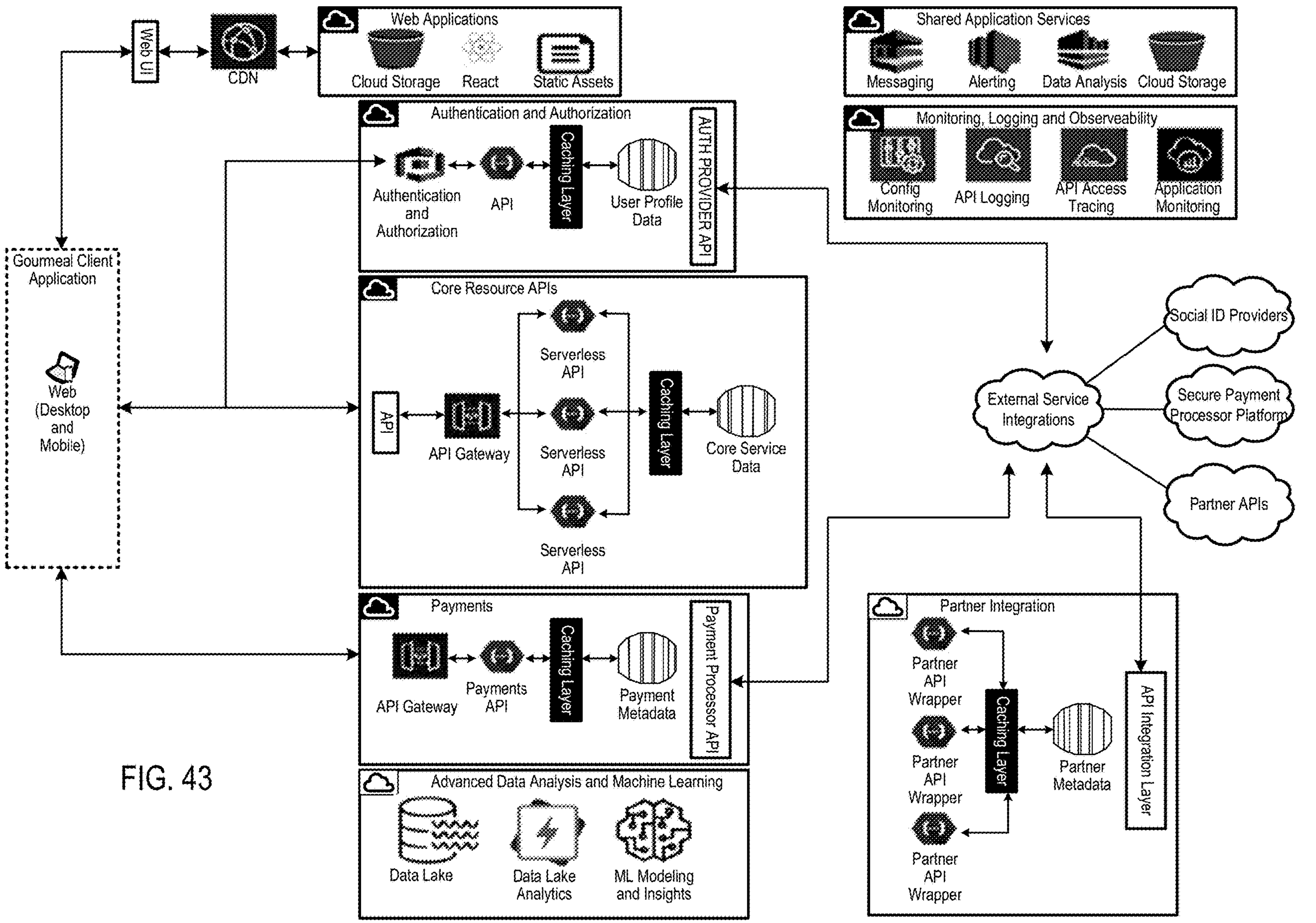
FIG. 43 illustrates an example cloud platform architecture, in accordance with an example implementation.

FIG. 43 illustrates an example cloud platform architecture, in accordance with an example implementation. The example platform is a serverless cloud-based architecture designed for security, scalability, stability and expandability, however, the present disclosure is not limited thereto. The distributed platform powers various applications and interfaces-including consumer mobile application, vendor application, event management console, and KDS through:

- A resource-based API for managing vendors, events, product, and customers.
- User authentication and authorization, including social identity federation via identity popular social media providers.
- A secure payment platform offering advanced features like same day settlements and revenue reporting.
- Data lakes for provision of data analysis and customer insights.
- An extensible API framework allowing for deep partner integration.
- Key features of the platform will be described in details below.

Key Services and APIs

Authentication and authorization: The authentication API leverages a cloud authentication service to provide single sign-on (SSO) and user profile features across all mobile clients and web applications. This API provides users the ability to register accounts directly (via a "Registration Form") or use a federated identity provider, like a social media platform or an internet services provider, to sign-in to the platform. The authentication API also allows additional authentication providers to be added as they are supported by the underlying cloud serves or custom extensions are built for specific needs.

Core resource APIs: The resource APIs provide CRUD+ (create, read, update, delete) operations for managing core resource abstractions. These abstractions include events, products, food menus, vendors, venues, customers, etc. These APIs provide all the data that is used in mobile clients and web applications or processed via other platform services (e.g. payments, shared services etc.). These APIs are built using a serverless microservice architecture that allows them to scale overtime and adapt as business evolves. This includes the ability to support additional abstractions from partners to extend core functionality.

Payment Platform

The payments API is a server-side payment processing API that integrates directly with secure payments processing service. Server-side integration removes the risk of exposing secure payment processing data or user personally identifiable information (PII) directly in application. By utilizing the payment processing platform, the payments API offers a number of payments features to customers and vendors that include a vast variety of payment methods, same day payouts, custom revenue reporting, etc. Additionally, offloading the storage and processing of payment details data greatly reduces payment card industry (PCI) compliance and other regulatory requirements for the platform.

Hosted Web Applications

The cloud platform hosted web applications complement the mobile applications by providing secure interfaces for platform administration and management. These applications offer features such as venue/vendor set-up, advanced payment reporting and advanced system data analysis. Hosting of the web applications in the same cloud platform as microservices allows them to integrate those services seamlessly while also leveraging shared cloud platform services like monitoring, content delivery network (CDN), messaging, and storage.

Shared Application Services

The cloud platform leverages advanced cloud technologies to integrate and orchestrate the various microservices and APIs. These technologies fall into two main categories:

Monitoring, logging, and observability: These are a set of orthogonal services configured in the cloud provider to make the platform more reliable, transparent, and manageable. The set of services include, but not limited to, security activity monitoring, application event logging, application data analytics, web service/application monitoring, configuration management, etc.

Shared communication channels and data storage: This set of shared features are used to manage communication and coordination both within and in between microservices. They allow services to operate both synchronously and asynchronously without having to be tightly coupled to one another. The features also allow the platform to communicate with external services hosted on the same cloud provider or external providers. Key services in this category include pub/sub message queues, push notifications, distributed file storage, and CDN.

Advanced Data Analysis w/Machine Learning

As the user base and platform grows, the amount of user and system data will grow exponentially. A heterogeneous set of data lakes and data warehouses is utilized to store platform data/information that range from application metadata to system events and user activity data. The platform uses big data processing components to optimize business activities, improve application performance, introduce new features and enhance end user experience. Example components include, but not limited to, data lake management, data stream processing, big data databases, and machine learning (ML)/artificial intelligence (AI) modeling.

In example implementations, data analytics and machine learning can learn characteristics of the ideal venue and ideal vendors for a particular type of event. For example, after accumulating enough data (e.g., registered and paid users, total spend at event, types of vendors used, type of venue used, length of event, etc.) of a type of event (e.g., state fair, food truck event, etc.), machine learning algorithms of any kind can be used to train on the data to learn the best types of venues for a particular type of event, the best type of vendors to use for such an event, expected demand for vender items, and expected attendance for selecting a particular venue. Such results can be provided to the event producer or particular vendors as suggestions to allow the event producer to determine appropriate venue and timing of an event, or for vendors to determine which events to apply for. Other insights can also be derived from the data and the present disclosure is not limited thereto. Such insights and recommendations can also be provided to sponsors or advertisers (e.g., to indicate expected exposure or user attendance) to allow sponsors or advertisers to determine an appropriate spend.

In example implementations described herein, machine learning and data analytics may also be utilized to rearrange the menu or menu details that are to be displayed on the mobile application of the user. For example, if inventory for a particular item is running low due to a surge in demand, or if a particular item is suddenly receiving a surge in orders, then the particular item can be provided on a splash page or on the front page of the vendor details screen as a highlighted item that is high in demand and may run out to entice more orders. Further, the price of such an item can be adjusted upwards based on any function as known in the art based on the expected popularity of the item.

The foregoing example implementation may have various benefits and advantages. For example, versatile user mobile application that allows for different payment options involving multiple vendors. Specifically, the ability to group items from different vendors into a single order and paying for that order through a convenient single payment. In addition, a user can also receive items to be grouped into an order from companions using the user mobile application from their respective smart device and make a single convenient payment without the need to make multiple payments on companions' smart devices. Payment is then directly distributed to the vendors' accounts based on source of order items and associated item fees. In addition, vendor management counsel, KDS, and thermal printing provide for streamlined order processing and a centralized event-based product management solution.

Event Coordinator/System Admin Interface

FIGS. 44 to 50 illustrate various examples of the interface for the event producer/system administrator, in accordance with an example implementation. In example implementations, the event coordinator/system administrator can log into the system and in accordance with the desired implementation. displays an appropriate error message right in the login page.

Figure 44:
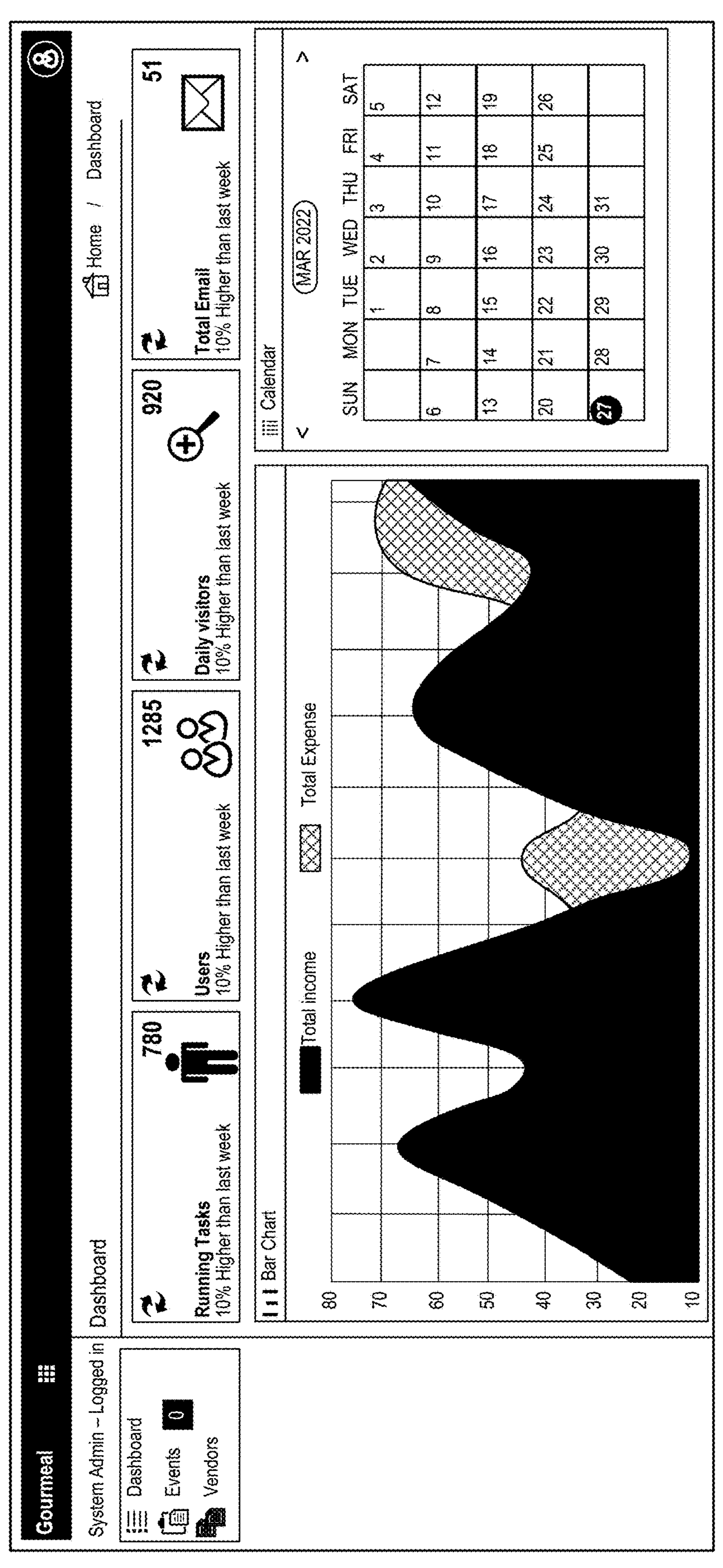
FIGS. 44 to 50 illustrate various examples of the interface for the event producer/system administrator, in accordance with an example implementation.

Specifically, FIG. 44 illustrates an example dashboard in accordance with an example implementation. At its simplest, a dashboard is a screen in the application that displays information. Normally, a dashboard provides a global overview to the user, with access to the most important data, functions and controls. In practice, a dashboard often becomes a sort of homepage, especially for power users. In example implementation, the dashboard can obtain data from the database, such as, but not limited to, Analytical Information like vendors with account in a map, Vendor status statistics/count, how many vendors register for a particular event (graph, chart etc.), Different Reports, Search functionality to list all vendors, and so on.

Figure 45:
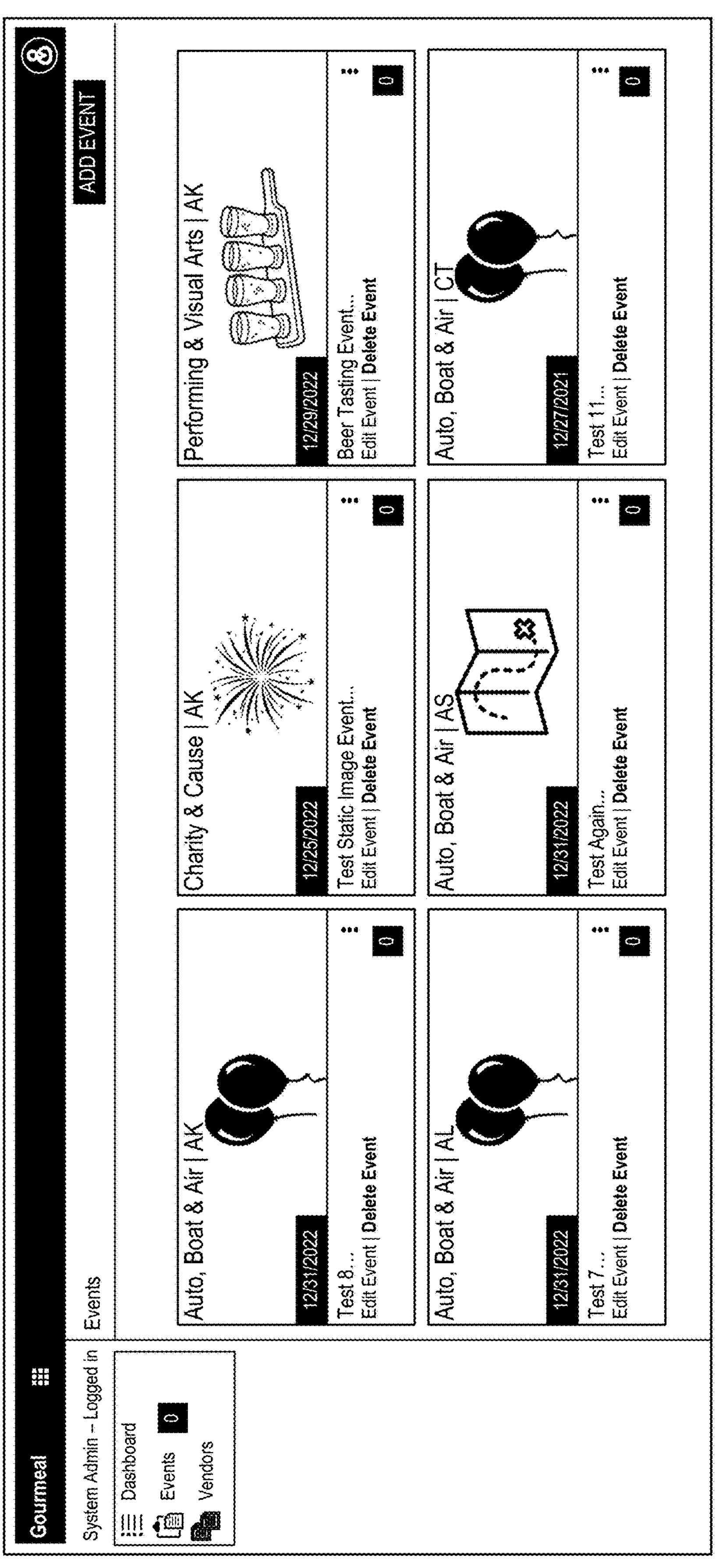

FIG. 45 illustrates an example events dashboard, in accordance with an example implementation. This dashboard allows the system admin/event coordinator to create and broadcast events to the platform as needed. In example implementations, the events dashboard can be populated from the events database associated with the event coordinator/system admin to view outstanding events. The events dashboard can involve edit, delete and insert/add functionality.

Add Event: The add event page is loaded when the 'Add Event' button is clicked. The following are example form fields in the add event page that can be used. Others can also be used in accordance with the desired implementation and the present disclosure is not limited thereto.

Title: Textfield to Add the Event Title

Event Description: textarea—a text editor (e.g., Rich text JavaScript editor) allows the system admin/event coordinator format the description in any way needed. This input field is used for entering the event description.

Figure 46:
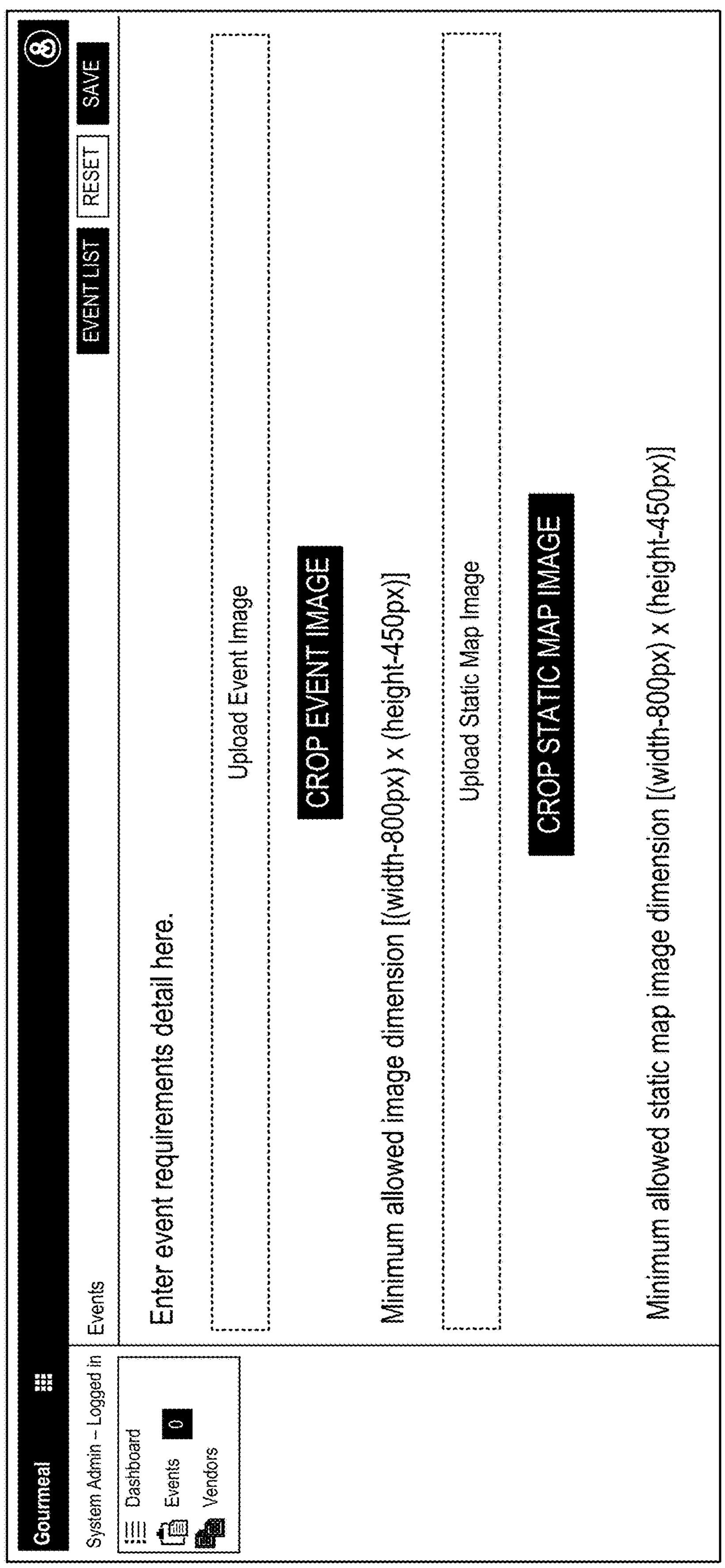
Figure 47:
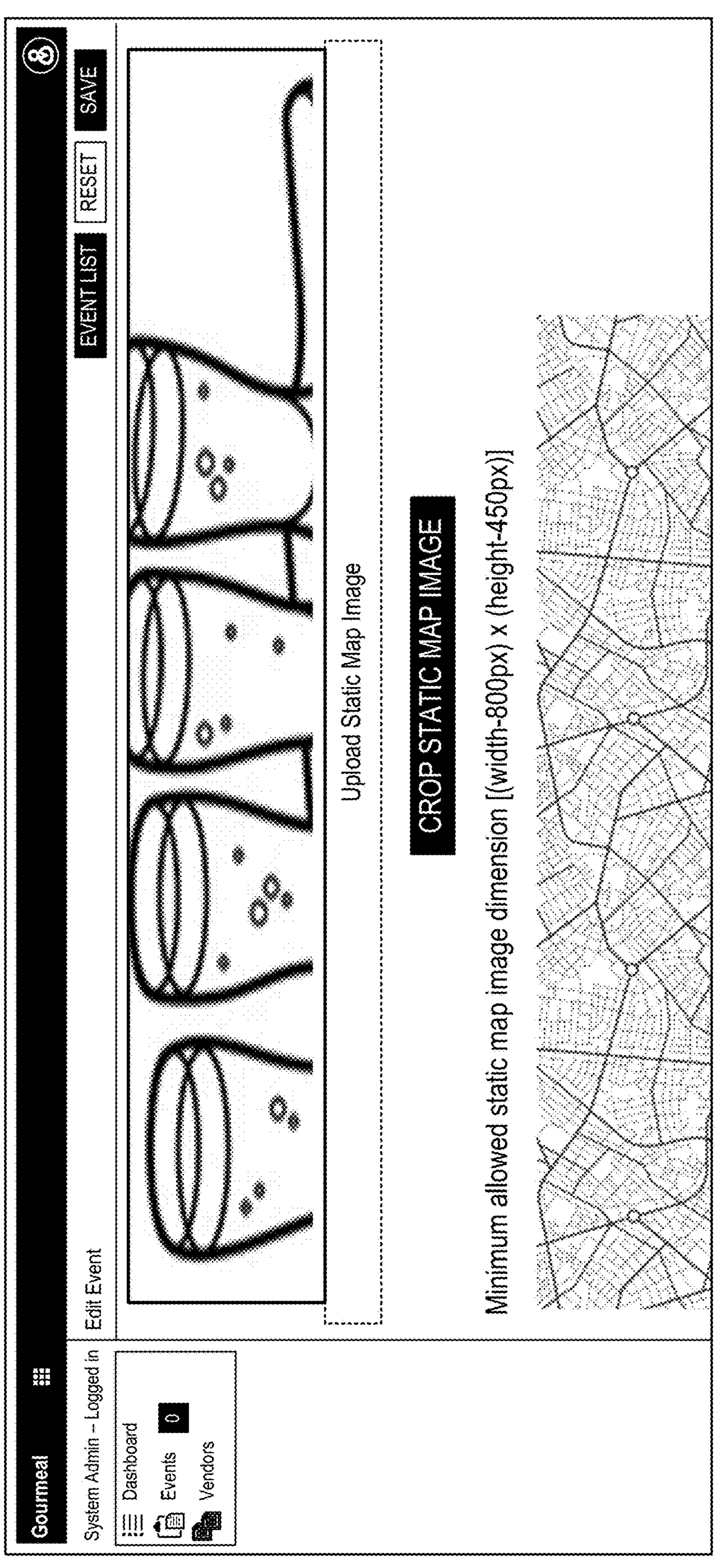

Upload Image: FIGS. 46 and 47 illustrate an example of the image upload, in accordance with an example implementation. In the example implementations, a file upload field are used for uploading an event image. Furthermore, if system admin/event coordinator uses large images, this section allows them to zoom and crop the image to match the required image dimensions.

Figure 48:
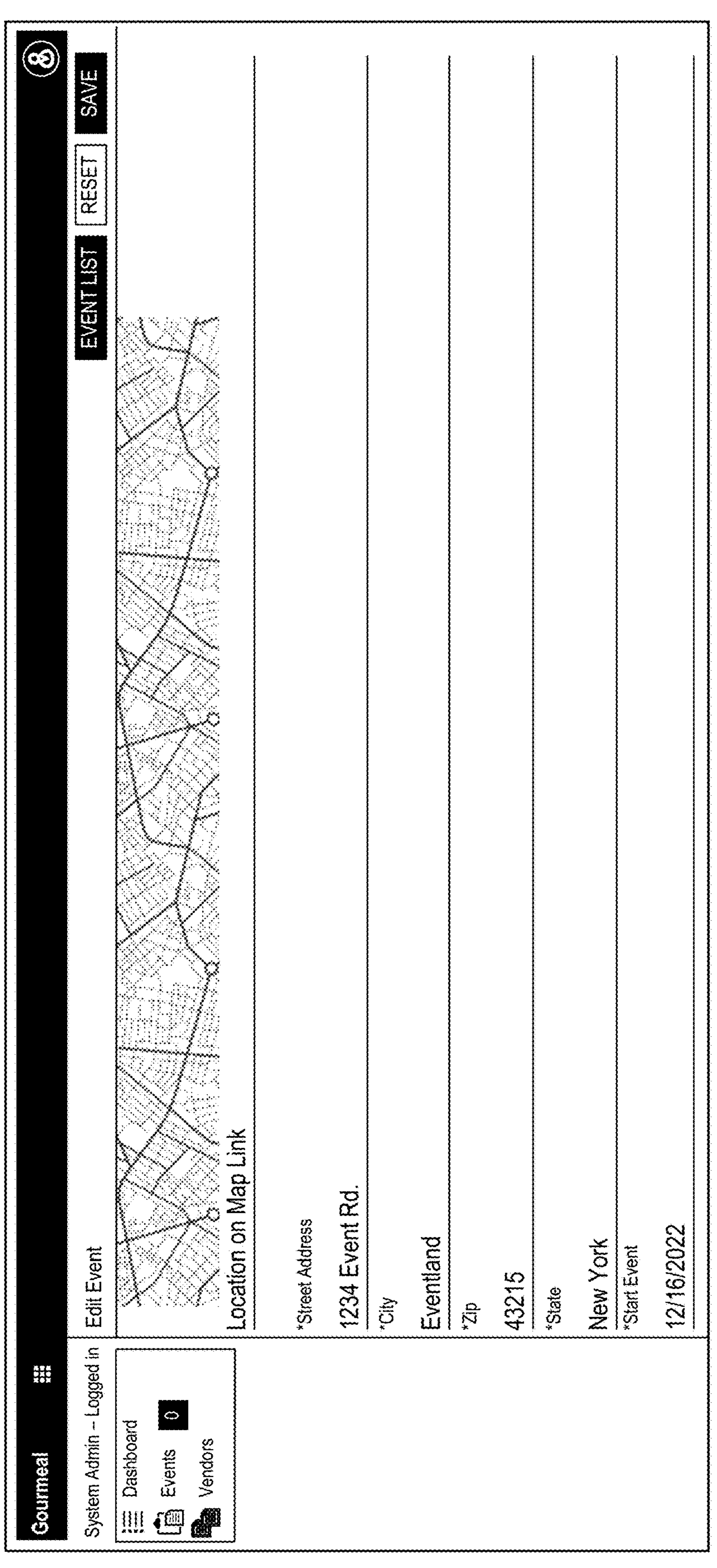

Location: FIG. 48 illustrates an example interface to add the location on the map link, in accordance with an example implementation. In the example implementations, there is a textfield to add the location URL from a map application. If this field is added, the event will be displayed on a map application on a customer mobile application.

The map application can be a standard map application as known in the art in accordance with the desired implementation. Depending on the venue and nature of the event, a customized map application may also be used either in isolation or in conjunction with the standard map application. For example, if the event is being held at certain floors of a convention center or a building, a separate map application can load up the map of the convention center or building as well the designated floors/rooms/spaces that are used by the event to allow the mobile application user to understand the location of the event. If the event is an outdoor event, such as a marathon, a parade, a city fair, or so on, a separate custom map application can be used to indicate the boarders (e.g., defined by street blocks, GPS coordinates to set up a location or boarders of a location, by parcel/tax or land lots, by freeform drawing on a map, etc.). The map can also be a custom map provided by the event producer to more easily define the venue of the event and for informing the registered mobile application users, in accordance with the desired implementation.

Further, the custom map application can also be used to define security conditions or indicate locations of vendors, depending on the desired implementation. For example, a separate interface (not illustrated), can be used to indicate and define locations of the vendors within the event as customized by the event producer. In this manner, the event producer can determine and place registered vendors in specific designated locations, which can be used by both the vendors to determine their location through their map interface, and for mobile application users to know where their vendors are within the venue. Such a map can be any custom map as provided by the event producer in accordance with the desired implementation.

In the example of security conditions, additional security restrictions can be added in accordance with the desired implementation beyond the standard required user registration and purchase of an event ticket through the application. For example, purchases made to vendors can be restricted to users that are actually at or in proximity to the location (e.g., as determined via GPS coordinates from the device used, address of the device used, etc.) so as to ensure that the user device making the purchase is actually in proximity to the location. Other security conditions can also be used in accordance with the desired implementation, and the present disclosure is not particularly limited to such an implementation. For example, one required security condition can be to verify with a physical device/marker at the location (e.g., a QR code or other code provided at the location, a connection to a required hotspot or Wi-Fi router at the location, etc.) before purchases are permitted.

Figure 49:
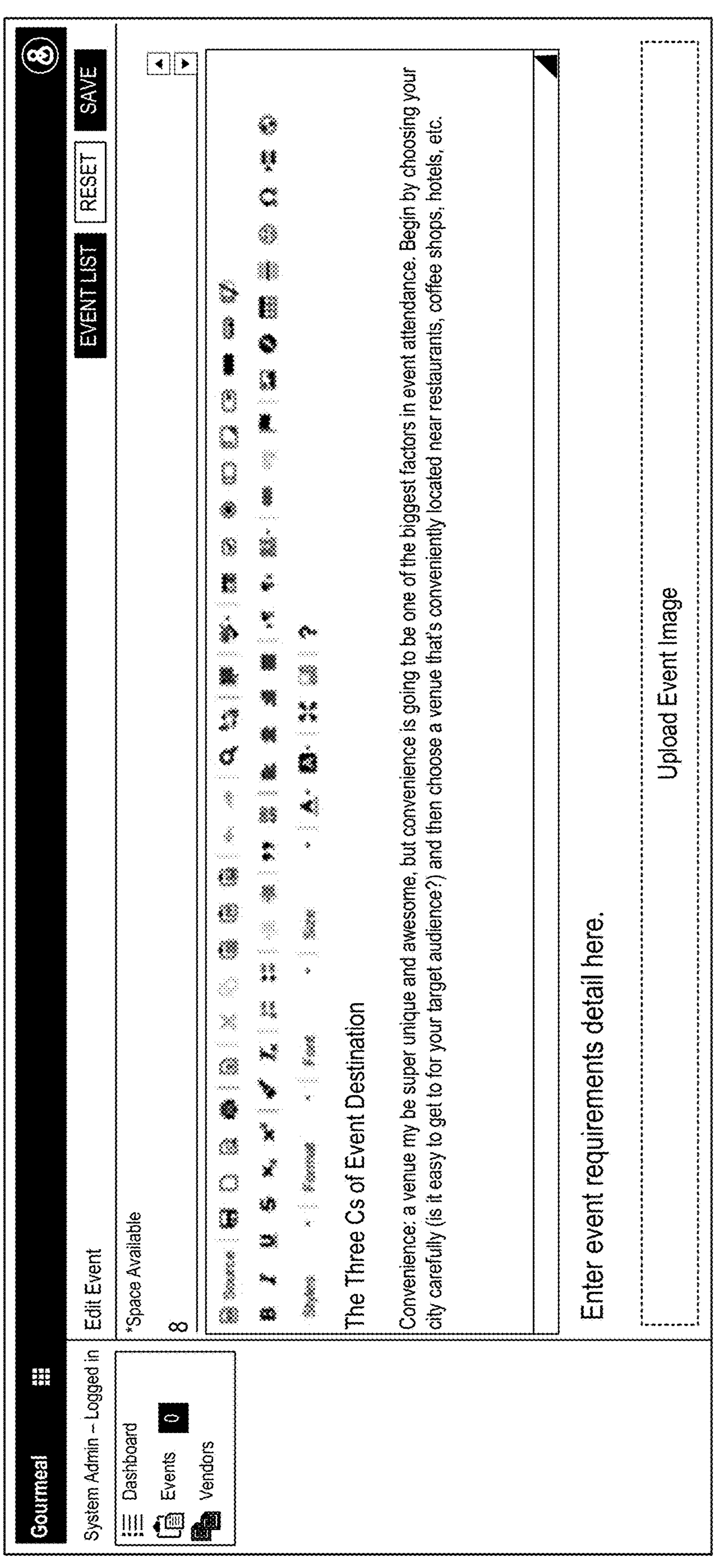
Figure 50:
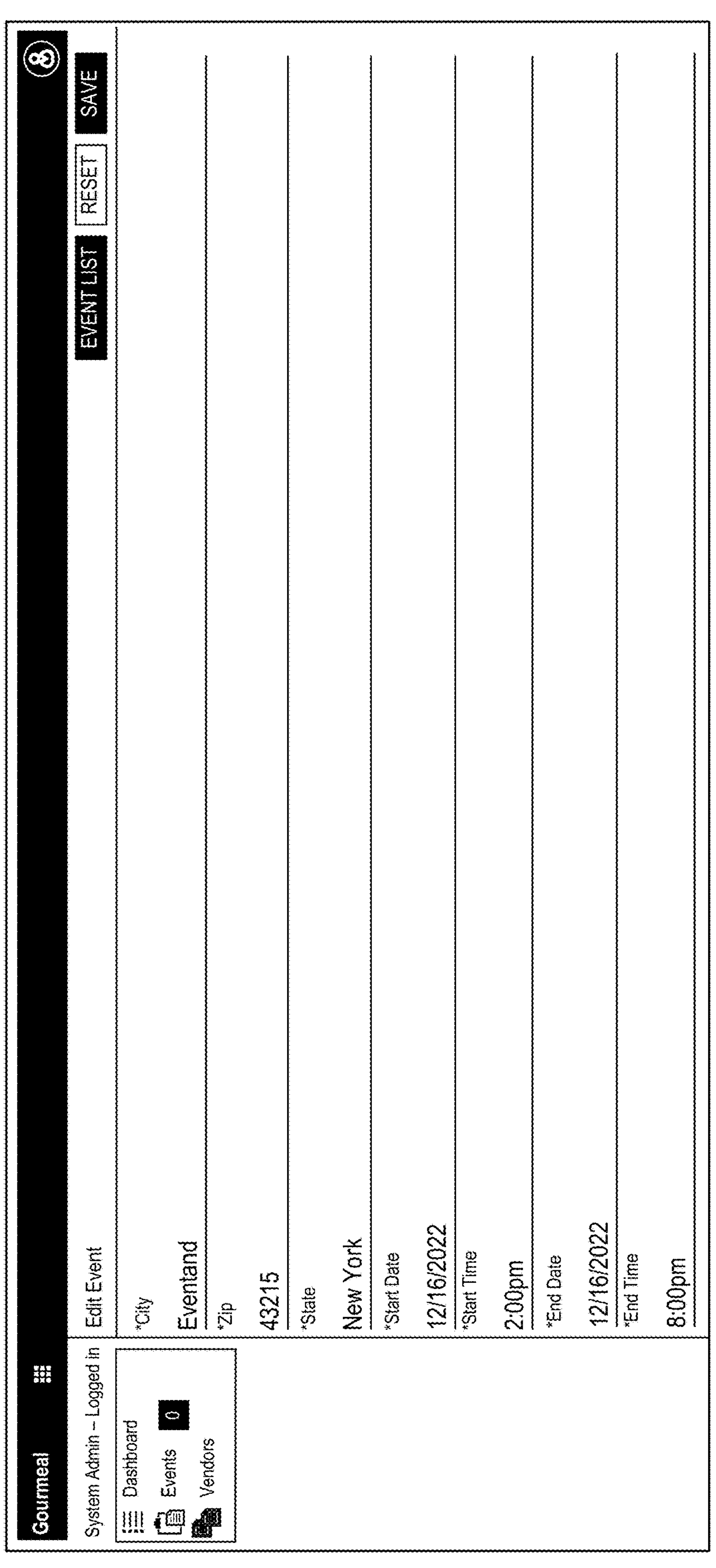

FIGS. 48 to 50 illustrate example interfaces to take in information about the event. Example fields as illustrated in these screens are as follows.

- Street Address: textfield—used for collecting the street address information
- City: textfield—used for collecting the city where the event is happening
- Zip: text field—used for collecting the zip code where the event is happening
- State: Dropdown: listing all states, used for selecting the exact state where the event is happening
- Start Date/Start Event: Date field (jQuery UI calendar) used for selecting the start date of the event
- Start Time: Time select field, used for selecting the start time of the event
- End Date: Date field (jQuery UI calendar) used for selecting the end date of the event
- End Time: Time select field, used for selecting the end time of the event.
- Reset button: can be used if the system admin/event coordinator wants to clear all data entered in the form.
- Submit button: used for saving the event detail information into the database.
- Edit Event: This interface page shows all the details of the selected event, prepopulating the form fields described in the 'Add Event' page. System admin/event coordinator can then modify a specific part of the event detail and update the form.
- Delete Event: This module is used for removing event record from the database for good. Only current and future events are visible to vendors and as events are getting old (past event), ultimately the system admin will need to remove these events from the database. To do so, the delete event module is used.

Figure 51:
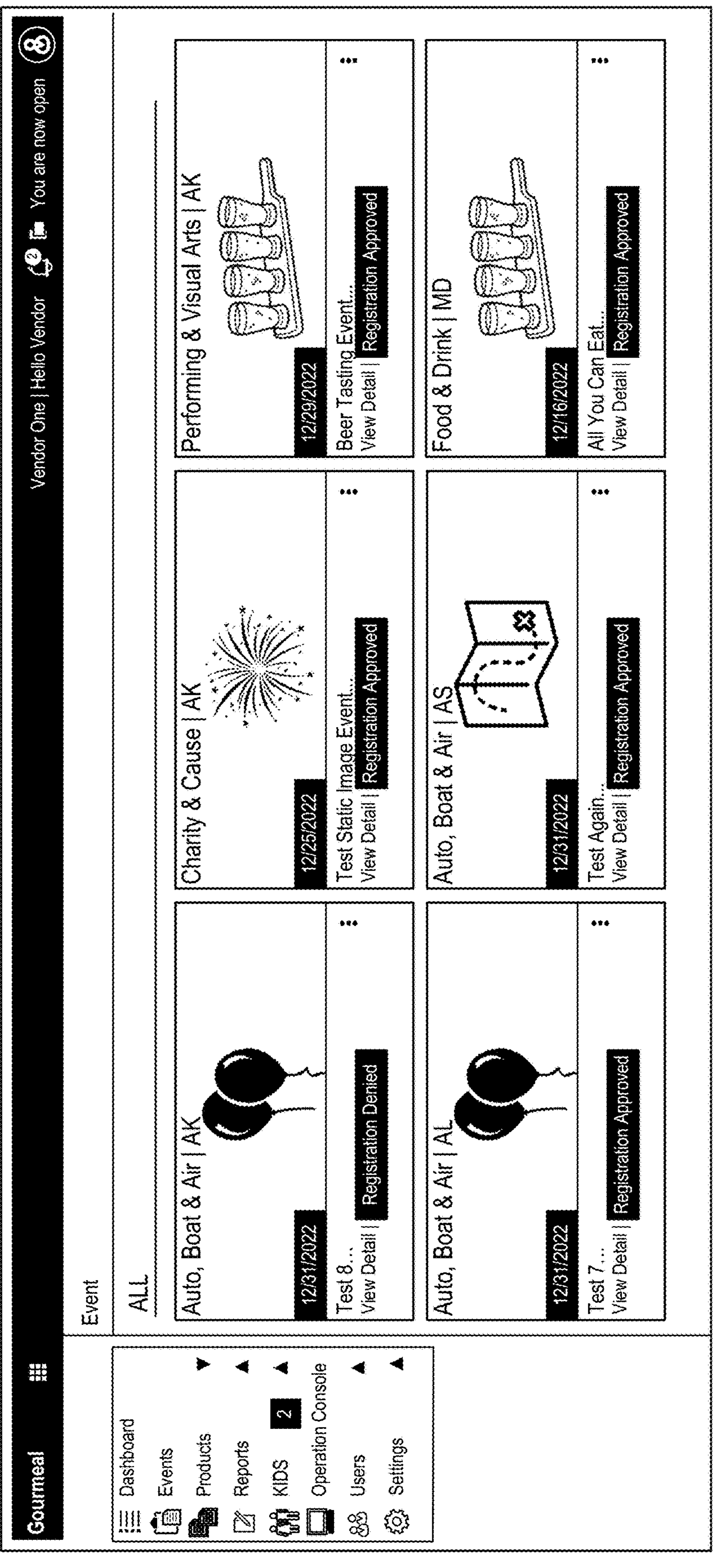
FIG. 51 illustrates an example vendor console screen to register for an event, in accordance with an example implementation.

FIG. 51 illustrates an example vendor console screen to register for an event, in accordance with an example implementation. Specifically, the vendor can apply to be a vendor for any of the broadcasted events by submitting the inventory and other information as described herein. When a vendor applies to an event, a notice is sent to the system admin/event producer to accept or deny the registration for the event (e.g., via e-mail, via interface, etc.). The system admin/event producer can also have a summary (e.g., via e-mail, via interface, etc.) to indicate the proposed goods and services to be provided for the event. Once the system admin/event producer confirms or denies the registration, the notice can be provided to the vendor as indicated in FIG. 51.

Vendor/Event Coordinator Game

Figure 52:
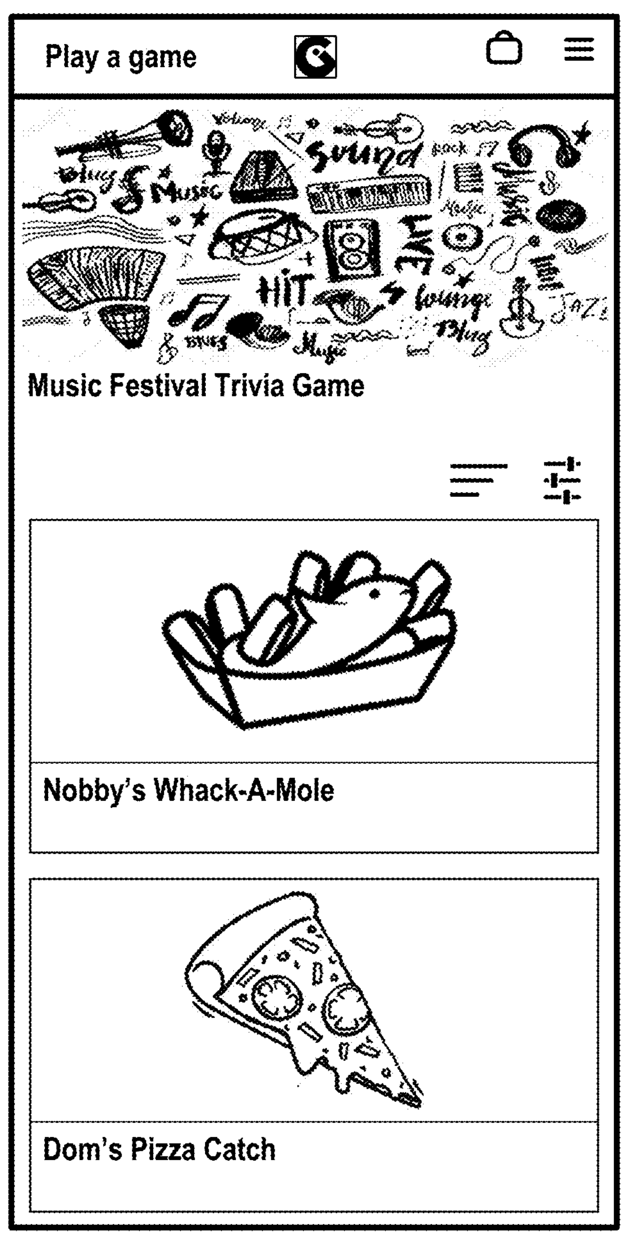
FIG. 52 illustrates an example interface to load a game for a registered user to play, in accordance with an example implementation.

FIG. 52 illustrates an example interface to load a game for a registered user to play, in accordance with an example implementation. In example implementations, the event producer and/or the vendors can provide games for the mobile application users to play to gain prizes. Mobile application users that choose a particular game can get rewards or points based on the underlying selected vendor or event.

The event producer/vendors can utilize any type of game in accordance with the desired implementation. Such game can be any game as known in the art (e.g., trivia game, whack-a-mole, etc.) and the present disclosure is not particularly limited thereto. To facilitate graphics for the game, skins can be provided by the event coordinator/vendor, and/or images that were uploaded for the event from the interfaces described herein (e.g., menu images for vendors, event images for the event producers) can also be applied in accordance with the desired implementation. The game can also involve a competitive element among users in accordance with the desired implementation. For example, a group of users selecting a particular game can pay an entry fee and compete wherein the winner gets a portion of the collected entry fees to apply to the particular vendor/event. Further, the skins can be chosen based on the product purchased by the player. For example, if the player had just bought clothing items or food items through the mobile application from the vendors, the images provided by the vendors for the food or clothing item can be used as a skin for the game, as well as the brand of the food or clothing item and the vendor skins.

In addition, the event producer can also dedicate a game for sponsors of the event as well. In such an example implementation, the sponsor logo and other images provided by the sponsor can be utilized as the skins for the game, wherein mobile application users playing such a game can receive incentives (e.g., event credit, etc.) to play the sponsor game in accordance with the desired implementation.

Figure 53:
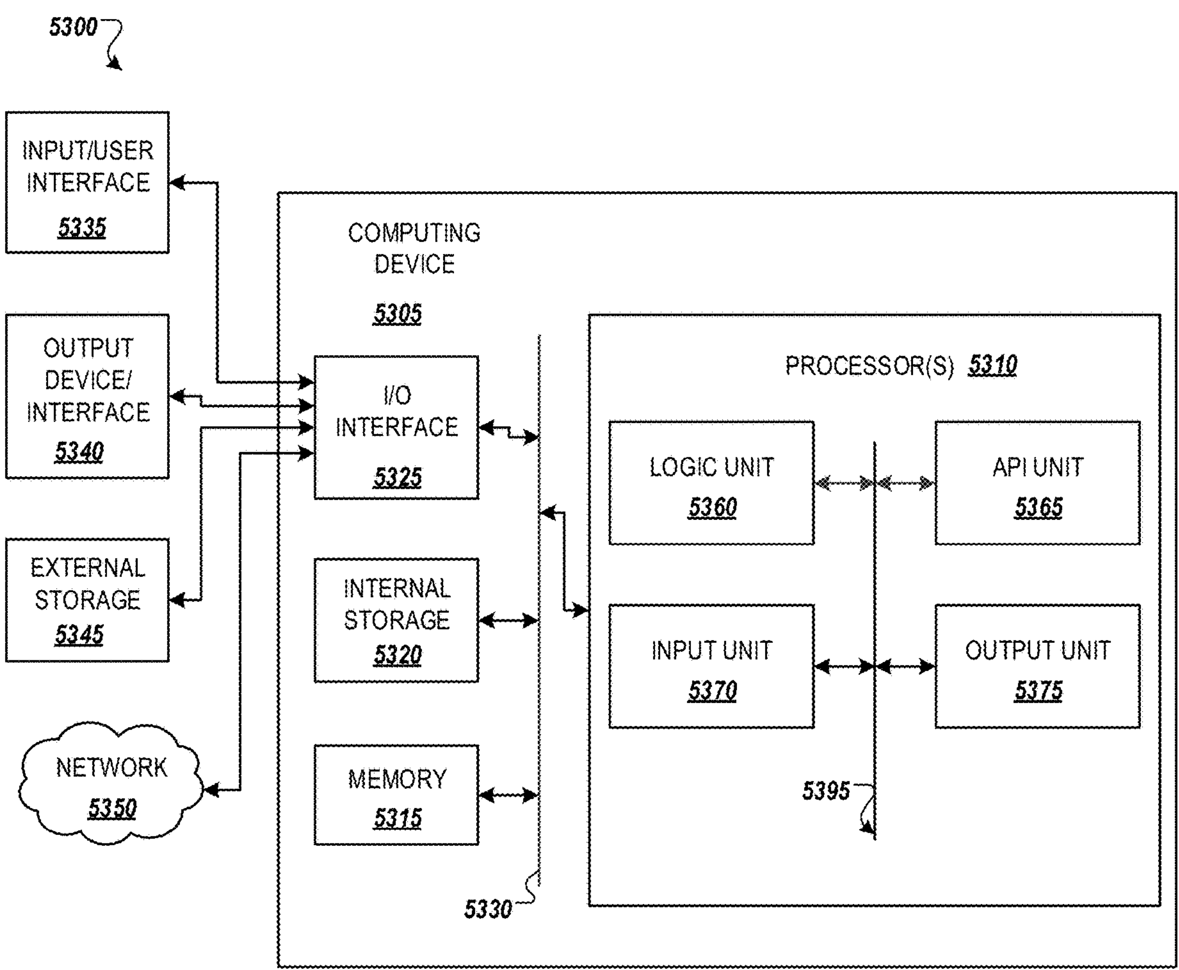
FIG. 53 illustrates an example computing environment with an example computer device suitable for use in some example implementations.

FIG. 53 illustrates an example computing environment with an example computer device suitable for use in some example implementations. Computer device 5305 in computing environment 5300 can include one or more processing units, cores, or processors 5310, memory 5315 (e.g., RAM, ROM, and/or the like), internal storage 5320 (e.g., magnetic, optical, solid-state storage, and/or organic), and/or IO interface 5325, any of which can be coupled on a communication mechanism or bus 5330 for communicating information or embedded in the computer device 5305. IO interface 5325 is also configured to receive images from cameras or provide images to projectors or displays, depending on the desired implementation.

Computer device 5305 can be communicatively coupled to input/user interface 5335 and output device/interface 5340. Either one or both of the input/user interface 5335 and output device/interface 5340 can be a wired or wireless interface and can be detachable. Input/user interface 5335 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 5340 may include a display, television, monitor, printer, speaker, braille, or the like. In some example implementations, input/user interface 5335 and output device/interface 5340 can be embedded with or physically coupled to the computer device 5305. In other example implementations, other computer devices may function as or provide the functions of input/user interface 5335 and output device/interface 5340 for a computer device 5305.

Examples of computer device 5305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 5305 can be communicatively coupled (e.g., via IO interface 5325) to external storage 5345 and network 5350 for communicating with any number of networked components, devices, and systems, including one or more computer devices of the same or different configuration. Computer device 5305 or any connected computer device can be functioning as, providing services of, or referred to as a server, client, thin server, general machine, special-purpose machine, or another label.

IO interface 5325 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 5300. Network 5350 can be any network or combination of networks (e.g., the Internet, local area network, wide area network, a telephonic network, a cellular network, satellite network, and the like).

Computer device 5305 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 5305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 5310 can execute under any operating system (OS) (not shown), in a native or virtual environment. One or more applications can be deployed that include logic unit 5360, application programming interface (API) unit 5365, input unit 5370, output unit 5375, and inter-unit communication mechanism 5395 for the different units to communicate with each other, with the OS, and with other applications (not shown). The described units and elements can be varied in design, function, configuration, or implementation and are not limited to the descriptions provided. Processor(s) 5310 can be in the form of hardware processors such as central processing units (CPUs) or in a combination of hardware and software units.

In some example implementations, when information or an execution instruction is received by API unit 5365, it may be communicated to one or more other units (e.g., logic unit 5360, input unit 5370, output unit 5375). In some instances, logic unit 5360 may be configured to control the information flow among the units and direct the services provided by API unit 5365, the input unit 5370, the output unit 5375, in some example implementations described above. For example, the flow of one or more processes or implementations may be controlled by logic unit 5360 alone or in conjunction with API unit 5365. The input unit 5370 may be configured to obtain input for the calculations described in the example implementations, and the output unit 5375 may be configured to provide an output based on the calculations described in example implementations.

Processor(s) 5310 can be configured to perform item selection; wherein selected items are associated with a plurality of vendors at the event as shown in FIG. 10. The processor(s) 5310 may also be configured to group the selected items into the aggregated order as shown in FIG. 10. The processor(s) 5310 may also be configured to perform a single payment on the aggregated order as shown in FIG. 10.

The processor(s) 5310 may also be configured to generate a single-use code on the user terminal as shown in FIG. 10. The processor(s) 5310 may also be configured to communicate the generated single-use code to at least one-party member terminal as shown in FIG. 10. The processor(s) 5310 may also be configured to selecting at least one item associated with at least one of the plurality of vendors at the event as shown in FIG. 10. The processor(s) 5310 may also be configured to submit items selected by the at least one-party member terminal to the user terminal using the received single-use code as shown in FIG. 10.

The processor(s) 5310 may also be configured to receive order status on the aggregated order as shown in FIG. 10. The processor(s) 5310 may also be configured to perform payment distribution on the single payment to the plurality of vendors at the event based on item source and item fees as shown in FIGS. 39-40.

Processor(s) 5310 can be configured to execute a method or computer instructions for an event management platform, which can include providing an event coordinator interface configured to receive input for first information from an event coordinator for an event, the first information involving an event location and a start date for the event as illustrated in FIGS. 48 to 50; providing the event on the event management platform for access to one or more vendors as illustrated in FIG. 51; and providing a vendor interface configured to display the first information for the event and receive input for second information from ones of the one or more vendors registering for the event, the second information comprising a list of proposed products to be sold at the event as illustrated in FIGS. 22 to 24.

Processor(s) 5310 can be configured to execute a method or computer instructions as described above, wherein the event coordinator interface is configured to display the second information and receive an input to accept or reject each of the ones of the one or more vendors registering for the event; wherein the vendor interface is configured to display an output representative of acceptance or rejection of registration for the event as described with respect to FIG. 51.

Depending on the desired implementation, the event location can involve an address, global positioning satellite (GPS) coordinates, and/or a geofenced area defined in a map application as described with respect to FIGS. 48 to 50.

Processor(s) 5310 can be configured to execute a method or computer instructions as described above, and further involve providing the event on the event management platform for access to one or more mobile application users; and providing a mobile application interface configured to display available events from the event management platform for the one or more mobile application users as illustrated in FIGS. 1 to 11.

Processor(s) 5310 can be configured to execute a method or computer instructions as described above, and further involve receiving, through the mobile application interface, input for registering the one or more mobile application users for the event as described with respect to FIGS. 1 to 11.

Processor(s) 5310 can be configured to execute a method or computer instructions as described above, and further involve displaying, through the mobile application interface, for a selected event from the available events, accepted ones of the one or more vendors for the selected event; and for a selection of one of the accepted ones of the one or more vendors through the mobile application interface, displaying, through the mobile application interface, the list of proposed products associated with one of the accepted ones of the one or more vendors as described with respect to FIGS. 1 to 11.

Processor(s) 5310 can be configured to execute a method or computer instructions as described above, and further involve receiving, through the mobile application interface, input for selecting one or more products from the list of proposed products associated with one of the accepted ones of the one or more vendors as an order as illustrated in FIGS. 1 to 11.

Processor(s) 5310 can be configured to execute a method or computer instructions as described above, and further involve generating, through the mobile application interface, a single-use code in response to a purchase confirmation of the order; and providing the single-use code to the vendor interface for display as illustrated and described with respect to FIG. 10.

Processor(s) 5310 can be configured to execute a method or computer instructions as described above, and further involve for receipt of input selecting a plurality of products from the list of proposed products from a plurality of the accepted ones of the one or more vendors through the mobile application interface, grouping the selected plurality of products into an aggregated order; and providing an option to facilitate purchase of the plurality of products in the aggregated order with a single payment as illustrated with respect to FIGS. 9 and 10.

Processor(s) 5310 can be configured to execute a method or computer instructions as described above, and further involve disabling purchases from the list of proposed products from devices not within the threshold proximity to the event location as described with respect to FIG. 1 and FIGS. 47 to 50.

Processor(s) 5310 can be configured to execute a method or computer instructions as described above, and further involve disabling purchases from the list of proposed products from devices that are indicated as unverified as described with respect to FIGS. 47 to 50.

Processor(s) 5310 can be configured to execute a method or computer instructions as described above, and further involve verifying devices for enabling purchases from the list of proposed products based on receiving a connection from the devices to a wi-fi connection at the event location as described with respect to FIGS. 47 to 50.

Processor(s) 5310 can be configured to execute a method or computer instructions as described above, and further involve receiving, through the event coordinator interface, a map of the event involving locations for each of the ones of the one or more vendors registering for the event that are accepted for the event; and providing the map of the event for display on a mobile application interface for a mobile application user registered for the event in response to an input on the mobile application interface to display the map as described with respect to FIGS. 47 to 50.

Processor(s) 5310 can be configured to execute a method or computer instructions as described above, and further involve displaying, through the vendor interface, one or more orders from one or more mobile application users.

Processor(s) 5310 can be configured to execute a method or computer instructions as described above, and further involve printing the one or more orders from the one or more mobile application users to a thermal printer as described with respect to FIGS. 41 and 42.

Processor(s) 5310 can be configured to execute a method or computer instructions as described above, and further involve providing, to the mobile application interface, a game associated with the event coordinator, the game involving images provided through the event coordinator interface as illustrated and described with respect to FIGS. 34 to 42.

Processor(s) 5310 can be configured to execute a method or computer instructions as described above, and further involve providing, to the mobile application interface, a game associated with accepted ones of the one or more vendors registering for the event, the game involving images provided through the vendor interface as described with respect to FIG. 52.

Processor(s) 5310 can be configured to execute a method or computer instructions as described above, and further involve providing suggestions through the event coordinator interface for the event location based on a machine learning algorithm trained against historical events as described with respect to FIGS. 43 and 44.

Processor(s) 5310 can be configured to execute a method or computer instructions for an event management platform, which can involve providing a list of scheduled events available on the event management platform; and for a selection of an event from the list of scheduled events, providing a vendor interface configured to intake vendor information for registering for the selected event, the vendor information comprising a list of goods or services to be provided for the selected event.

Processor(s) 5310 can be configured to execute a method or computer instructions for an event management platform as described above, and further involve displaying an acceptance or a rejection of the registration based on input made through an event coordinator interface of an event coordinator associated with the selected event.

Figure 54:
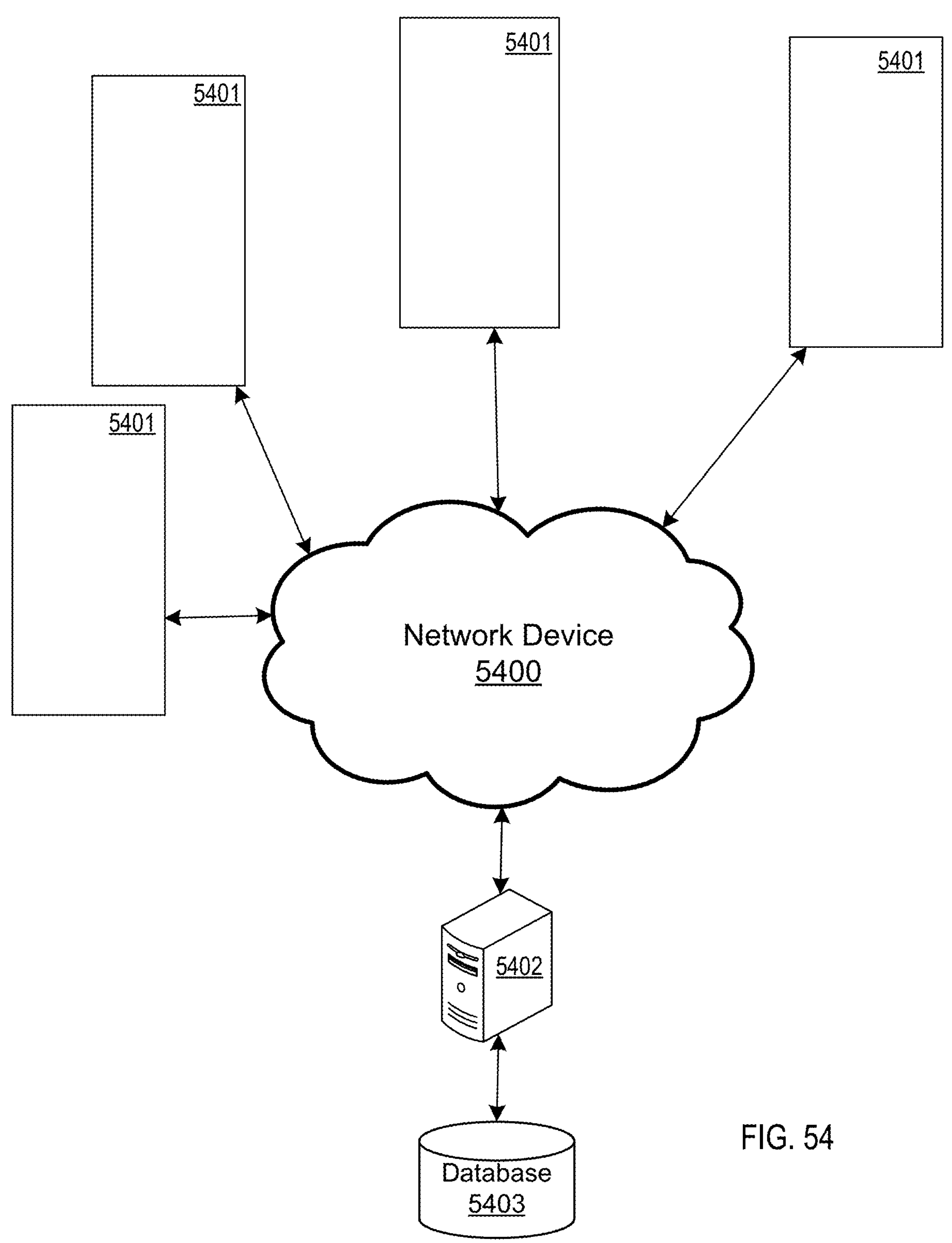
FIG. 54 illustrates an example system deployment, in accordance with an example implementation.

FIG. 54 illustrates an example system deployment, in accordance with an example implementation. Such an example system can be deployed in any event location, such as a parking lot or open field for food trucks, a cruise ship, a stadium, blocks of streets for a festival or marathon, and so on. Event locations can be freely defined, such as by global positioning satellite (GPS) coordinates, a geofenced area defined in a map application, or can be based on the underlying structure such as a building or a cruise ship.

One or more physical devices or systems 5401 associated with vendors (e.g., food trucks, food stalls, flea market vendor stalls, cruise ship shops, etc.), event coordinators, or mobile application users are communicatively coupled to one or more network devices 5400 (e.g., switches/routers that local area network (LAN), cellular base stations, or pico stations that facilitate wide area network (WAN), gateways, and so on in accordance with the desired implementation) through the corresponding network interface, which is connected to a management apparatus 5402. The management apparatus 5402 manages a database 5403 (e.g., such as that illustrated in the computing environment of FIG. 53), which contains historical data collected from the devices such as transaction information. In alternate example implementations, the data can be stored to a central repository or central database such as proprietary databases that intake data, or systems such as enterprise resource planning systems, and the management apparatus 5402 can access or retrieve the data from the central repository or central database.

The physical devices or systems 5401 can include any type of device to facilitate the implementation, such as but not limited to mobile devices, computers, laptops, and so on.

The one or more network devices 5400 can be configured to facilitate connectivity to one or more accepted vendors for an event at an event location; and for receipt of a connection from a user device, determine whether the user device is authorized for the event; and for the user device being authorized for the event, facilitate connectivity for purchase orders from the user device to the one or more accepted vendors of the event such as shown, for example, through the flow diagram of FIG. 1.

Depending on the desired implementation, the one or more network devices 5400 can be configured to to determine whether the user device is authorized for the event based on a scanned code. In such an example implementation, a quick release (QR) code/bar code/numerical code/event ticket (e.g., digital ticket) can be displayed that, when registered through the one or more network devices 5400 through any desired implementation (e.g., through a scanning device) can cause the one or more network devices 5400 to authorize the user device into the network. In this manner, transactions made to vendors at the event can be restricted to user devices that are physically present at the event. In another example implementation, verification of the scanned code can bring up information to connect to the network (e.g., password to connect) that the user device can then use to connect to the network. In another example implementation, the one or more network devices 5400 can attempt to retrieve a digital ticket from the mobile application of the user device to determine if the user device is authorized to be connected. Such an example implementation can be done through any desired implementation as known in the art.

In another example implementation, the one or more network devices 5400 is configured to determine whether the user device is authorized for the event based on proximity of the user device to the event location, either by global positioning satellite (GPS) coordinates, by address, by physical proximity to the one or more network devices 5400, and so on depending on the desired implementation.

In another example implementation, he one or more network devices 5400 is configured to, for receipt of a connection from a vendor device, determine whether the vendor device is associated with an authorized vendor from a list of authorized vendors provided for the event; and for the vendor device being associated with the authorized vendor from the list of authorized vendors for the event, facilitate connectivity for the authorized vendor. Authorization can be done in the same manner as that of a user device, or can be conducted by verifying registered vendor devices from a list of accepted vendors designated by the event coordinator as illustrated in FIG. 19.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for an event management platform, the method comprising:

receiving, by the event management platform, a first event coordination data set, with the first event coordination data set including information indicative of an event location and a start date for an event;

receiving, by the event management platform, permission to access a vendor data set, with the vendor data set including identities of a plurality of vendors and a plurality of items provided by the plurality of vendors;

determining a geofenced region defining the event location, the geofenced region defined based on one or more of global positioning satellite (GPS) coordinates, an address, a freeform boundary defined in a map application, or by wi-fi connection to a router device at the event location;

responsive to the determination of the geofenced region, providing, to a plurality of mobile application users, access to the vendor data set;

selecting, by at least one mobile application user of the plurality of mobile application users, at least one item of the plurality of items provided by the plurality of vendors;

for receipt of input selecting items of the plurality of items from a plurality of the accepted ones of the plurality of vendors through a user interface, grouping the selected items into an aggregated order;

generating a single-use code in response to a purchase confirmation of the aggregated order; and displaying the single-use code on a vendor interface of each of the plurality of vendors associated with the aggregated order;

disabling purchases from the plurality of items from devices not within a threshold proximity to the event location; and disabling purchases from the plurality of items from devices that are indicated as unverified;

and verifying, by the event management platform, devices for enabling purchases from the plurality of items based on receiving a connection from the devices to the wi-fi connection at the event location.

2. The method of claim 1 further comprising:

for each given mobile application user, generating, by the event management platform, a quick response (QR) code for selecting the at least one item of the plurality of items.

3. The method of claim 1, wherein the event management platform is structured and configured to allow the plurality of mobile application users to select the at least one item from the plurality of items using a first user's mobile application.

4. The method of claim 3, wherein the plurality of mobile application users select the at least one item from the plurality of items through the use of the QR code generated for the first user's mobile application.

5. The method of claim 1, wherein the event management platform is structured and configured to have a user interface displaying events available to the mobile application users.

6. The method of claim 5, further comprising:

receiving, through the user interface, input for registering one or more of the mobile application users for the event.

7. The method of claim 5, further comprising:

displaying, through the user interface, for a selected event from the available events, accepted ones of the plurality of vendors for the selected event; and for a selection of one of the accepted ones of the plurality of vendors through the user interface, displaying, through the user interface, ones of the plurality of items associated with the selected one of the accepted ones of the plurality of vendors.

8. The method of claim 7, further comprising:

generating, through the user interface, a single-use code in response to a purchase confirmation of an order involving the ones of the plurality of items associated with the selected one of the accepted ones of the plurality of vendors; and displaying the single-use code on a vendor interface of the selected one of the accepted ones of the plurality of vendors.

9. The method of claim 6, further comprising:

providing an option to facilitate purchase of the selected items in the aggregated order with a single payment.

10. The method of claim 6, wherein the plurality of items provided by the plurality of vendors is arranged in order based on available inventory or popularity.

11. The method of claim 6, wherein a price associated with each given item of the plurality of items is adjusted based on available inventory or popularity.

12. The method of claim 1, further comprising:

receiving, through an event coordinator interface of a mobile application, a map of the event including locations for each vendor of the plurality of vendors that are registered for the event and are accepted for the event;

receiving, by at least one mobile application user of the plurality of mobile application users, an input on the user interface to display the map of the event; and displaying the map of the event on the user interface for the mobile application user registered for the event.

13. The method of claim 12, further comprising:

providing, to the user interface, a game associated with accepted and registered vendors of the plurality of vendors for the event, with the game including images displayed through the vendor interface.

14. The method of claim 13, further comprising providing, to the user interface, a game associated with the event coordinator, the game comprising images provided through the event coordinator interface.

15. The method of claim 14, wherein the images are selected for the game based on items purchased from the plurality of vendors through the mobile application interface.

16. The method of claim 12, further comprising providing suggestions through the event coordinator interface for the event location based on a machine learning algorithm trained against historical events.

* * * * *